US010581640B2

(12) United States Patent
Liu et al.

(10) Patent No.: US 10,581,640 B2
(45) Date of Patent: Mar. 3, 2020

(54) CHANNEL ESTIMATION METHOD, REFERENCE SIGNAL SENDING METHOD, APPARATUS, AND SYSTEM

(71) Applicant: HUAWEI TECHNOLOGIES CO., LTD., Shenzhen, Guangdong (CN)

(72) Inventors: Kunpeng Liu, Beijing (CN); Di Zhang, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 16/287,791

(22) Filed: Feb. 27, 2019

(65) Prior Publication Data

US 2019/0199552 A1    Jun. 27, 2019

Related U.S. Application Data

(63) Continuation of application No. PCT/CN2017/096840, filed on Aug. 10, 2017.

(30) Foreign Application Priority Data

Aug. 31, 2016  (CN) .......................... 2016 1 0797520

(51) Int. Cl.
*H04B 7/06* (2006.01)
*H04L 25/02* (2006.01)
*H04L 5/00* (2006.01)
*H04B 7/0456* (2017.01)

(52) U.S. Cl.
CPC ....... *H04L 25/0204* (2013.01); *H04B 7/0456* (2013.01); *H04B 7/0615* (2013.01); *H04L 5/0007* (2013.01); *H04L 5/0041* (2013.01)

(58) Field of Classification Search
CPC .. H04B 7/0626; H04B 7/0456; H04B 17/382; H04B 7/0615; H04L 5/0048;
(Continued)

(56) References Cited

U.S. PATENT DOCUMENTS

2010/0195600 A1    8/2010  Gorokhov et al.
2013/0142150 A1    6/2013  Zhou et al.
(Continued)

FOREIGN PATENT DOCUMENTS

CN       101931896 A       12/2010
CN       102143096 A        8/2011
(Continued)

OTHER PUBLICATIONS

Sony, Cross PRB Channel Estimation for M-PDCCH. 3GPP TSG-RAN WG1 Meeting #82 Beijing, PR China, Aug. 24-28, 2015, R1-154211, 8 pages.
(Continued)

*Primary Examiner* — Rahel Guarino
(74) *Attorney, Agent, or Firm* — Fish & Richardson P.C.

(57) ABSTRACT

This application discloses a channel estimation method, a reference signal sending method, an apparatus, and a system, and belongs to the communications field. The method includes: when a first precoding weight of a first reference signal and a second precoding weight of a second reference signal are the same, receiving, by a first network device, the first reference signal in a first time unit according to a first pattern, and receiving the second reference signal in a second time unit according to a second pattern; and performing, by the first network device, channel estimation on a channel in the second time unit.

18 Claims, 74 Drawing Sheets

(58) Field of Classification Search
CPC ... H04L 5/0023; H04L 5/0091; H04L 5/0035; H04L 25/0226; H04L 27/2613; H04L 5/0055; H04L 5/0005; H04W 72/0446; H04W 72/04; H04W 72/12; Y02D 70/1264

See application file for complete search history.

(56) References Cited

U.S. PATENT DOCUMENTS

| | | | |
|---|---|---|---|
| 2014/0226636 A1 | 8/2014 | Xu et al. | |
| 2014/0314041 A1* | 10/2014 | Kim | H04L 5/0048 370/329 |

FOREIGN PATENT DOCUMENTS

| | | |
|---|---|---|
| CN | 102244563 A | 11/2011 |
| CN | 103905171 A | 7/2014 |
| EP | 2584748 A1 | 4/2013 |
| EP | 2584810 A1 | 4/2013 |

OTHER PUBLICATIONS

International Search Report and Written Opinion issued in International Application No. PCT/CN2017/096840 dated Oct. 26, 2017, 11 pages.

3GPP TSG RAN WG1,"Small cell spectral efficiency enhancement with reduced UE-specific RS" Abstract, Presented at Research in Motion, UK Limited Meeting #72bis, Chicago, IL, Apr. 15-19, 2013, 7 pages.

Extended European Search Report issued in application No. 17845186.0, dated Jun. 26, 2019, 10 pages.

Office Action issued in Chinese Application No. 201610797520.9 dated Jul. 29, 2019, 7 pages.

\* cited by examiner

CHANNEL ESTIMATION METHOD, REFERENCE SIGNAL SENDING METHOD, APPARATUS, AND SYSTEM

CROSS-REFERENCE TO RELATED APPLICATIONS

This application is a continuation of International Application No. PCT/CN2017/096840, filed on Aug. 10, 2017, which claims priority to Chinese Patent Application No. 201610797520.9, filed on Aug. 31, 2016, The disclosures of the aforementioned applications are hereby incorporated by reference in their entireties.

TECHNICAL FIELD

This application relates to the communications field, and in particular, to a channel estimation method, a reference signal sending method, an apparatus, and a system.

BACKGROUND

In a Long Term Evolution (LTE) system, a demodulation reference signal (DMRS) is a downlink reference signal sent by a base station to user equipment (UE). The UE may perform channel estimation on a physical resource block (PRB) based on the DMRS, and demodulate data on the physical resource block based on a channel estimation result.

DMRSs need to be transmitted in a relatively-high-density manner to obtain a relatively good channel estimation effect. In an LTE specification, the DMRSs have two alternative time-frequency distribution patterns in one physical resource block. One PRB includes two slots. Each slot includes seven or six symbols in a time domain dimension and 12 subcarriers in a frequency domain dimension. A first pattern of the DMRSs is: The DMRSs occupy last two symbols of each slot in the time domain dimension, and occupy subcarriers 1, 6, and 11 in the frequency domain dimension. A second pattern of the DMRSs is: The DMRSs are divided into two groups, each occupying last two symbols of each slot in the time domain dimension. A first group of DMRSs occupies subcarriers 1, 6, and 11 in the frequency domain dimension, and a second group of DMRSs occupies subcarriers 0, 5, and 10 in the frequency domain dimension.

If a better channel estimation effect needs to be obtained, the DMRSs usually need to be sent on more time-frequency resources. However, this leads to additional radio resource overheads and reduces a throughput of a communications system.

SUMMARY

To resolve a problem that radio resource overheads are increased and a throughput of a communications system is reduced because more resources are used to send reference signals to obtain a better channel estimation effect, embodiments of this application provide a channel estimation method, a reference signal sending method, an apparatus, and a system. The technical solutions are as follows:

According to a first aspect, an embodiment of this application provides a channel estimation method, where the method includes: when a first precoding weight of a first reference signal and a second precoding weight of a second reference signal are the same, receiving, by a first network device, the first reference signal in a first time unit according to a first pattern, and receiving the second reference signal in a second time unit according to a second pattern, where the first reference signal is a reference signal for channel measurement, and the second reference signal is a reference signal for demodulation; and performing, by the first network device, channel estimation on a channel in the second time unit based on the first reference signal and the second reference signal, where a quantity of time-frequency resources occupied by the second reference signal in the second pattern is less than a quantity of time-frequency resources occupied by the second reference signal in a third pattern, and the third pattern is a time-frequency distribution pattern, used when the first precoding weight and the second precoding weight are different, of the second reference signal in the second time unit.

According to the channel estimation method provided in this application, when the first precoding weight and the second precoding weight are the same, a second network device sends the first reference signal in the first time unit according to the first pattern and sends the second reference signal in the second time unit according to the second pattern; when the first network device determines that the first precoding weight and the second precoding weight are the same, the first network device receives the first reference signal and the second reference signal in different time units according to different patterns, and then performs channel estimation on the channel in the second time unit based on the first reference signal and the second reference signal. Because resources occupied by the first reference signal and the second reference signal that are received according to the first pattern and the second pattern respectively are fewer than resources occupied when the third pattern and a fourth pattern are used, a throughput of a communications system can be ensured while a channel estimation effect is optimized, radio resource overheads are reduced, and performance of the communications system is improved.

With reference to the first possible implementation of the first aspect, in a second possible implementation of the first aspect, the time-frequency resource in the second pattern is a part of the time-frequency resource in the third pattern.

With reference to the first possible implementation of the first aspect, in a third possible implementation of the first aspect, the first time unit is a subframe, the second time unit is another subframe, and the subframe includes a first slot and a second slot.

With reference to the third possible implementation of the first aspect, in a fourth possible implementation of the first aspect, the second pattern is in the first slot and the second slot; or the second pattern is in one of the first slot and the second slot.

With reference to the first possible implementation of the first aspect, in a fifth possible implementation of the first aspect, the first time unit is a slot including a plurality of orthogonal frequency division multiplexing OFDM symbols, and the second time unit is another slot including a plurality of orthogonal frequency division multiplexing OFDM symbols; or the first time unit is a time unit including two OFDM symbols, and the second time unit is a time unit including two OFDM symbols; or the first time unit is a time unit including three or four OFDM symbols, and the second time unit is another time unit including three or four OFDM symbols.

With reference to the first possible implementation of the first aspect, the second possible implementation of the first aspect, the third possible implementation of the first aspect, the fourth possible implementation of the first aspect, or the fifth possible implementation of the first aspect, in a sixth possible implementation of the first aspect, the first time unit is before the second time unit.

With reference to the first possible implementation of the first aspect, the second possible implementation of the first aspect, the third possible implementation of the first aspect, the fourth possible implementation of the first aspect, the fifth possible implementation of the first aspect, or the sixth possible implementation of the first aspect, in a seventh possible implementation of the first aspect, a time-frequency resource in the first pattern is a part of the time-frequency resource in the third pattern, and the first pattern and the second pattern do not overlap.

With reference to the first possible implementation of the first aspect, the second possible implementation of the first aspect, the third possible implementation of the first aspect, the fourth possible implementation of the first aspect, the fifth possible implementation of the first aspect, or the sixth possible implementation of the first aspect, in an eighth possible implementation of the first aspect, a time-frequency resource in the first pattern is a part of a time-frequency resource in the fourth pattern, where the fourth pattern is a time-frequency distribution pattern, used when the first precoding weight and the second precoding weight are different, of the first reference signal in the first time unit.

With reference to the first possible implementation of the first aspect, the second possible implementation of the first aspect, the third possible implementation of the first aspect, the fourth possible implementation of the first aspect, the fifth possible implementation of the first aspect, the sixth possible implementation of the first aspect, the seventh possible implementation of the first aspect, or the eighth possible implementation of the first aspect, in a ninth possible implementation of the first aspect, the method further includes: receiving, by the first network device, configuration information, where the configuration information is used to indicate whether the first precoding weight and the second precoding weight are the same.

According to a second aspect, this application provides a reference signal sending method, where the method includes: when a first precoding weight of a first reference signal and a second precoding weight of a second reference signal are the same, sending, by a second network device, the first reference signal in a first time unit according to a first pattern, where the first reference signal is a reference signal for channel measurement; and sending, by the second network device, the second reference signal in a second time unit according to a second pattern, where the second reference signal is a reference signal for demodulation; the first reference signal and the second reference signal are used for channel estimation on a channel in the second time unit; and a quantity of time-frequency resources occupied by the second reference signal in the second pattern is less than a quantity of time-frequency resources occupied by the second reference signal in a third pattern, where the third pattern is a time-frequency distribution pattern, used when the first precoding weight and the second precoding weight are different, of the second reference signal in the second time unit.

According to the reference signal sending method provided in this application, when the first precoding weight and the second precoding weight are the same, the second network device sends the first reference signal in the first time unit according to the first pattern and sends the second reference signal in the second time unit according to the second pattern. This resolves a problem that radio resource overheads are increased and a throughput of a communications system is reduced because more resources are used to send reference signals to obtain a better channel estimation effect, optimizes a channel estimation effect, reduces the radio resource overheads, and improves performance of the communications system.

For a first possible implementation to an eighth possible implementation of the second aspect, refer to the first possible implementation to the eighth possible implementation of the first aspect.

With reference to the first possible implementation of the second aspect, the second possible implementation of the second aspect, the third possible implementation of the second aspect, the fourth possible implementation of the second aspect, the fifth possible implementation of the second aspect, the sixth possible implementation of the second aspect, the seventh possible implementation of the second aspect, or the eighth possible implementation of the second aspect, in a ninth possible implementation of the second aspect, the method further includes: sending, by the second network device, configuration information to the first network device, where the configuration information is used to indicate whether the first precoding weight and the second precoding weight are the same.

According to a third aspect, this application provides a channel estimation apparatus, where the channel estimation apparatus includes at least one unit, and the at least one unit is configured to implement the channel estimation method according to any one of the first aspect or possible implementations of the first aspect.

According to a fourth aspect, this application provides a reference signal sending apparatus, where the reference signal sending apparatus includes at least one unit, and the at least one unit is configured to implement the reference signal sending method according to any one of the second aspect or possible implementations of the second aspect.

According to a fifth aspect, this application provides a first network device, where the first network device includes a processor, a memory, and a communications component. The processor is configured to store one or more instructions, and the instruction is indicated to be executed by the processor. The processor is configured to implement the channel estimation method according to any one of the first aspect or possible implementations of the first aspect. The communications component is configured to receive and demodulate a reference signal.

According to a sixth aspect, this application provides a second network device, where the second network device includes a processor, a memory, and a communications component. The processor is configured to store one or more instructions, and the instruction is indicated to be executed by the processor. The processor is configured to implement the reference signal sending method according to any one of the second aspect or possible implementations of the second aspect. The communications component is configured to send a reference signal.

According to a seventh aspect, this application provides a channel estimation apparatus. The apparatus includes a processor and a memory. The memory stores at least one instruction, at least one program, a code set, or an instruction set, and the at least one instruction, the at least one program, the code set, or the instruction set is loaded and executed by the processor to implement the channel estimation method in the first aspect.

According to an eighth aspect, this application provides a computer-readable storage medium. The storage medium stores at least one instruction, at least one program, a code set, or an instruction set, and the at least one instruction, the at least one program, the code set, or the instruction set is loaded and executed by a processor to implement the channel estimation method in the first aspect.

According to a ninth aspect, this application provides a reference signal sending apparatus. The apparatus includes a processor and a memory. The memory stores at least one instruction, at least one program, a code set, or an instruction set, and the at least one instruction, the at least one program, the code set, or the instruction set is loaded and executed by the processor to implement the reference signal sending method in the second aspect.

According to a tenth aspect, this application provides a computer-readable storage medium. The storage medium stores at least one instruction, at least one program, a code set, or an instruction set, and the at least one instruction, the at least one program, the code set, or the instruction set is loaded and executed by a processor to implement the reference signal sending method in the second aspect.

When the first precoding weight and the second precoding weight are the same, the second network device sends the first reference signal in the first time unit according to the first pattern and sends the second reference signal in the second time unit according to the second pattern. When the first network device determines that the first precoding weight and the second precoding weight are the same, the first network device receives the first reference signal and the second reference signal in different time units according to different patterns, and then performs joint channel estimation on the channel in the second time unit based on the first reference signal and the second reference signal. Because the resources occupied by the first reference signal and the second reference signal that are received according to the first pattern and the second pattern respectively are fewer than the resources occupied by the third pattern and the fourth pattern used when joint channel estimation is not performed, the throughput of the communications system can be ensured while the channel estimation effect is optimized, the radio resource overheads are reduced, and the performance of the communications system is improved.

BRIEF DESCRIPTION OF DRAWINGS

FIG. 7*j* is a schematic diagram of a second pattern according to an embodiment of this application;

FIG. 7*k* is a schematic diagram of a second pattern according to an embodiment of this application;

FIG. 7*l* is a schematic diagram of a second pattern according to an embodiment of this application;

FIG. 7*m* is a schematic diagram of a second pattern according to an embodiment of this application;

FIG. 7*n* is a schematic diagram of a second pattern according to an embodiment of this application;

FIG. 7*o* is a schematic diagram of a reference signal spreading manner according to an embodiment of this application;

FIG. 7*p* is a schematic diagram of a reference signal spreading manner according to an embodiment of this application;

FIG. 7*q* is a schematic diagram of a reference signal spreading manner according to an embodiment of this application;

FIG. 8*a* is a schematic diagram of a second pattern according to an embodiment of this application;

FIG. 8*b* is a schematic diagram of a second pattern according to an embodiment of this application;

FIG. 8*c* is a schematic diagram of a second pattern according to an embodiment of this application;

FIG. 8*d* is a schematic diagram of a second pattern according to an embodiment of this application;

FIG. 8*e* is a schematic diagram of a second pattern according to an embodiment of this application;

FIG. 8*f* is a schematic diagram of a second pattern according to an embodiment of this application;

FIG. 8*g* is a schematic diagram of a second pattern according to an embodiment of this application;

FIG. 8*h* is a schematic diagram of a second pattern according to an embodiment of this application;

FIG. 8*i* is a schematic diagram of a second pattern according to an embodiment of this application;

FIG. 8*j* is a schematic diagram of a second pattern according to an embodiment of this application;

FIG. 8*k* is a schematic diagram of a second pattern according to an embodiment of this application;

FIG. 8*l* is a schematic diagram of a second pattern according to an embodiment of this application;

FIG. 8*m* is a schematic diagram of a second pattern according to an embodiment of this application;

FIG. 8*n* is a schematic diagram of a second pattern according to an embodiment of this application;

FIG. 8*o* is a schematic diagram of a reference signal spreading manner according to an embodiment of this application;

FIG. 8*p* is a schematic diagram of a reference signal spreading manner according to an embodiment of this application;

FIG. 9Y is a schematic diagram of a first pattern according to an embodiment of this application;

FIG. 9Z is a schematic diagram of a first pattern according to an embodiment of this application;

FIG. 9c is a schematic diagram of a reference signal spreading manner according to an embodiment of this application;

FIG. 9d is a schematic diagram of a reference signal spreading manner according to an embodiment of this application;

FIG. 9e is a schematic diagram of a reference signal spreading manner according to an embodiment of this application;

FIG. 9f is a schematic diagram of a reference signal spreading manner according to an embodiment of this application;

FIG. 10A is a schematic diagram of a first pattern according to an embodiment of this application;

FIG. 10B is a schematic diagram of a first pattern according to an embodiment of this application;

FIG. 10C is a schematic diagram of a first pattern according to an embodiment of this application;

FIG. 10D is a schematic diagram of a first pattern according to an embodiment of this application;

Figure 10A:
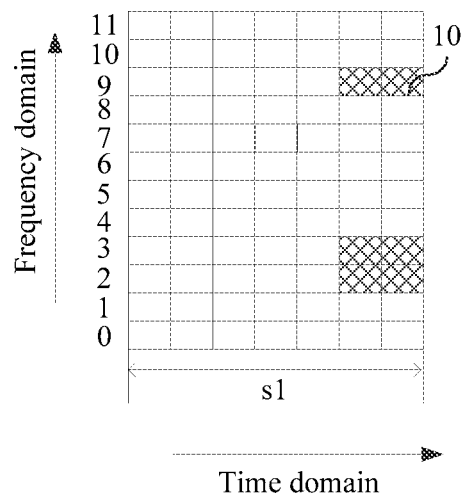
Figure 10B:
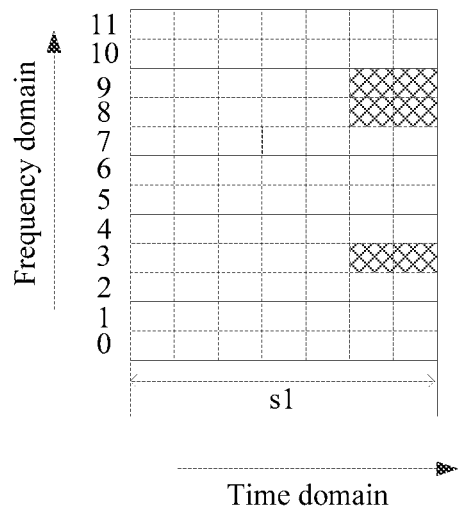
Figure 10C:
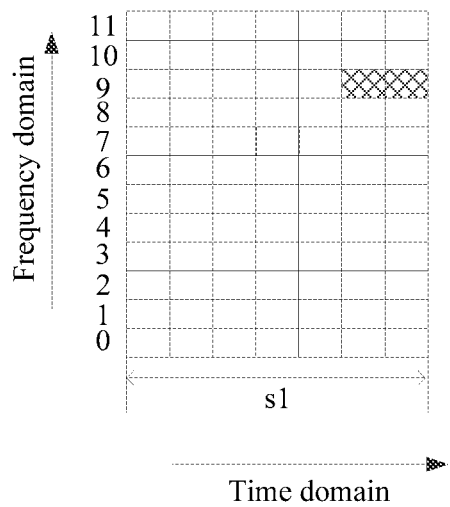
Figure 10D:
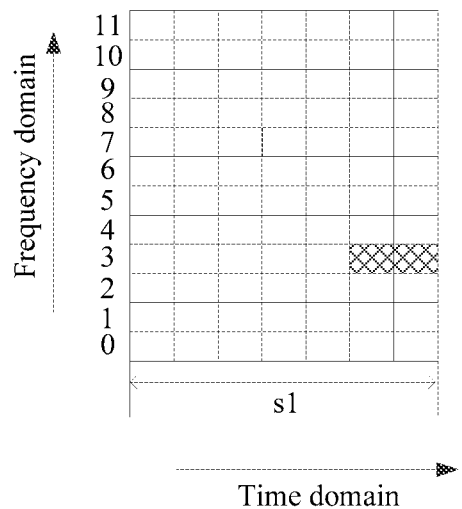
Figure 10E:
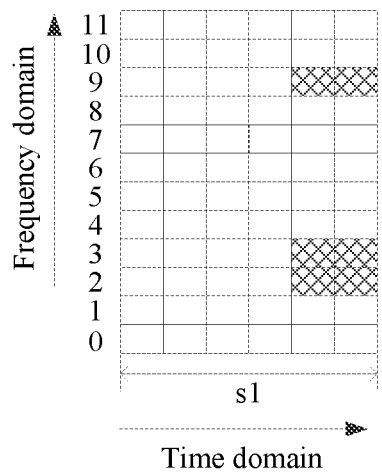
Figure 10F:
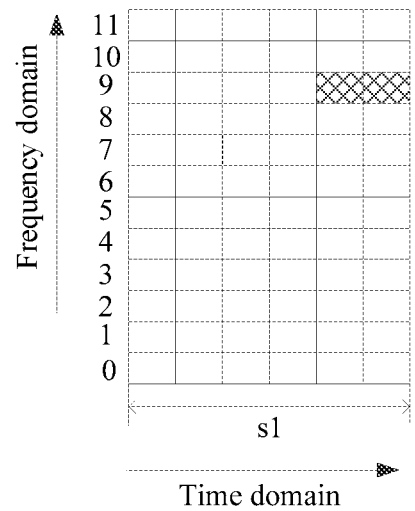
Figure 10G:
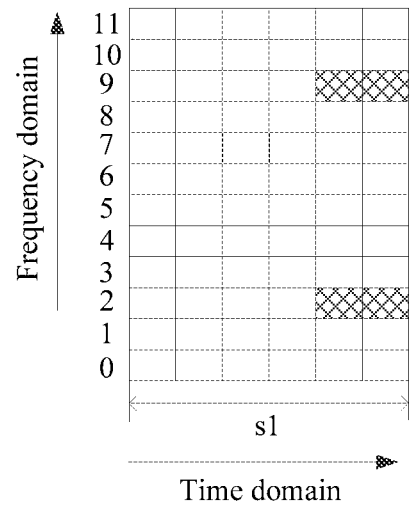
Figure 10H:
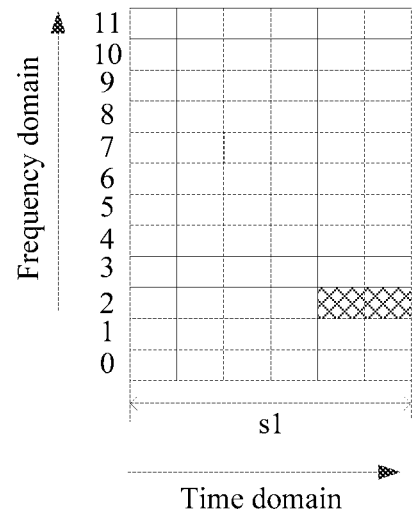
Figure 11A:
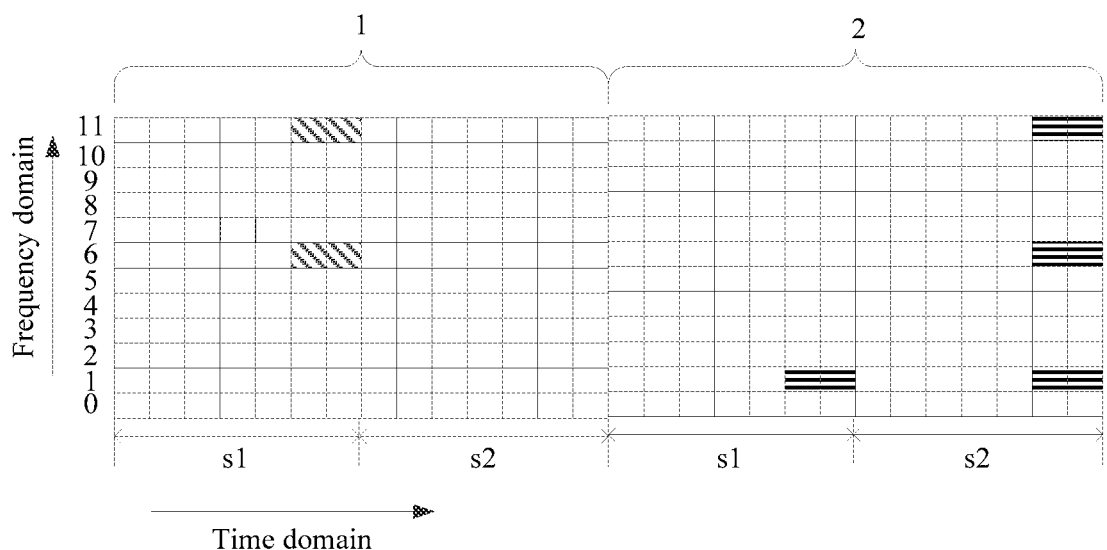
Figure 11B:
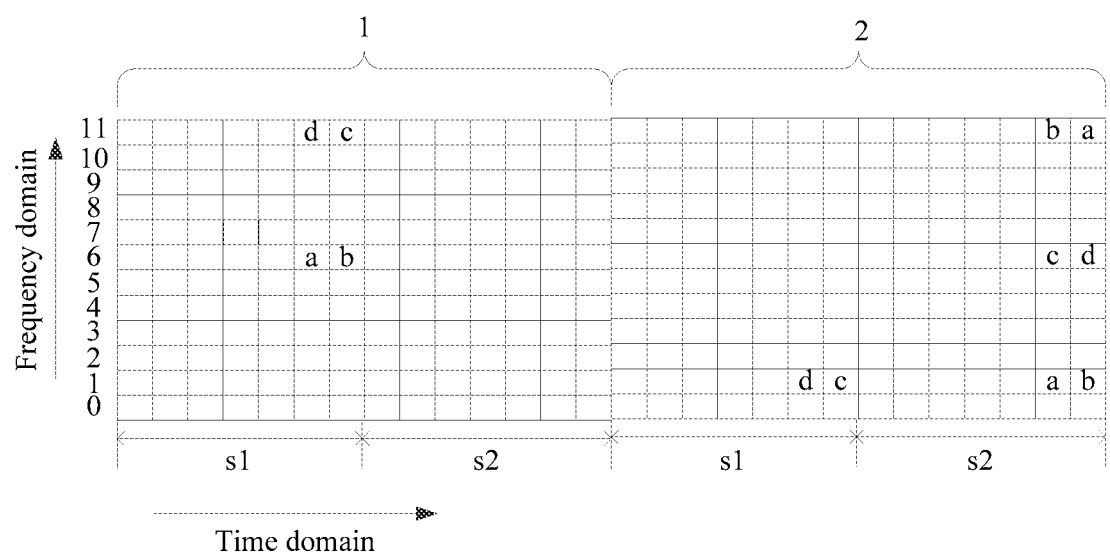
Figure 12:
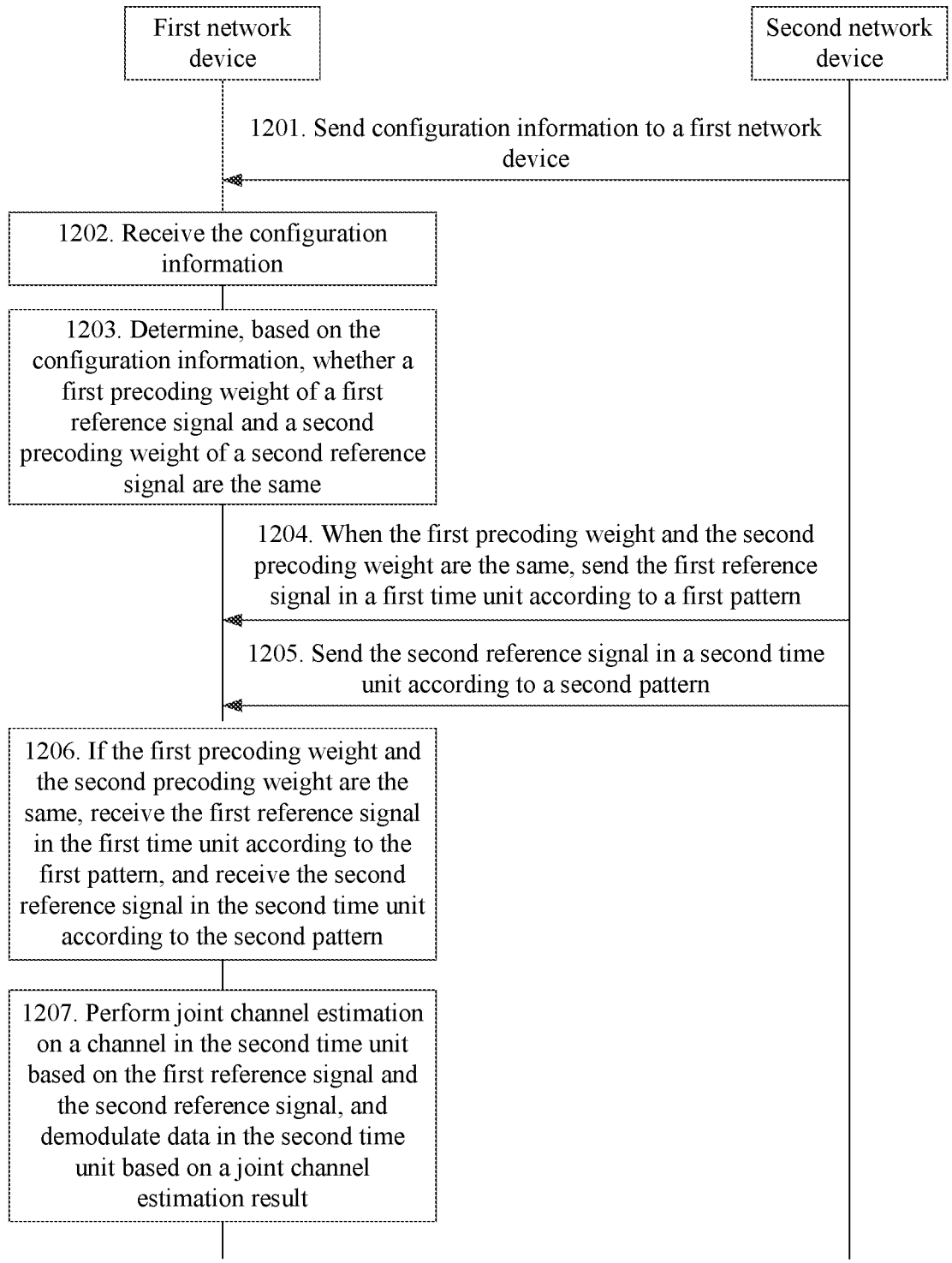
Figure 13:
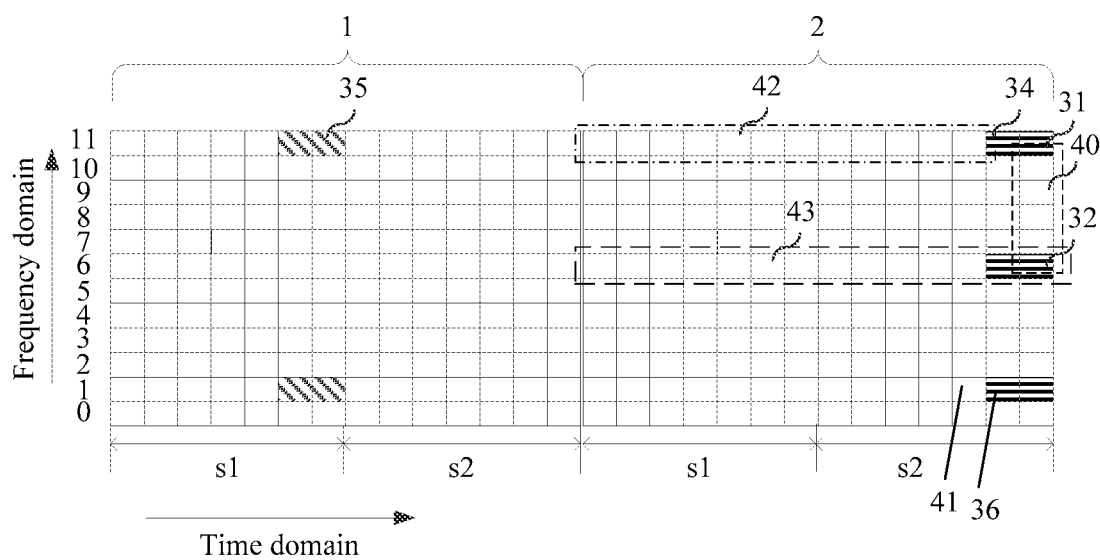
Figure 14:
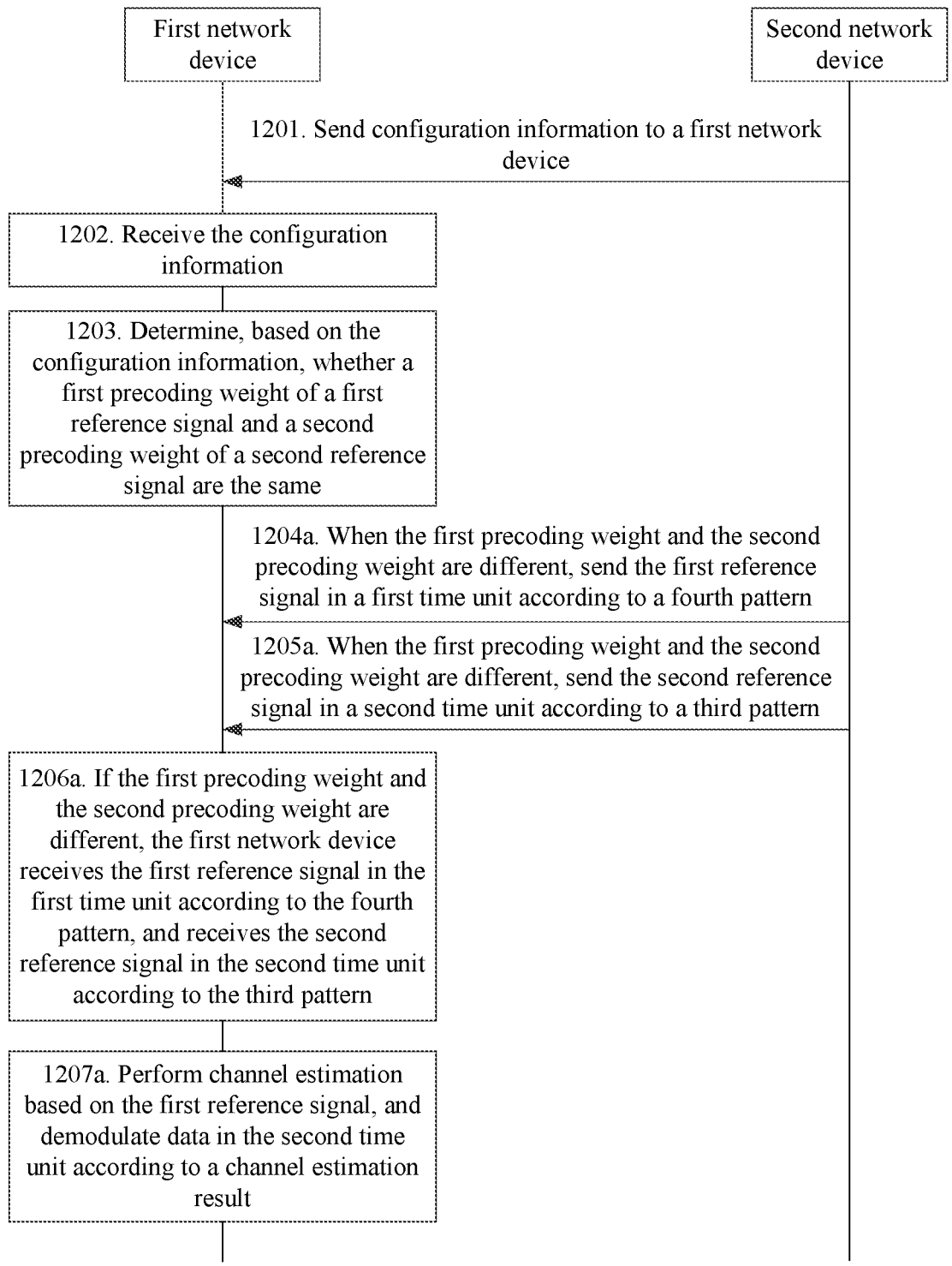
Figure 15:
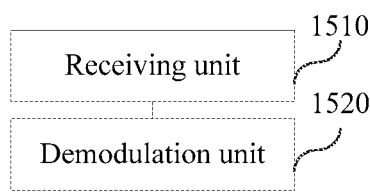
Figure 16:
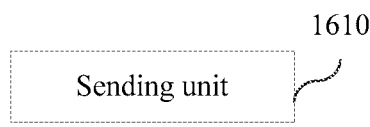

FIG. 10E is a schematic diagram of a first pattern according to an embodiment of this application;

FIG. 10F is a schematic diagram of a first pattern according to an embodiment of this application;

FIG. 10G is a schematic diagram of a first pattern according to an embodiment of this application;

FIG. 10H is a schematic diagram of a first pattern according to an embodiment of this application;

FIG. 11A is a schematic diagram of reference signal distribution according to an embodiment of this application;

FIG. 11B is a schematic diagram of a reference signal spreading manner according to an embodiment of this application;

FIG. 12 is a flowchart of a channel estimation method according to another embodiment of this application;

FIG. 13 is a schematic diagram of implementation of a channel estimation method according to another embodiment of this application;

FIG. 14 is a flowchart of a channel estimation method according to another embodiment of this application;

FIG. 15 is a block diagram of a channel estimation apparatus according to an embodiment of this application; and FIG. 16 is a block diagram of a reference signal sending apparatus according to an embodiment of this application.

DESCRIPTION OF EMBODIMENTS

To make the objectives, technical solutions, and advantages of this application clearer, the following further describes the implementations of this application in detail with reference to the accompanying drawings.

A "module" mentioned in this specification is a program or an instruction that is stored in a memory and that can implement some functions. A "unit" mentioned in this specification is a functional structure divided according to logic. The "unit" may be implemented by only hardware, or implemented by a combination of software and hardware.

In this specification, "a plurality of" refers to two or more than two. The term "and/or" describes an association relationship for describing associated objects and represents that three relationships may exist. For example, A and/or B may represent the following three cases: Only A exists, both A and B exist, and only B exists. The character "/" generally indicates an "or" relationship between the associated objects.

Figure 1:
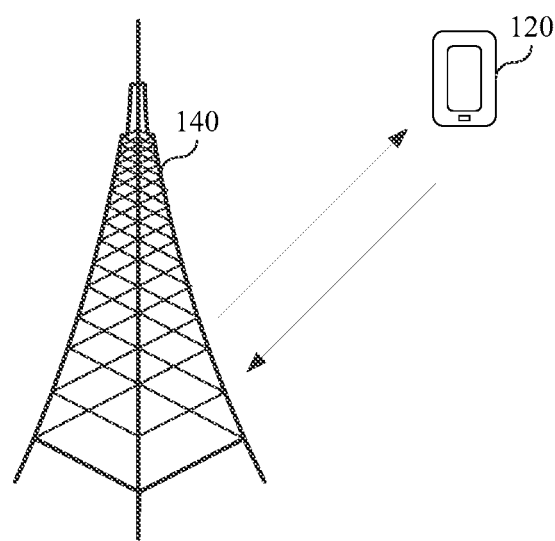
FIG. 1 is a schematic structural diagram of a channel estimation system according to an embodiment of this application.

FIG. 1 is a schematic structural diagram of a channel estimation system according to an example embodiment of this application. The channel estimation system includes a first network device 120 and a second network device 140.

The first network device 120 has capabilities of receiving a reference signal and sending feedback data. Optionally, the first network device 120 is a terminal device in a mobile communications system. Optionally, the first network device 120 may be a user terminal, a user device, or user equipment UE), for example, a mobile phone, a tablet computer, and a smart appliance.

The second network device 140 has capabilities of sending a reference signal and receiving feedback data. Optionally, the second network device 140 is an access network device in the mobile communications system. Optionally, the access network device is a base transceiver station (BTS) in a Global System for Mobile Communications (GSM) or Code Division Multiple Access (CDMA). Optionally, the access network device is a NodeB (English: NodeB) in a Universal Mobile Telecommunications System (English: Universal Mobile Telecommunications System, UMTS for short). Optionally, the access network device is an evolved NodeB (evolutional Node B, eNB or e-NodeB for short) in a Long Term Evolution (LTE) or fifth generation mobile communications (5-Generation, 5G) technology.

The first network device 120 and the second network device 140 communicate with each other by using a wireless carrier.

Optionally, a reference signal transceiver system shown in FIG. 1 may include a plurality of first network devices 120 and/or a plurality of second network devices 140, and one second network device 140 may communicate with a plurality of first network devices 120. FIG. 1 shows only one first network device 120 and one second network device 140 as an example for description. This is not limited in this embodiment.

Figure 2:
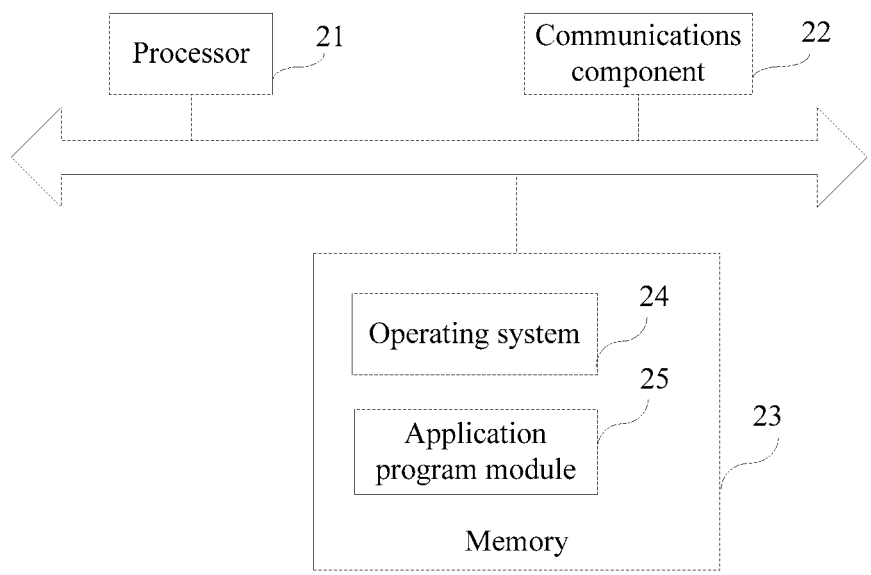
FIG. 2 is a schematic structural diagram of a first network device according to an embodiment of this application.

FIG. 2 is a schematic structural diagram of a first network device according to an example embodiment of this application. The first network device includes a processor 21, a communications component 22, and a memory 23.

The processor 21 includes one or more processing cores, and the processor 21 runs a software program and a module, to execute various functional applications and process information.

The communications component 22 includes a receiver and a transmitter. The communications component 22 may alternatively be a communications chip. The communications chip may include a receiving module, a transmission module, a modulation/demodulation module, and the like, and is configured to modulate or demodulate information, and receive or send the information by using a wireless signal.

The memory 23 is connected to the processor 21.

The memory 23 may be configured to store a software program and a module. The memory may store an operating system 24 and an application program module 25 required by at least one function.

The application program module 25 may include a determining module and a demodulation module. The determining module is configured to determine whether a first precoding weight of a first reference signal and a second precoding weight of a second reference signal are the same. The demodulation module is configured to: perform channel estimation on a channel in a second time unit based on the first reference signal and the second reference signal, and demodulate data in the second time unit based on a channel estimation result.

In addition, the memory 23 may be implemented by any type of volatile or non-volatile storage device or a combination thereof, for example, a static random access memory (English: static random access memory, SRAM for short), an electrically erasable programmable read-only memory (EEPROM), an erasable programmable read-only memory (EPROM), a programmable read-only memory (PROM), a read-only memory (ROM), a magnetic memory, a flash memory, a magnetic disk, or an optical disc.

The processor 21 receives the first reference signal in a first time unit according to a first pattern by using the communications component 22, and receives the second reference signal in the second time unit according to a second pattern by using the communications component 22. Alternatively, the processor 21 receives the first reference signal in a first time unit according to a fourth pattern by using the communications component 22, and receives the second reference signal in the second time unit according to a third pattern by using the communications component 22. Alternatively, the processor 21 performs channel estimation on the channel in the second time unit based on the first reference signal and the second reference signal by executing the demodulation module in the memory 23.

A person skilled in the art may understand that a structure of the first network device shown in FIG. 2 does not constitute any limitation on the first network device, and may include components more or fewer than those shown in the figure, or a combination of some components, or components disposed differently.

Figure 3:
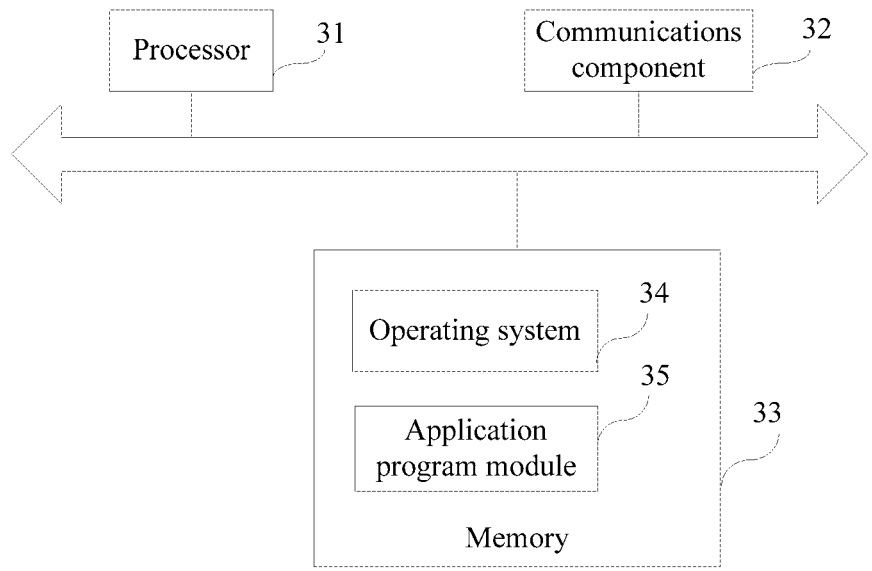
FIG. 3 is a schematic structural diagram of a second network device according to an embodiment of this application.

FIG. 3 is a schematic structural diagram of a second network device according to an example embodiment of this application. The sending device includes a processor 31, a communications component 32, and a memory 33.

The processor 31 includes one or more processing cores, and the processor 31 runs a software program and a module, to execute various functional applications and process information.

The communications component 32 includes a receiver and a transmitter. The communications component 32 may alternatively be a communications chip. The communications chip may include a receiving module, a transmission module, a modulation/demodulation module, and the like, and is configured to modulate or demodulate information, and receive or send the information by using a wireless signal.

The memory 33 is connected to the processor 31.

The memory 33 may be configured to store a software program and a module. The memory may store an operating system 34 and an application program module 35 required by at least one function.

In addition, the memory 33 may be implemented by any type of volatile or non-volatile storage device or a combination thereof, for example, a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk, or an optical disc.

The processor 31 sends a first reference signal in a first time unit according to a first pattern by using the communications component 32, and sends a second reference signal in a second time unit according to a second pattern by using the communications component 32. Alternatively, the processor 31 sends a first reference signal in a first time unit according to a fourth pattern by using the communications component 32, and sends a second reference signal in a second time unit according to a third pattern by using the communications component 32.

A person skilled in the art may understand that a structure of the second network device shown in FIG. 3 does not constitute any limitation on the second network device, and may include components more or fewer than those shown in the figure, or a combination of some components, or components disposed differently.

It should be understood that a "pattern" may be a time-frequency resource distribution indication, identifying locations of time-frequency resources occupied by some signals within a time-frequency resource range. Regardless of an uplink signal or a downlink signal, both user equipment and a network device can determine, according to a pattern, to receive or send a signal in a time-frequency location. The pattern may be represented by code, and may be preconfigured, or may be pre-stored in a processor, a memory, or a storage unit, and is represented between different network devices or terminals by using a sequence number or an index.

In the reference signal transceiver system shown in FIG. 1, the first reference signal is a reference signal for channel measurement, and the second reference signal is a reference signal for demodulation. Optionally, the first reference signal is a channel state information-reference signal (CSI-RS) or a cell-specific reference signal (CRS). Optionally, the second reference signal is a demodulation reference signal (DMRS). In the embodiments of this application, an example in which the first reference signal is a CSI-RS and the second reference signal is a DMRS is used for description.

Optionally, the first time unit is a subframe, the second time unit is another subframe, and one subframe includes a first slot and a second slot.

It should be noted that the first time unit may be referred to as a time unit and the second time unit may also be referred to as a time unit.

Optionally, in time domain, the first time unit is a slot, where the slot occupies a plurality of orthogonal frequency division multiplexing (OFDM) symbols, and the second time unit is another slot, where the another slot occupies a plurality of OFDM symbols; or the first time unit is a time unit including two OFDM symbols; and the second time unit is a time unit including two OFDM symbols; or the first time unit is a time unit including three or four OFDM symbols, and the second time unit is another time unit including three or four OFDM symbols. In other words, a time unit is a slot including a plurality of OFDM symbols, a time unit including two OFDM symbols, or a time unit including three or four OFDM symbols. It should be understood that, that the first time unit includes a plurality of OFDM symbols may mean that time occupied by a time unit is time occupied by a plurality of OFDM symbols.

In time-frequency domain, one physical resource block is corresponding to one slot, and one physical resource block pair is corresponding to two slots. One physical resource block occupies a plurality of OFDM symbols in time domain, and occupies 12 contiguous subcarriers in frequency domain, or in other words, one physical resource block is represented by using a plurality of OFDM symbols in time domain and 12 contiguous subcarriers in frequency domain. It should be understood that the 12 contiguous subcarriers herein are used as an example for description. It is assumed that a quantity of the plurality of OFDM symbols is m. In a case of a normal cyclic prefix, one physical resource block occupies seven OFDM symbols in a time domain dimension, and occupies 12 contiguous subcarriers in a frequency domain dimension, that is, m=7. In a case of an extended cyclic prefix, one physical resource block occupies six OFDM symbols in the time domain dimension, and occupies 12 contiguous subcarriers in the frequency domain dimension, that is, m=6.

It should be noted that, when a time unit is a time unit including three or four OFDM symbols, in the case of the normal cyclic prefix, seven OFDM symbols occupied by one physical resource block in the time domain dimension are sequentially divided into three OFDM symbols and four OFDM symbols, and 14 OFDM symbols occupied by one physical resource block pair in the time domain dimension are sequentially divided into three OFDM symbols, four OFDM symbols, three OFDM symbols, and four OFDM symbols.

Optionally, the third pattern is a time-frequency distribution pattern, used when the first precoding weight of the first reference signal and the second precoding weight of the second reference signal are different, of the second reference signal in the second time unit. In other words, the third pattern is a time-frequency distribution pattern, used when the second reference signal is not used in joint channel estimation, of the second reference signal in the second time unit, or the third pattern is a time-frequency distribution pattern, used when the first reference signal does not exist in the first time unit and the second reference signal exists in the second time unit, of the second reference signal in the second time unit.

When a density of time-frequency resources, used for transmitting second reference signals, in the third pattern is 12 time-frequency resources per physical resource block pair, in the third pattern, the second reference signals occupy last two symbols of each slot of a subframe in the time domain dimension, and occupy, in the frequency domain dimension, a subcarrier X, a subcarrier Y, and a subcarrier Z that appear at an interval. The density of the time-frequency resources used for transmitting the second reference signals is equal to a ratio of a quantity of time-frequency resources, used for transmitting the second reference signals, in one physical resource block pair to a total quantity of time-frequency resources in one physical resource block pair.

Optionally, X is an integer greater than or equal to 0 and less than or equal to 11, Y is an integer greater than or equal to 0 and less than or equal to 11, and Z is an integer greater than or equal to 0 and less than or equal to 11.

Figure 4A:
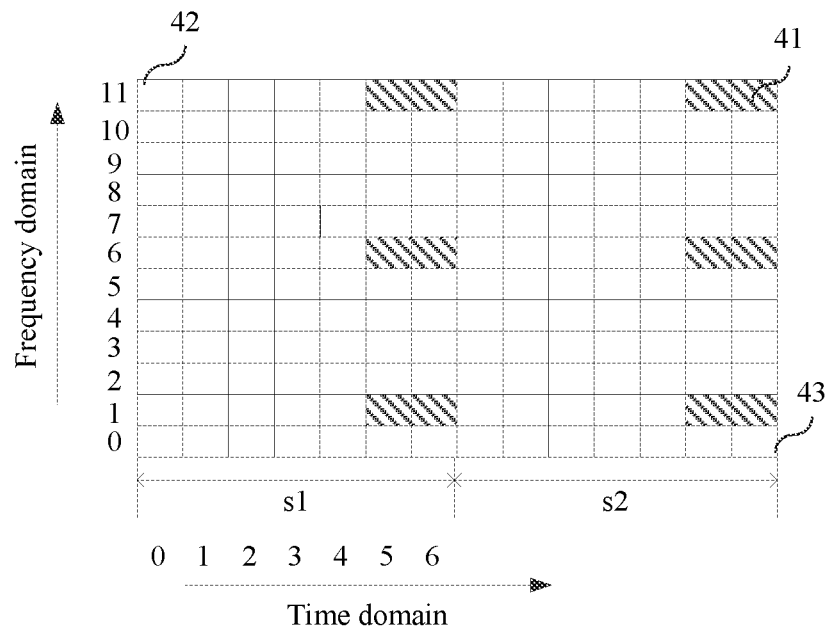
FIG. 4A is a schematic diagram of a third pattern according to an embodiment of this application.

Because the second reference signal is a DMRS, the third pattern is shown in FIG. 4A in the case of a normal cyclic prefix. In the figure, two physical resource blocks, namely a physical resource block pair, are corresponding to a slot s1 and a slot s2, respectively. Each physical resource block occupies seven OFDM symbols 42 in a time domain dimension, and occupies 12 subcarriers 43 in a frequency domain dimension. A total of 12 DMRSs 41 are distributed on the physical resource block pair. Specific distribution is as follows: In the time domain dimension, from left to right, the DMRSs 41 occupy last two OFDM symbols 42 of the slot s1 and the slot s2. In the frequency domain dimension, from bottom to top, the DMRSs 41 occupy a subcarrier 1, a subcarrier 6, and a subcarrier 11. That a DMRS occupies a symbol means that the DMRS is transmitted on a time-frequency resource corresponding to the symbol, and that a DMRS occupies a subcarrier means that the DMRS is transmitted on a time-frequency resource corresponding to the subcarrier.

Figure 4B:
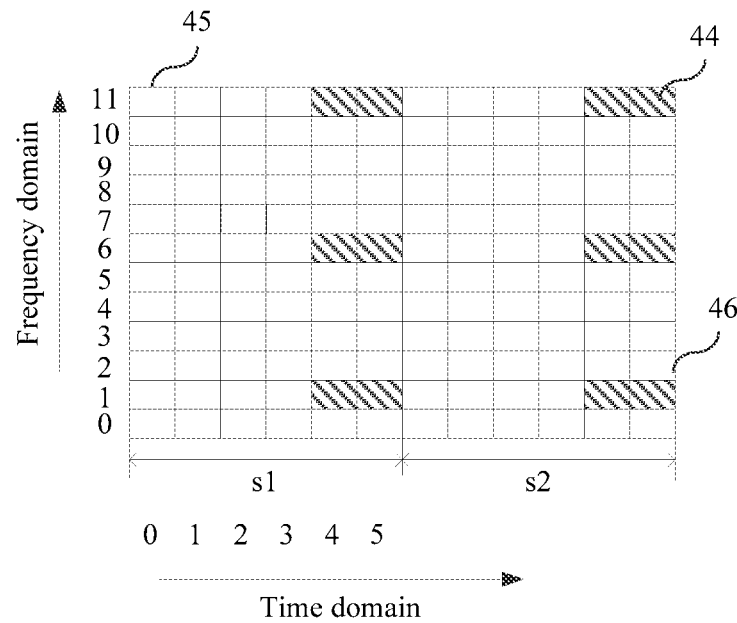
FIG. 4B is a schematic diagram of a third pattern according to an embodiment of this application.

In the case of an extended cyclic prefix, the third pattern is shown in FIG. 4B. In the figure, two physical resource blocks, namely a physical resource block pair, are corresponding to a slot s1 and a slot s2, respectively. Each physical resource block occupies six OFDM symbols 45 in a time domain dimension, and occupies 12 subcarriers 46 in a frequency domain dimension. A total of 12 DMRSs 44 are distributed on the physical resource block pair. Specific distribution is as follows: In the time domain dimension, from left to right, the DMRSs 44 occupy last two OFDM symbols 45 of the slot s1 and the slot s2. In the frequency domain dimension, from bottom to top, the DMRSs 44 occupy a subcarrier 1, a subcarrier 6, and a subcarrier 11.

When a density of time-frequency resources, used for transmitting second reference signals, in the third pattern is 24 time-frequency resources per physical resource block pair, the second reference signals are divided into two code division multiplexing (CDM) groups in the third pattern. The two groups of second reference signals each occupy last two symbols of each slot of a subframe in a time domain dimension. A first group of second reference signals occupies, in a frequency domain dimension, a subcarrier X, a subcarrier Y, and a subcarrier Z that appear at an interval, and a second group of second reference signals occupies, in the frequency domain dimension, a subcarrier X+1, a subcarrier Y+1, and a subcarrier Z+1 that appear at an interval.

The first group of second reference signals occupies the subcarrier X, the subcarrier Y, and the subcarrier Z, and the second group of second reference signals occupies the subcarrier X+1, the subcarrier Y+1, and the subcarrier Z+1.

Figure 4C:
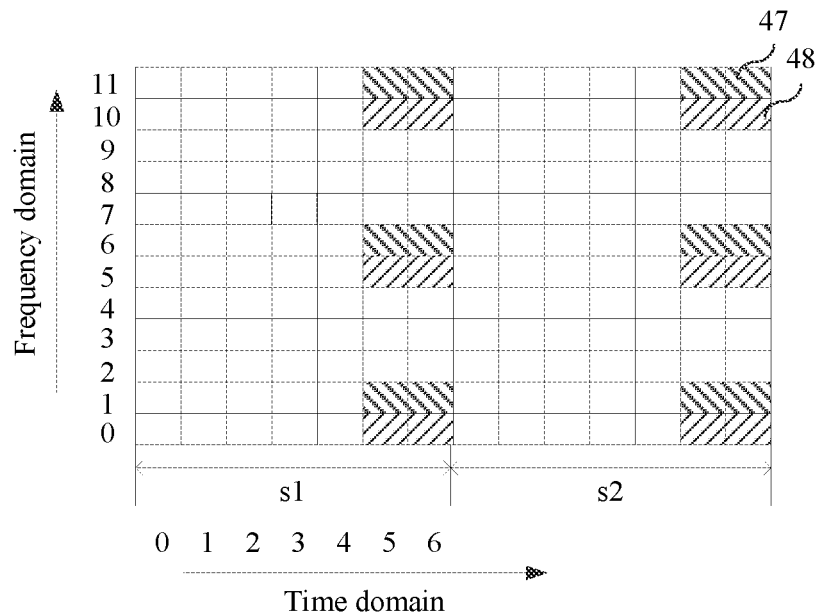
FIG. 4C is a schematic diagram of a third pattern according to an embodiment of this application.

Because the second reference signal is a DMRS, the third pattern is shown in FIG. 4C in the case of a normal cyclic prefix. In the figure, two physical resource blocks, namely a physical resource block pair, are corresponding to a slot s1 and a slot s2, respectively. Each physical resource block occupies seven OFDM symbols in a time domain dimension, and occupies 12 subcarriers in a frequency domain dimension. A total of 24 DMRSs are distributed on the physical resource block pair. Specific distribution is as follows: In the time domain dimension, from left to right, a first group of DMRSs 48 and a second group of DMRSs 47 each occupy last two OFDM symbols of each slot of a subframe. In the frequency domain dimension, from bottom to top, the first group of DMRSs 48 occupies a subcarrier 0, a subcarrier 5, and a subcarrier 10, and the second group of DMRSs 47 occupies a subcarrier 1, a subcarrier 6, and a subcarrier 11.

Figure 4D:
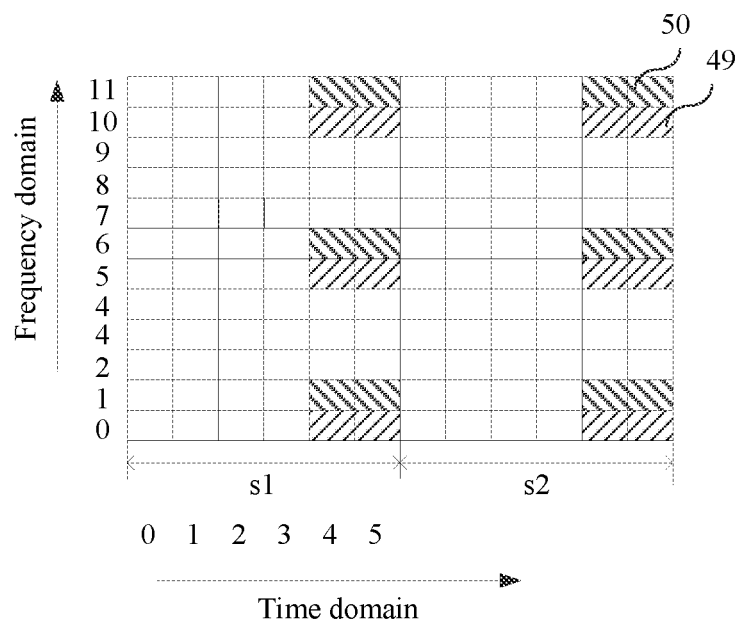
FIG. 4D is a schematic diagram of a third pattern according to an embodiment of this application.

In the case of an extended cyclic prefix, the third pattern is shown in FIG. 4D. In the figure, two physical resource blocks, namely a physical resource block pair, are corresponding to a slot s1 and a slot s2, respectively. Each physical resource block occupies six OFDM symbols in a time domain dimension, and occupies 12 subcarriers in a frequency domain dimension. A total of 24 DMRSs are distributed on the physical resource block pair. Specific distribution is as follows: In the time domain dimension, from left to right, a first group of DMRSs 49 and a second group of DMRSs 50 each occupy last two OFDM symbols of each slot of a subframe. In the frequency domain dimension, from bottom to top, the first group of DMRSs 49 occupies a subcarrier 0, a subcarrier 5, and a subcarrier 10, and the second group of DMRSs 50 occupies a subcarrier 1, a subcarrier 6, and a subcarrier 11.

The fourth pattern is a time-frequency distribution pattern, used when the first precoding weight of the first reference signal and the second precoding weight of the second reference signal are different, of the first reference signal in the first time unit. In other words, the fourth pattern is a time-domain distribution pattern, used when the first reference signal is not used in joint channel estimation, of the first reference signal in the first time unit, or the fourth pattern is a time-frequency distribution pattern, used when the first reference signal exists in the first time unit and the second reference signal does not exist in the second time unit, of the first reference signal in the first time unit.

In a pattern portion, belongs to the first slot, of the fourth pattern, first reference signals occupy last two symbols of the first slot in the time domain dimension, and the first reference signals occupy at least one of a subcarrier A, a subcarrier B, a subcarrier C, or a subcarrier D in the frequency domain dimension.

For example, the first reference signal is a CSI-RS. In one physical resource block pair, a quantity of time-frequency resources occupied by the CSI-RS depends on configuration of the CSI-RS. In one physical resource block pair, the quantity of time-frequency resources occupied by the CSI-RS is 1, 2, 4 or 8. When the quantity of time-frequency resources occupied by the CSI-RS is 1 or 2, there are 20 occupation manners. When the quantity of time-frequency resources occupied by the CSI-RS is 4, there are 10 occupation manners. When the quantity of time-frequency resources occupied by the CSI-RS is 8, there are five occupation manners.

For example, the quantity of time-frequency resources occupied by the CSI-RS in one physical resource block pair is 8 and the time-frequency resources occupied by the CSI-RS all belong to a previous physical resource block in the physical resource block pair, or in other words, CSI-RSs occupy only the last two symbols of the first slot in the time domain dimension.

Figure 5A:
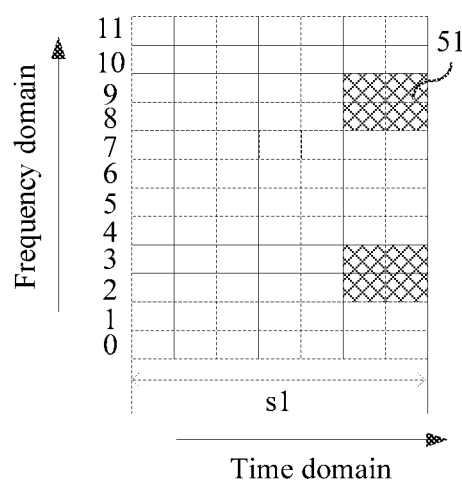
FIG. 5A is a schematic diagram of a fourth pattern according to an embodiment of this application.

In the case of a normal cyclic prefix, FIG. 5A schematically shows a pattern portion, corresponding to the first slot, of the fourth pattern. In the figure, one physical resource block is corresponding to a slot s1, and the physical resource block occupies seven OFDM symbols in a time domain dimension and occupies 12 subcarriers in a frequency domain dimension. A total of eight CSI-RSs 51 are distributed on the physical resource block. Specific distribution is as follows: In the time domain dimension, from left to right, the CSI-RSs 51 occupy last two OFDM symbols of the slot s1. In the frequency domain dimension, from bottom to top, the CSI-RSs 51 occupy a subcarrier 2, a subcarrier 3, a subcarrier 8, and a subcarrier 9.

Figure 5B:
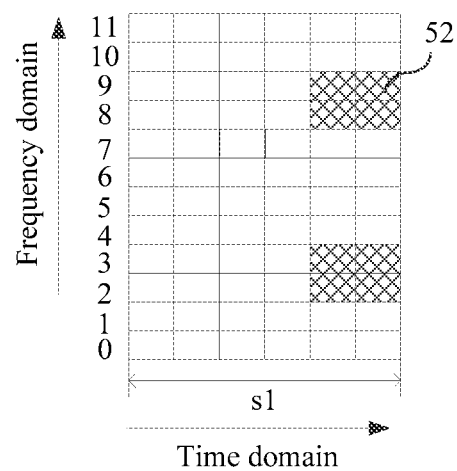
FIG. 5B is a schematic diagram of a fourth pattern according to an embodiment of this application.

In the case of an extended cyclic prefix, FIG. 5B schematically shows a pattern portion, corresponding to the first slot, of the fourth pattern. In the figure, one physical resource block is corresponding to a slot s1, and the physical resource block occupies six OFDM symbols in a time domain dimension and occupies 12 subcarriers in a frequency domain dimension. A total of eight CSI-RSs 52 are distributed on the physical resource block. Specific distribution is as follows: In the time domain dimension, from left to right, the CSI-RSs 52 occupy last two OFDM symbols of the slot s1. In the frequency domain dimension, from bottom to top, the CSI-RSs 52 occupy a subcarrier 2, a subcarrier 3, a subcarrier 8, and a subcarrier 9.

In the pattern portion, corresponding to the first slot, of the fourth pattern, when the quantity of time-frequency resources occupied by the CSI-RS is 1 or 2, the CSI-RSs occupy the last two symbols of the first slot in the time domain dimension, and the CSI-RSs occupy a subcarrier 2, a subcarrier 3, a subcarrier 8, or a subcarrier 9 in the frequency domain dimension. In the pattern portion, corresponding to the first slot, of the fourth pattern, when the quantity of time-frequency resources occupied by the CSI-RS is 4, the CSI-RSs occupy the last two symbols of the first slot in the time domain dimension, and the CSI-RSs occupy any two of a subcarrier 2, a subcarrier 3, a subcarrier 8, and a subcarrier 9 in the frequency domain dimension.

Figure 6:
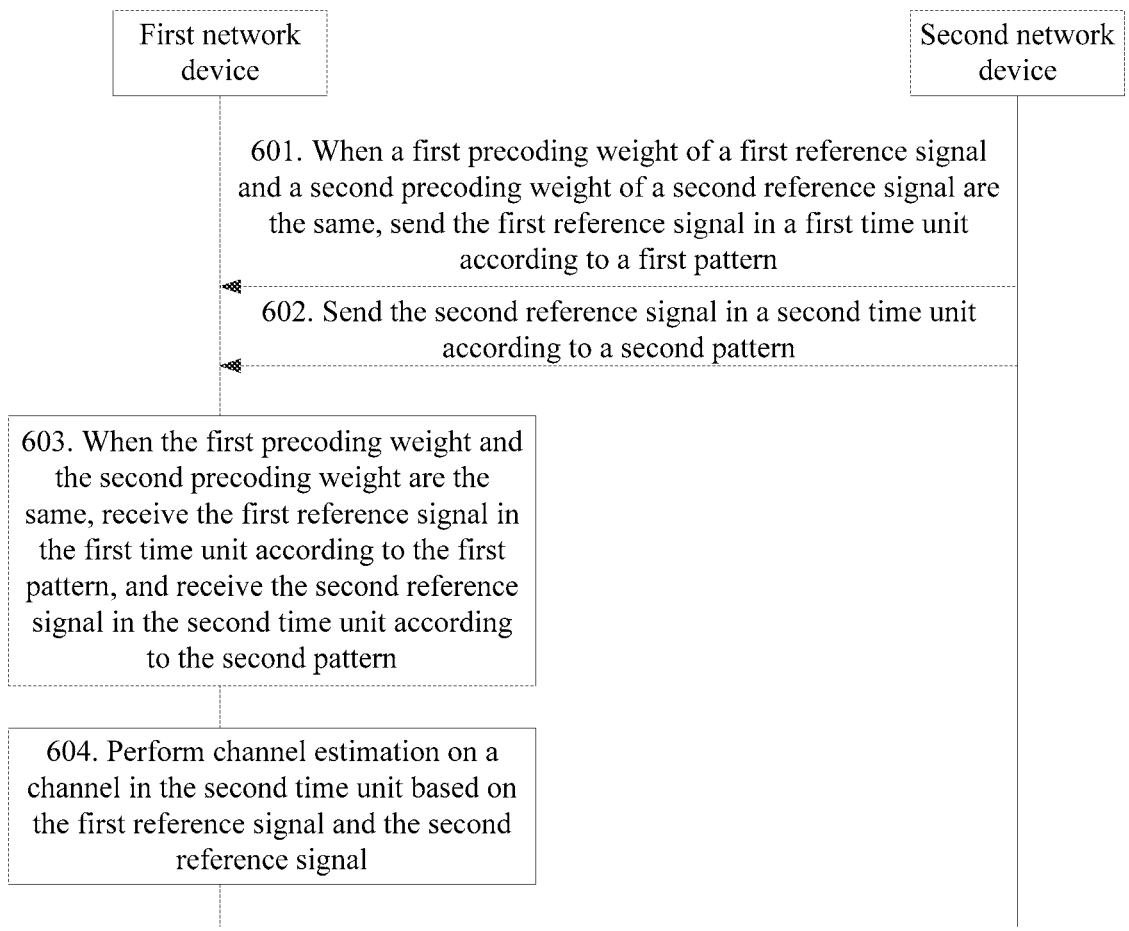
FIG. 6 is a flowchart of a channel estimation method according to an embodiment of this application.

FIG. 6 is a flowchart of a channel estimation method according to an example embodiment of this application. In this embodiment of this application, an example in which the channel estimation method is applied to the implementation environment shown in FIG. 1 is used for description. As shown in FIG. 6, the channel estimation method includes the following steps.

Step 601. When a first precoding weight of a first reference signal and a second precoding weight of a second reference signal are the same, a second network device sends the first reference signal in a first time unit according to a first pattern.

The first reference signal is a reference signal for channel measurement. Optionally, the first reference signal is a CSI-RS or a CRS.

The second reference signal is a reference signal for demodulation. Optionally, the second reference signal is a DMRS.

Step 602. The second network device sends the second reference signal in a second time unit according to a second pattern.

The first reference signal and the second reference signal are used for channel estimation on a channel in the second time unit. The second pattern is different from a third pattern. Under a condition that port quantities or ranks are the same, a quantity of time-frequency resources occupied by the second reference signal in the second pattern is less than a quantity of time-frequency resources occupied by the second reference signal in the third pattern.

The third pattern is a time-frequency distribution pattern, used when the first precoding weight and the second precoding weight are different, of the second reference signal in a time unit, or the third pattern is a time-frequency distribution pattern, used when the first reference signal does not exist in the first time unit and the second reference signal exists in the second time unit, of the second reference signal in the second time unit. The first pattern is a time-frequency distribution pattern, used when the first precoding weight and the second precoding weight are the same, of the first reference signal in the first time unit, and the second pattern is a time-frequency distribution pattern, used when the first precoding weight and the second precoding weight are the same, of the second reference signal in the second time unit.

Optionally, when the first precoding weight and the second precoding weight are the same, the first reference signal and the second reference signal are used for joint channel estimation on the channel in the second time unit.

Step 603. When the first precoding weight and the second precoding weight are the same, a first network device receives the first reference signal in the first time unit according to the first pattern, and receives the second reference signal in the second time unit according to the second pattern.

Before receiving the first reference signal and the second reference signal, the first network device determines whether the first precoding weight and the second precoding weight are the same.

Optionally, the first network device determines, according to a predefined rule or configuration information, whether the first precoding weight and the second precoding weight are the same. The predefined rule is pre-stored in the first network device, and the configuration information is sent by the second network device to the first network device.

Step 604. The first network device performs channel estimation on a channel in the second time unit based on the first reference signal and the second reference signal.

After performing channel estimation on the channel in the second time unit, the first network device demodulates data in the second time unit based on a channel estimation result.

It should be noted that step 601 and step 602 may be implemented separately as a reference signal sending method on a second network device side, and step 603 and step 604 may be implemented separately as a channel estimation method on a first network device side.

In conclusion, according to the channel estimation method provided in this embodiment of this application, when the first precoding weight and the second precoding weight are the same, the second network device sends the first reference signal in the first time unit according to the first pattern and sends the second reference signal in the second time unit according to the second pattern; when determining that the first precoding weight and the second precoding weight are the same, the first network device receives the first reference signal and the second reference signal in different time units according to different patterns, and then performs channel estimation on the channel in the second time unit based on the first reference signal and the second reference signal. Because resources occupied by the first reference signal and the second reference signal that are received according to the first pattern and the second pattern respectively are fewer than resources occupied when the third pattern and a fourth pattern are used, a throughput of a communications system can be ensured while a channel estimation effect is optimized, radio resource overheads are reduced, and performance of the communications system is improved.

Optionally, in the channel estimation method provided in this embodiment of this application, the first time unit is before the second time unit; a time unit is a subframe including a first slot and a second slot, and the time-frequency resource in the second pattern is a part of the time-frequency resource in the third pattern; the second pattern is in the first slot and the second slot, or the second pattern is in one of the first slot and the second slot; and the second pattern is a time-frequency distribution pattern, used when the second reference signal is used in joint channel estimation, of the second reference signal in the second time unit.

When a density of time-frequency resources, used for transmitting second reference signals, namely DMRSs, in the third pattern is 12 time-frequency resources per physical resource block pair, because the time-frequency resource in the second pattern is a part of the time-frequency resource in the third pattern, the second reference signals are distributed in the second pattern in three manners:

(1) In the second pattern, the second reference signals occupy last two symbols of each slot in a time domain dimension, and occupy, in a frequency domain dimension, at least one of a subcarrier X, a subcarrier Y, and a subcarrier Z that appear at an interval. Among the subcarrier X, the subcarrier Y, and the subcarrier Z, at least one subcarrier is a subcarrier occupied when the second reference signal occupies only one slot, or at least one subcarrier is a subcarrier that is not occupied in two slots.

The second reference signals occupy the last two symbols of the first slot and the second slot in the time domain dimension, and occupy the subcarrier X, the subcarrier Y, and the subcarrier Z; the subcarrier X and the carrier Y; the subcarrier X and the subcarrier Z; the subcarrier Y and the subcarrier Z; the subcarrier X; the subcarrier Y; or the subcarrier Z in the frequency domain dimension, where the subcarriers appear at an interval.

Optionally, X is an integer greater than or equal to 0 and less than or equal to 11, Y is an integer greater than or equal to 0 and less than or equal to 11, and Z is an integer greater than or equal to 0 and less than or equal to 11.

Figure 7A:
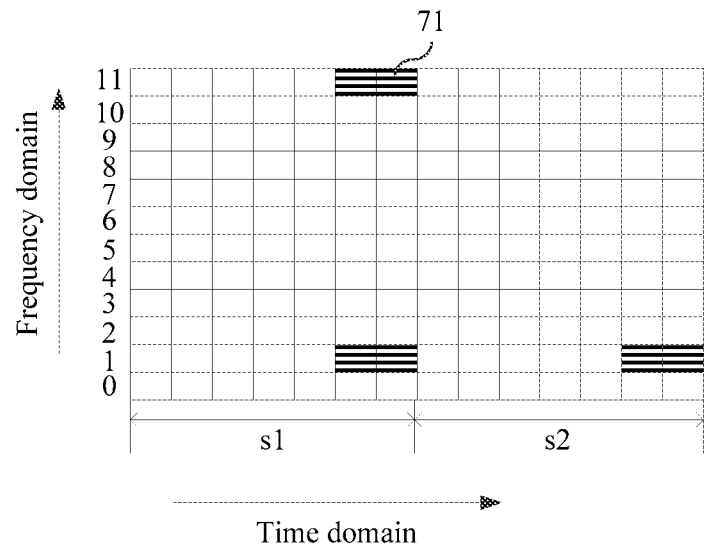
FIG. 7A is a schematic diagram of a second pattern according to an embodiment of this application.

For example, the second reference signal is a DMRS and the second pattern is shown in FIG. 7A in a case of a normal cyclic prefix. In the figure, two physical resource blocks, namely a physical resource block pair, are corresponding to a slot s1 and a slot s2, respectively. Each physical resource block occupies seven OFDM symbols in a time domain dimension, and occupies 12 subcarriers in a frequency domain dimension. Specific distribution of DMRSs 71 in the second pattern is as follows: In the time domain dimension, the DMRSs 71 occupy last two symbols of the first slot and the second slot. In the frequency domain dimension, from bottom to top, the DMRSs 71 occupy a subcarrier 1 and a subcarrier 11. For a subcarrier 1, a subcarrier 6, and a subcarrier 11 that are occupied by DMRSs in the third pattern, in the second pattern shown in FIG. 7A, the subcarrier 11 is occupied by the DMRSs only in the first slot, a subcarrier 6 is not occupied by the DMRSs in any slot, and the subcarrier 1 is occupied by the DMRSs in the first slot and the second slot.

Figure 7B:
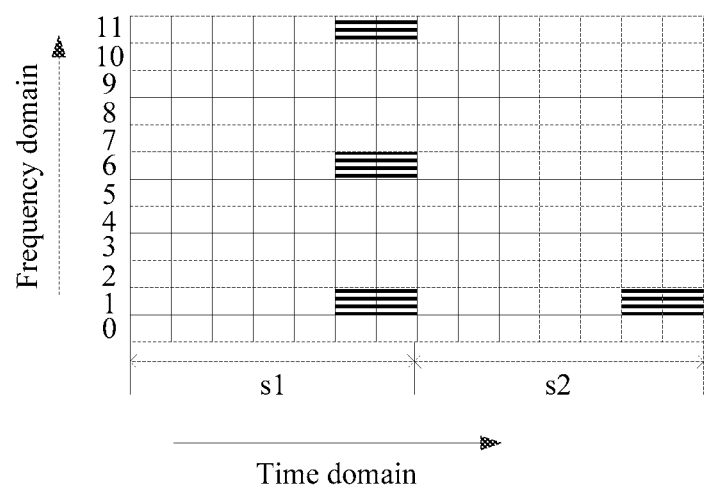
FIG. 7B is a schematic diagram of a second pattern according to an embodiment of this application.

For example, the second reference signal is a DMRS. In the case of a normal cyclic prefix, the second pattern may alternatively be shown in FIG. 7B. Second reference signals occupy last two symbols of each slot in a time domain dimension, and the second reference signals occupy a subcarrier 1, a subcarrier 6, and a subcarrier 11 in a frequency domain dimension, and the subcarrier 6 and the subcarrier 11 are occupied by the DMRSs only in a first slot.

Figure 7C:
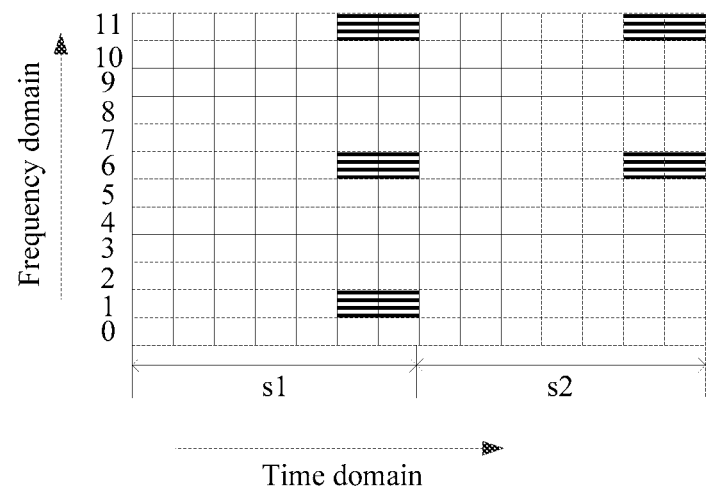
FIG. 7C is a schematic diagram of a second pattern according to an embodiment of this application.

Alternatively, the second pattern is shown in FIG. 7C. Second reference signals occupy last two symbols of each slot in a frequency domain dimension, and the second reference signals occupy a subcarrier 1, a subcarrier 6, and a subcarrier 11 in the frequency domain dimension, and the subcarrier 1 is occupied by the second reference signals only in a first slot.

Figure 7D:
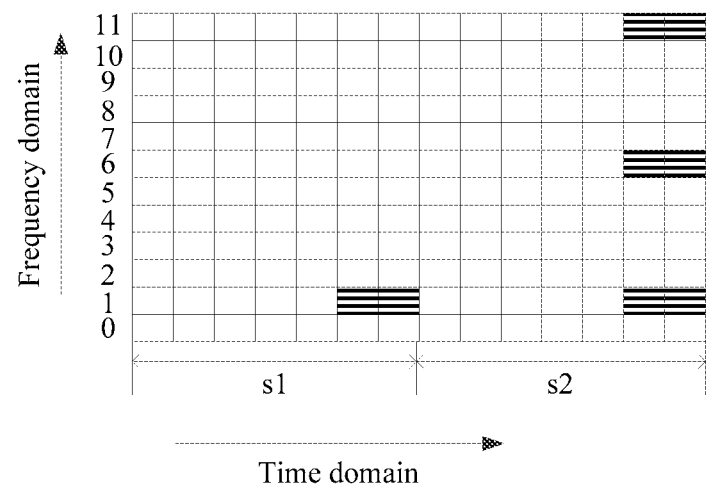
FIG. 7D is a schematic diagram of a second pattern according to an embodiment of this application.

Alternatively, the second pattern is shown in FIG. 7D. Second reference signals occupy last two symbols of each slot in a time domain dimension, and the second reference signals occupy a subcarrier 1, a subcarrier 6, and a subcarrier 11 in a frequency domain dimension, and the subcarrier 6 and the subcarrier 11 are occupied by the second reference signals only in a second slot.

Figure 7E:
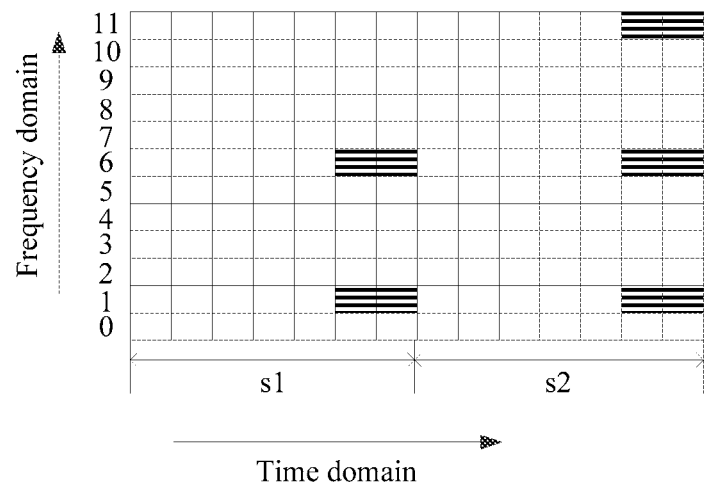
FIG. 7E is a schematic diagram of a second pattern according to an embodiment of this application.

Alternatively, the second pattern may be shown in FIG. 7E. Second reference signals occupy last two symbols of each slot in a time domain dimension, and the second reference signals occupy a subcarrier 1, a subcarrier 6, and a subcarrier 11 in a frequency domain dimension, and the subcarrier 11 is occupied by the second reference signals only in a second slot.

Figure 7F:
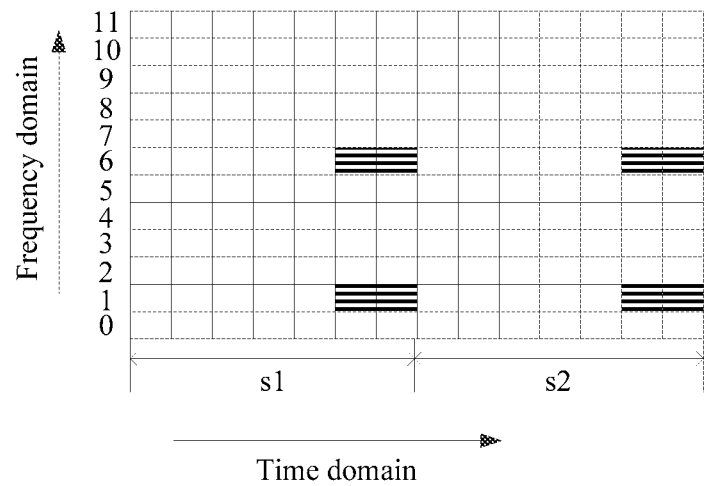
FIG. 7F is a schematic diagram of a second pattern according to an embodiment of this application.

Alternatively, the second pattern may be shown in FIG. 7F. Second reference signals occupy last two symbols of each slot in a time domain dimension, and the second reference signals occupy a subcarrier 1 and a subcarrier 6 in a frequency domain dimension, and a subcarrier 11 is not occupied by the second reference signals in any of two slots.

In this case, the second reference signals are distributed in the second pattern in a total of 48 manners, or in other words, there are 48 types of second patterns in total. A person skilled in the art may derive remaining 42 second patterns based on the foregoing several example patterns, and details are not described herein.

Figure 7G:
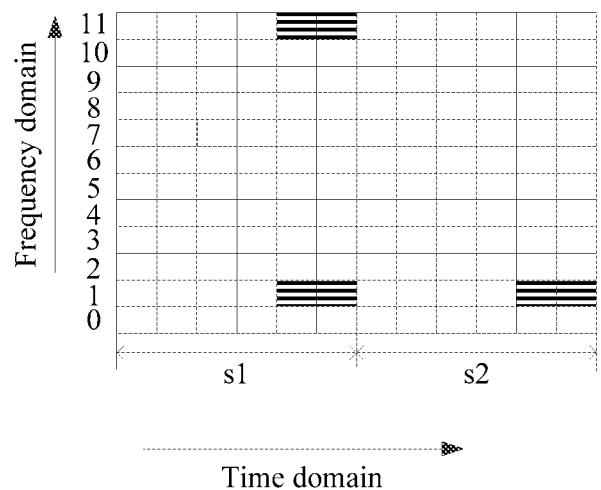
FIG. 7G is a schematic diagram of a second pattern according to an embodiment of this application.

Similarly, in a case of an extended cyclic prefix, for example, DMRSs occupy a subcarrier 1 and a subcarrier 11 in the second pattern, the subcarrier 11 is occupied by the DMRSs only in a first slot, a subcarrier 6 is not occupied by the DMRSs in any slot, and the subcarrier 1 is occupied by the DMRSs in the first slot and a second slot. The second pattern is shown in FIG. 7G If the example in which the second reference signal is a DMRS is still used, the second pattern may alternatively be shown in FIG. 7H, FIG. 7I, FIG. 7J, FIG. 7K, or FIG. 7L. In this case, the second reference signals are distributed in the second pattern in a total of 48 manners, or in other words, there are 48 types of second patterns in total. A person skilled in the art may derive remaining 42 second patterns based on the foregoing several example patterns, and details are not described herein.

(2) In the second pattern, the second reference signals occupy last two symbols of the first slot in the subframe in a time domain dimension, and occupy, in a frequency domain dimension, at least one of a subcarrier X, a subcarrier Y, and a subcarrier Z that appear at an interval.

The second reference signals occupy the last two symbols of the first slot in the time domain dimension, and occupy the subcarrier X, the subcarrier Y, and the subcarrier Z; the subcarrier X and the carrier Y; the subcarrier X and the subcarrier Z; the subcarrier Y and the subcarrier Z; the subcarrier X; the subcarrier Y; or the subcarrier Z in the frequency domain dimension, where the subcarriers appear at an interval.

Optionally, X is an integer greater than or equal to 0 and less than or equal to 11, Y is an integer greater than or equal to 0 and less than or equal to 11, and Z is an integer greater than or equal to 0 and less than or equal to 11.

Figure 7H:
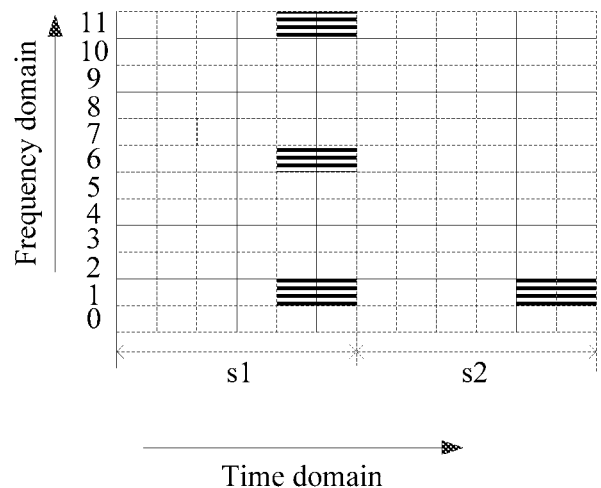
FIG. 7H is a schematic diagram of a second pattern according to an embodiment of this application.
Figure 7I:
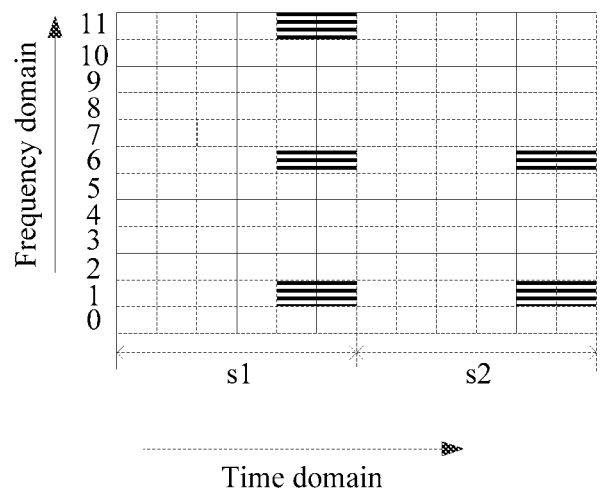
FIG. 7I is a schematic diagram of a second pattern according to an embodiment of this application.
Figure 7J:
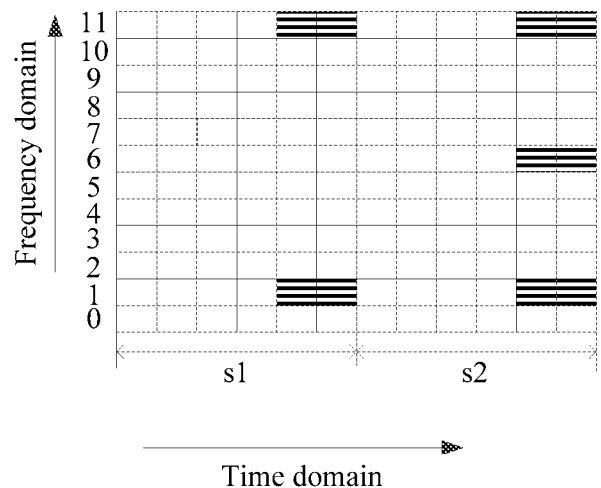
FIG. 7J is a schematic diagram of a second pattern according to an embodiment of this application.
Figure 7K:
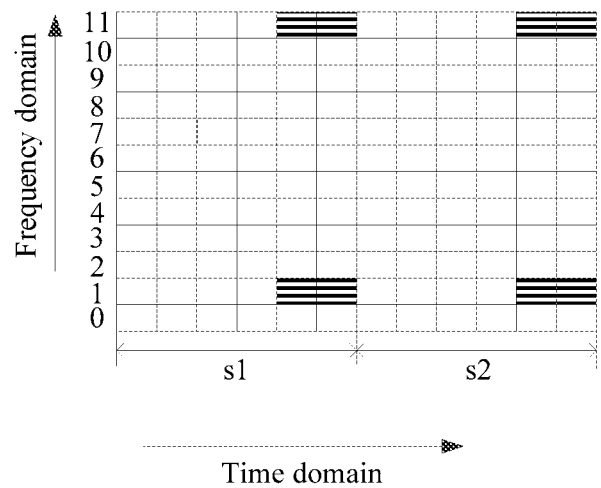
FIG. 7K is a schematic diagram of a second pattern according to an embodiment of this application.
Figure 7L:
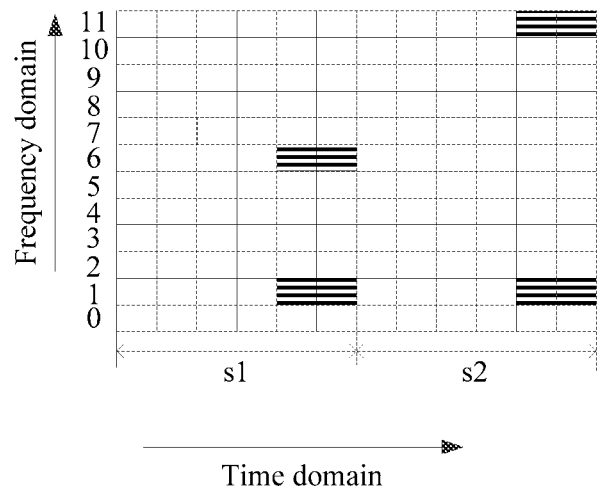
FIG. 7L is a schematic diagram of a second pattern according to an embodiment of this application.
Figure 7M:
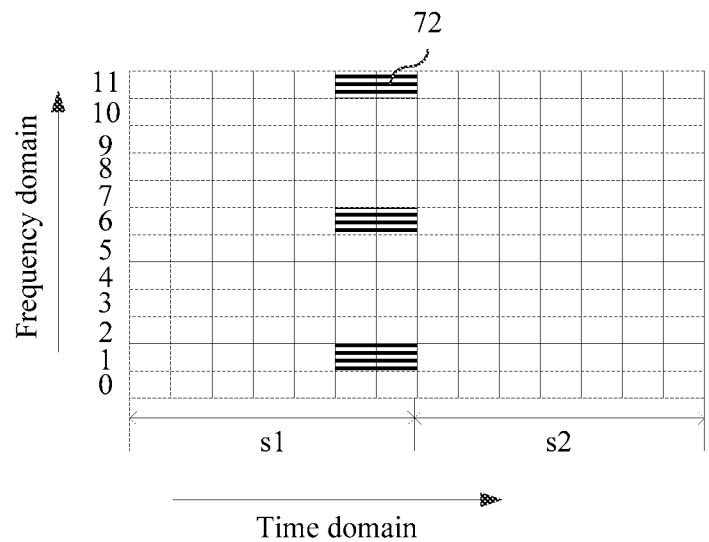
FIG. 7M is a schematic diagram of a second pattern according to an embodiment of this application.

For example, the second reference signal is a DMRS and the second pattern is shown in FIG. 7M in a case of a normal cyclic prefix. In the figure, two physical resource blocks, namely a physical resource block pair, are corresponding to a slot s1 and a slot s2, respectively. Each physical resource block occupies seven OFDM symbols in a time domain dimension, and occupies 12 subcarriers in a frequency domain dimension. Specific distribution of DMRSs 72 in the second pattern is as follows: In the time domain dimension, the DMRSs 72 occupy last two symbols of the first slot. In the frequency domain dimension, from bottom to top, the DMRSs 72 occupy a subcarrier 1, a subcarrier 6, and a subcarrier 11.

Figure 7N:
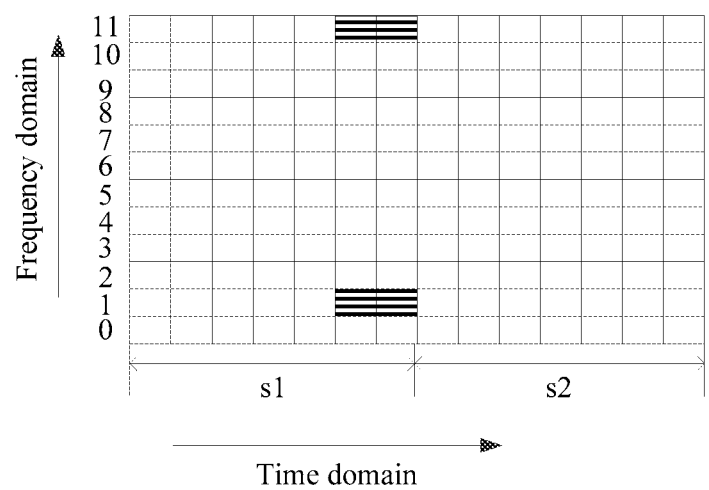
FIG. 7N is a schematic diagram of a second pattern according to an embodiment of this application.

The example in which the second reference signal is a DMRS is still used. The second pattern is shown in FIG. 7N. Second reference signals occupy a subcarrier 11 and a subcarrier 1 in a frequency domain dimension, and occupy last two symbols of a first slot in a time domain dimension.

Figure 7O:
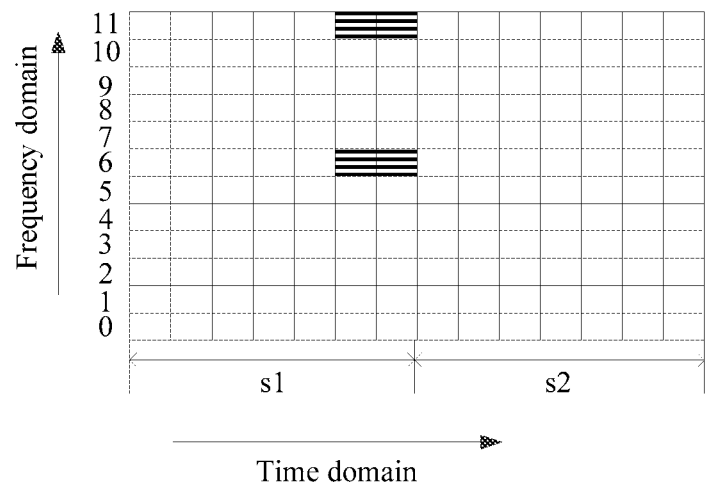
FIG. 7O is a schematic diagram of a second pattern according to an embodiment of this application.

Alternatively, the second pattern is shown in FIG. 7O. Second reference signals occupy a subcarrier 11 and a subcarrier 6 in a frequency domain dimension, and occupy last two symbols of a first slot in a time domain dimension.

Figure 7P:
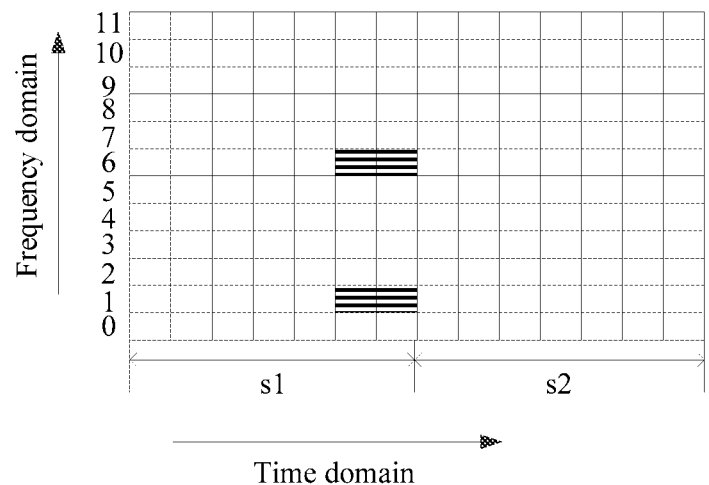
FIG. 7P is a schematic diagram of a second pattern according to an embodiment of this application.

Alternatively, the second pattern is shown in FIG. 7P. Second reference signals occupy a subcarrier 6 and a subcarrier 1 in a frequency domain dimension, and occupy last two symbols of a first slot in a time domain dimension.

Figure 7Q:
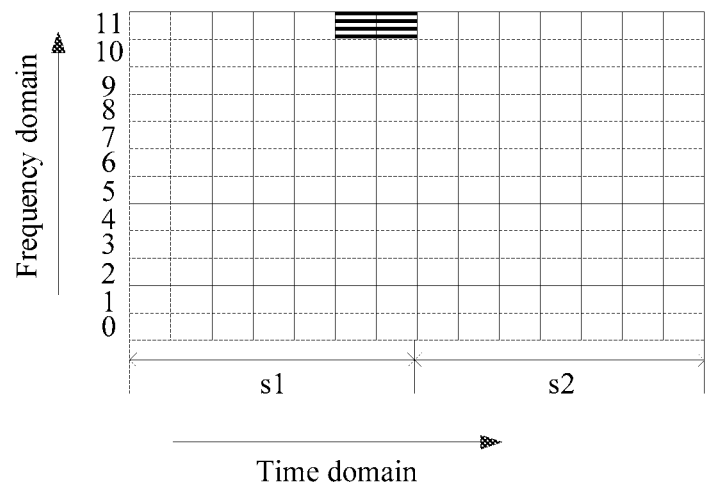
FIG. 7Q is a schematic diagram of a second pattern according to an embodiment of this application.

Alternatively, the second pattern is shown in FIG. 7Q. Second reference signals occupy a subcarrier 11 in a frequency domain dimension, and occupy last two symbols of a first slot in a time domain dimension.

Figure 7R:
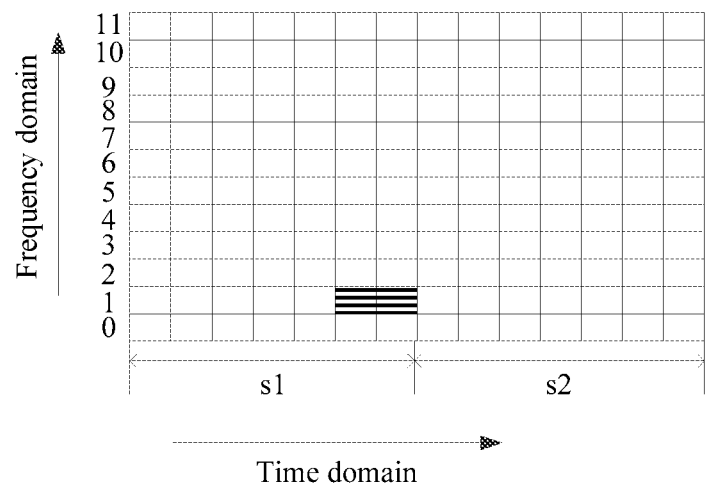
FIG. 7R is a schematic diagram of a second pattern according to an embodiment of this application.

Alternatively, the second pattern is shown in FIG. 7R. Second reference signals occupy a subcarrier 1 in a frequency domain dimension, and occupy last two symbols of a first slot in a time domain dimension.

Figure 7S:
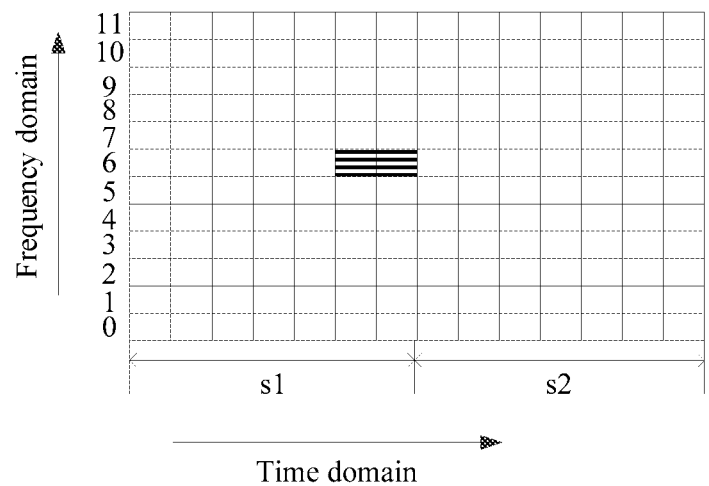
FIG. 7S is a schematic diagram of a second pattern according to an embodiment of this application.

Alternatively, the second pattern is shown in FIG. 7S. Second reference signals occupy a subcarrier 6 in a frequency domain dimension, and occupy last two symbols of a first slot in a time domain dimension.

In this case, the second reference signals are distributed in the second pattern in a total of seven manners shown in FIG. 7A to FIG. 7S, or in other words, there are seven types of second patterns in total.

Figure 7T:
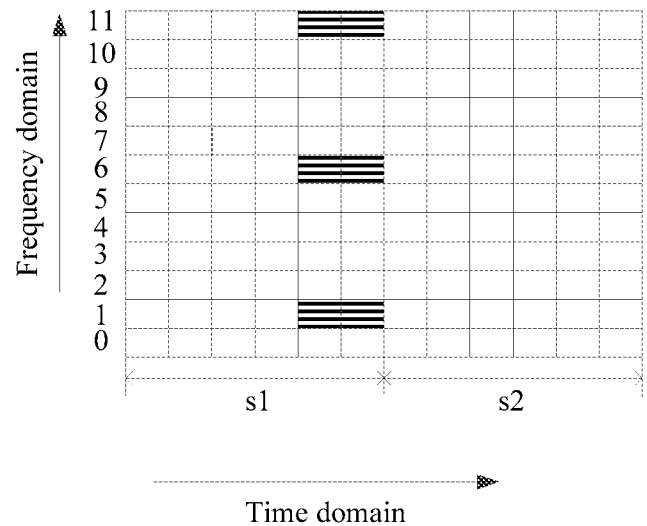
FIG. 7T is a schematic diagram of a second pattern according to an embodiment of this application.
Figure 7U:
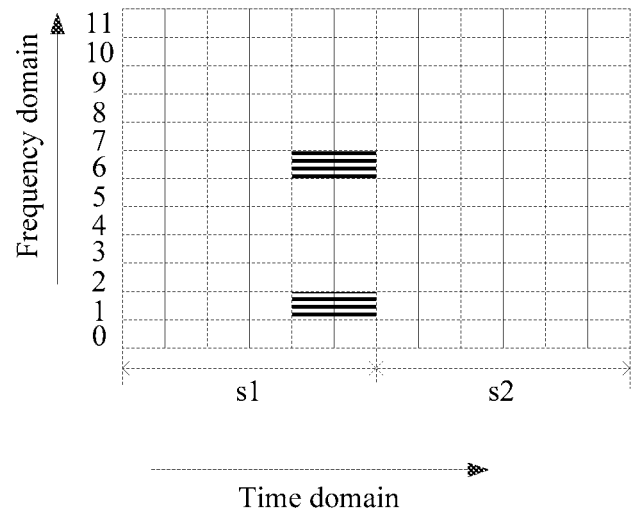
FIG. 7U is a schematic diagram of a second pattern according to an embodiment of this application.
Figure 7V:
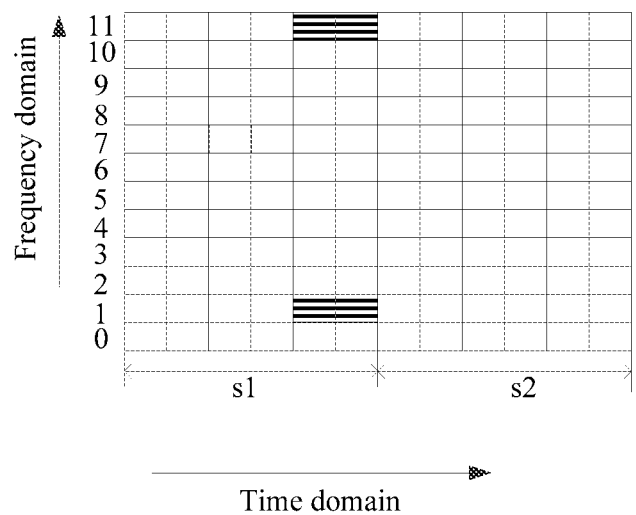
FIG. 7V is a schematic diagram of a second pattern according to an embodiment of this application.
Figure 7W:
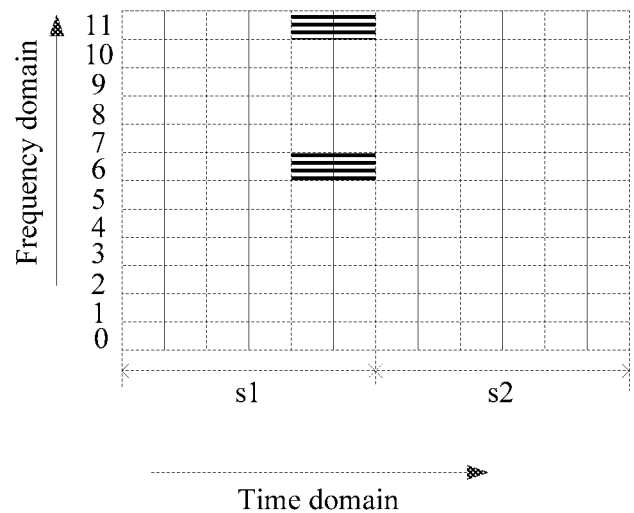
FIG. 7W is a schematic diagram of a second pattern according to an embodiment of this application.
Figure 7X:
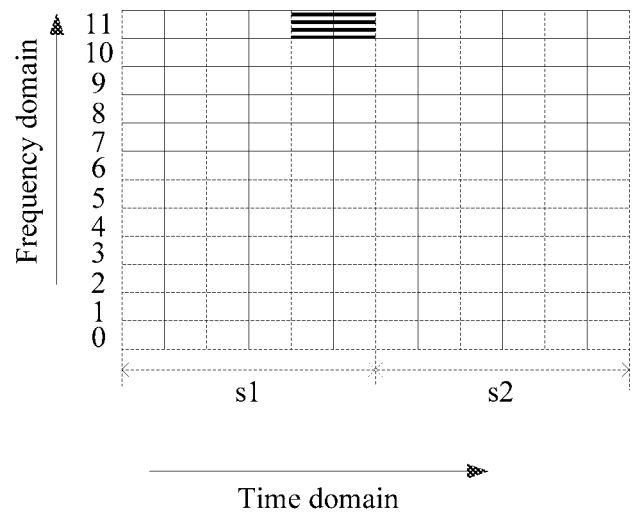
FIG. 7X is a schematic diagram of a second pattern according to an embodiment of this application.
Figure 7Y:
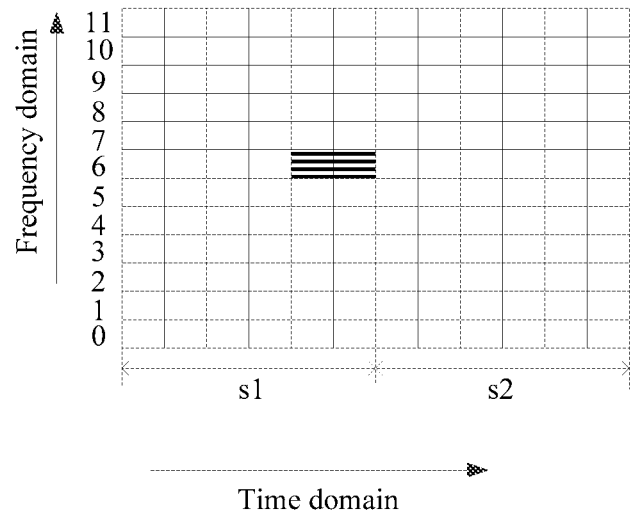
FIG. 7Y is a schematic diagram of a second pattern according to an embodiment of this application.
Figure 7Z:
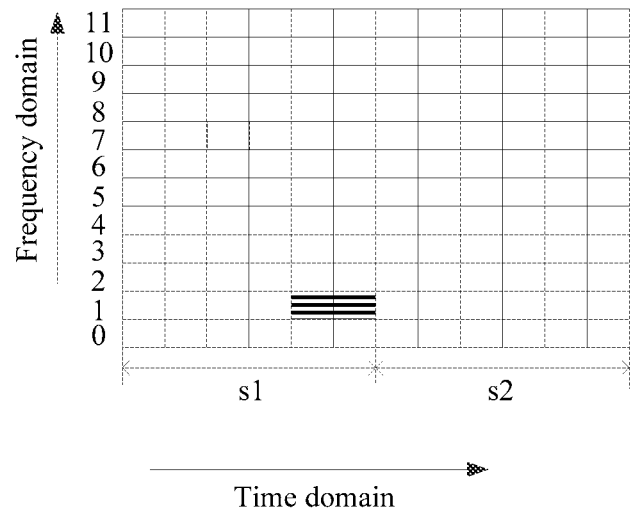
FIG. 7Z is a schematic diagram of a second pattern according to an embodiment of this application.
Figure 7A:
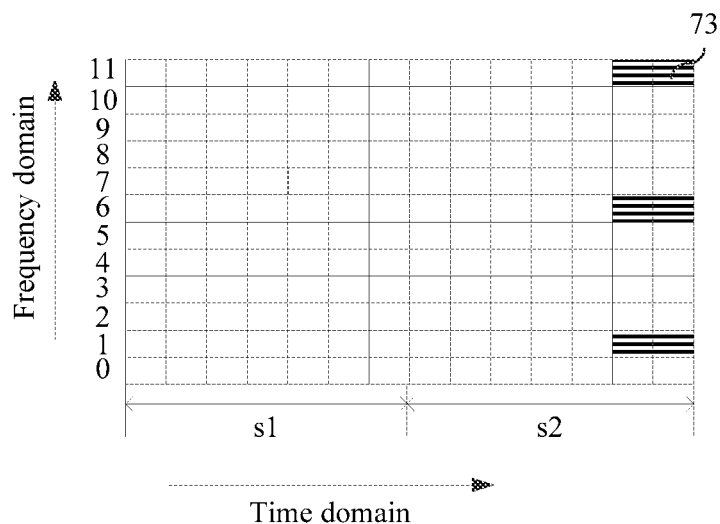
Figure 7B:
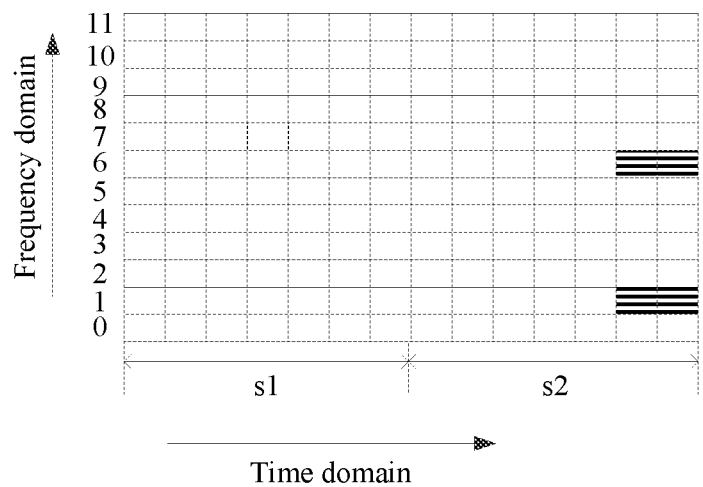
Figure 7C:
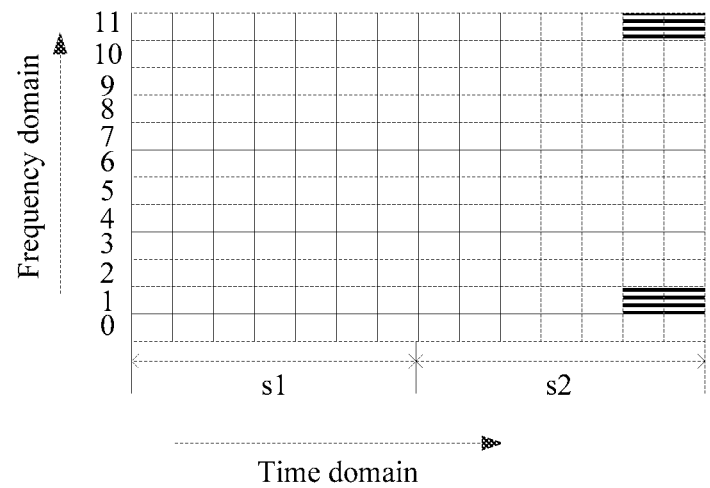
Figure 7D:
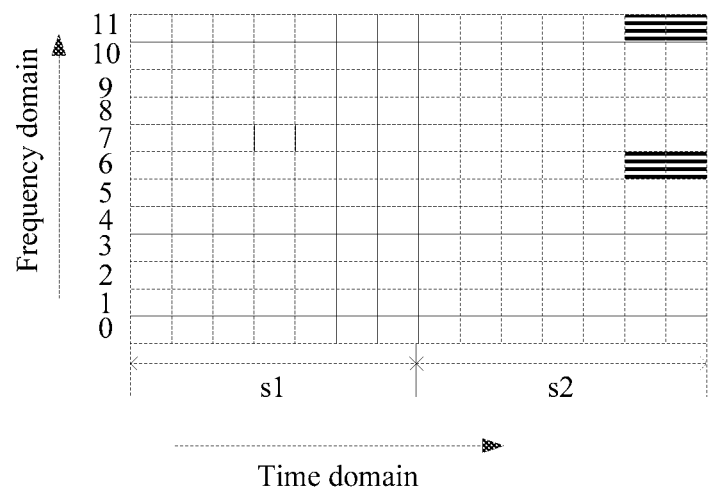
Figure 7E:
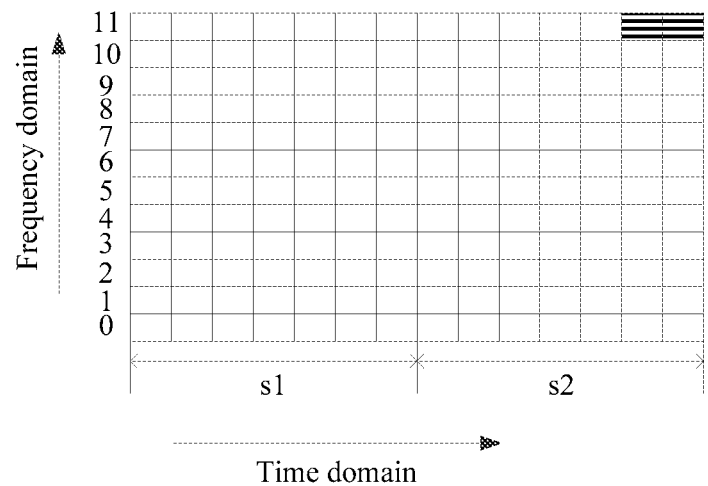
Figure 7F:
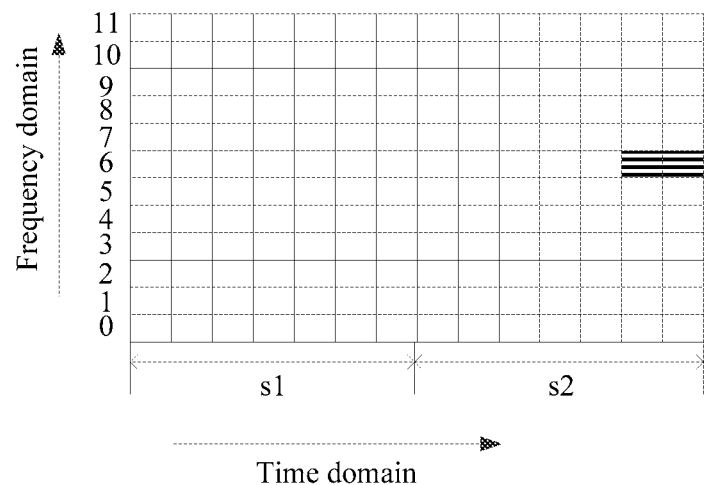
Figure 7G:
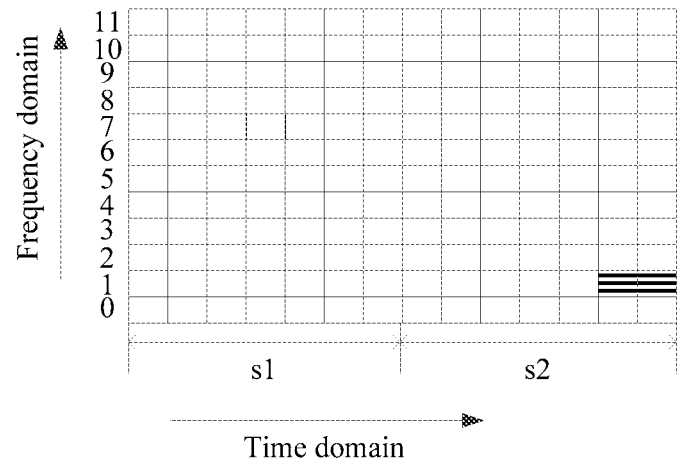
Figure 7H:
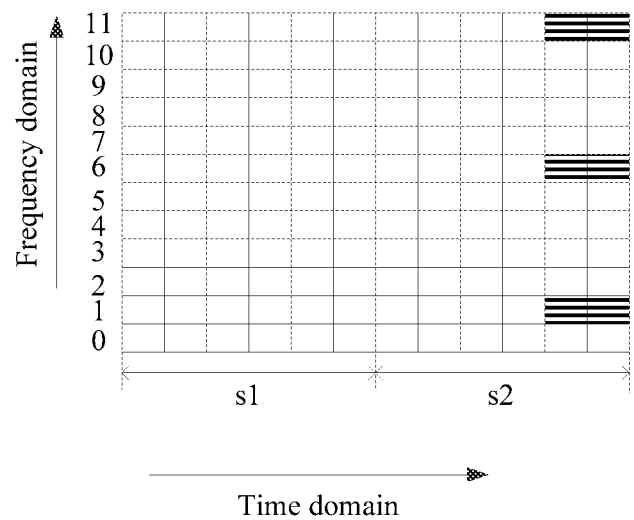
Figure 7I:
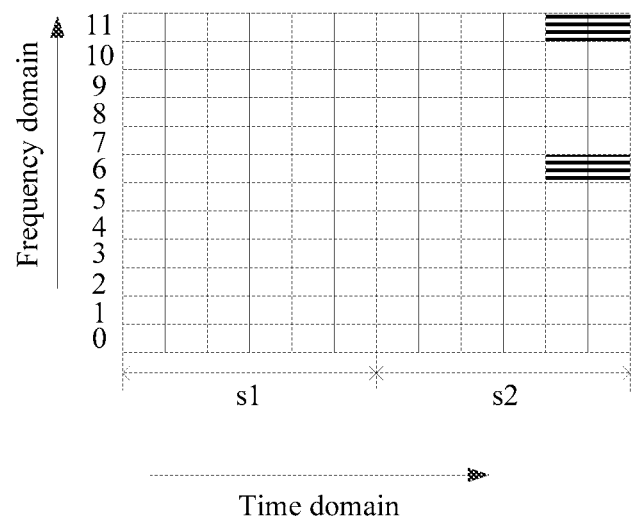
Figure 7J:
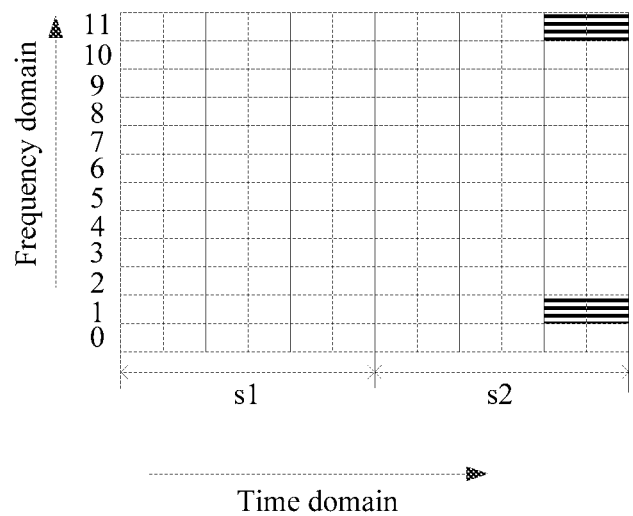
Figure 7K:
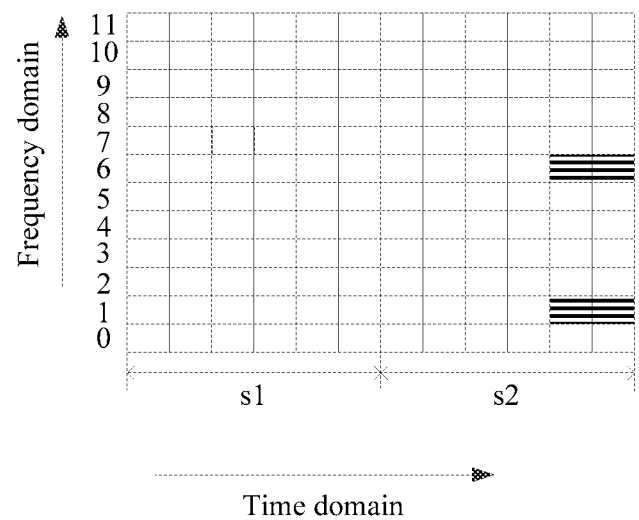
Figure 7L:
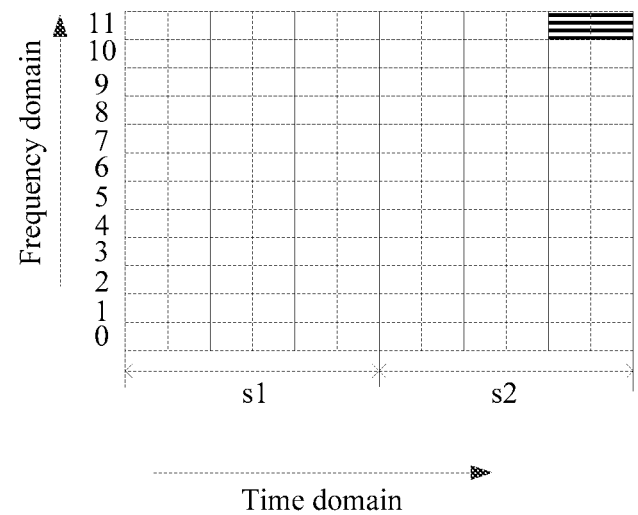
Figure 7M:
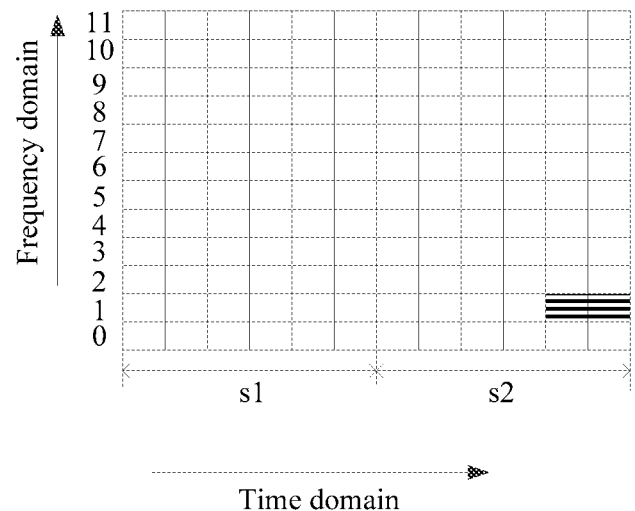
Figure 7N:
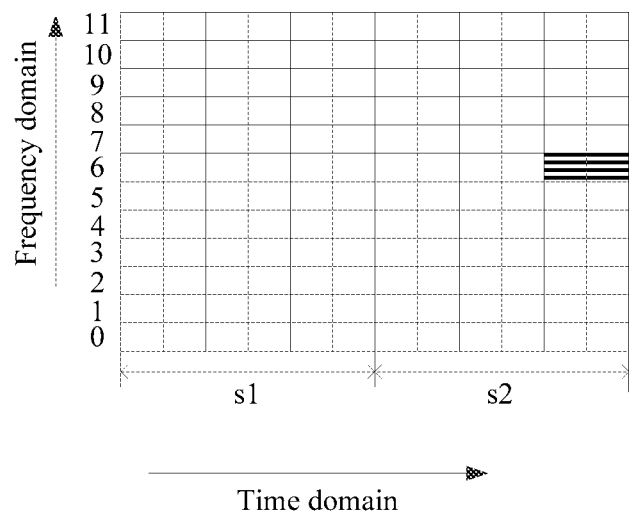
Figure 7O:
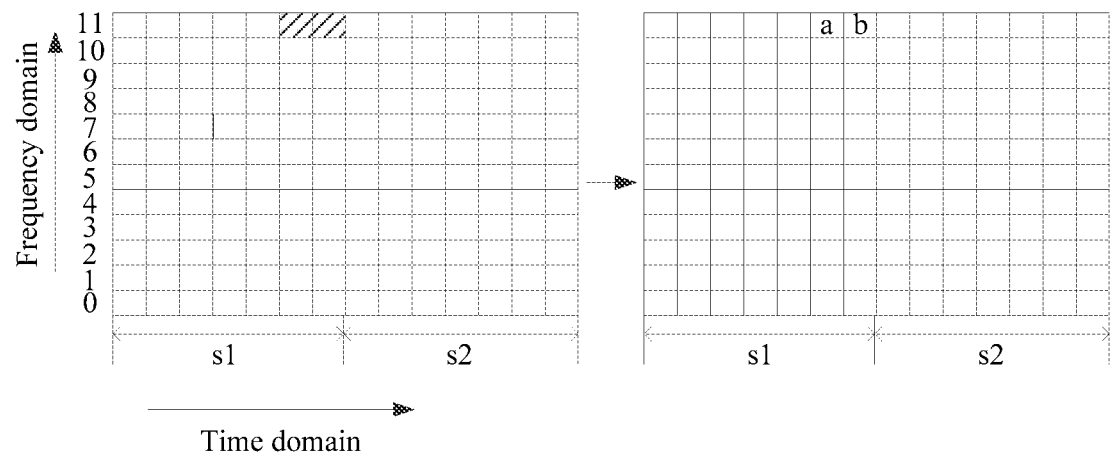
Figure 7P:
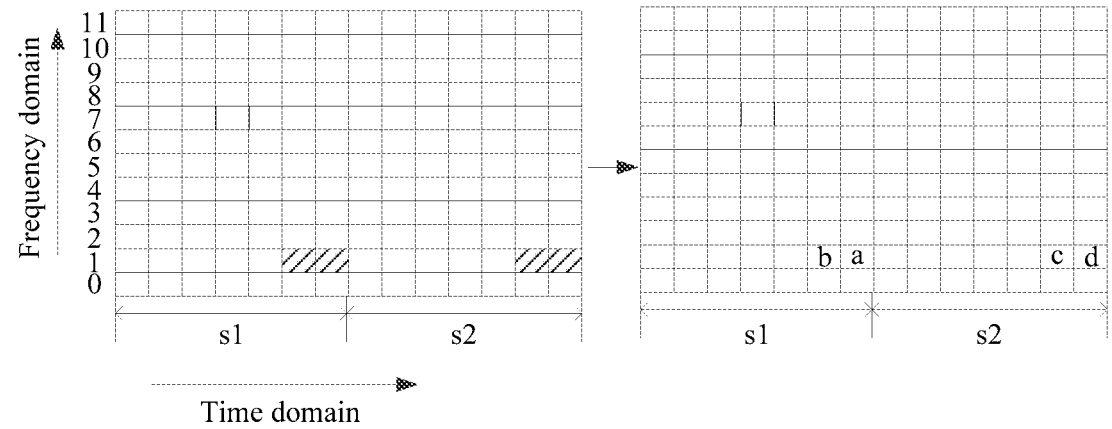
Figure 7Q:
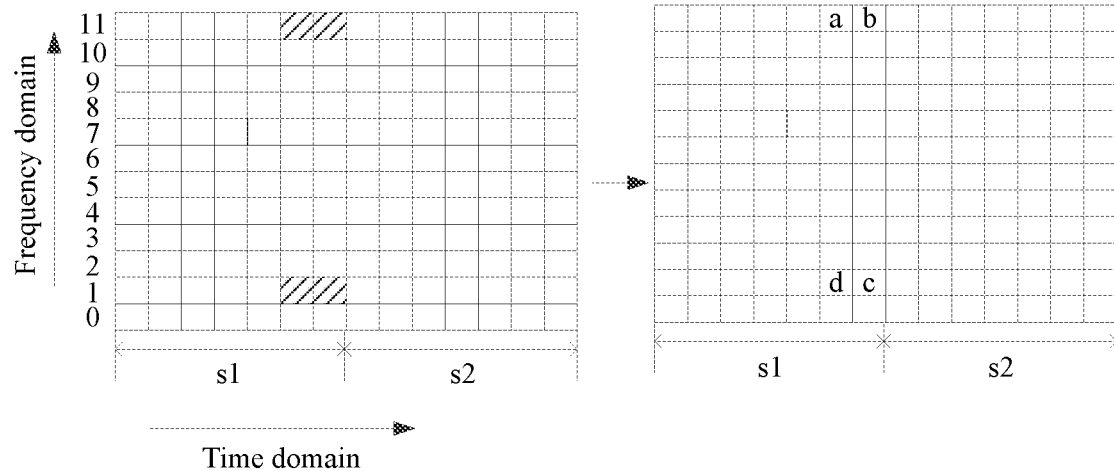

Similarly, in a case of an extended cyclic prefix, for example, DMRSs occupy a subcarrier 1, a subcarrier 6, and a subcarrier 11 in a frequency domain dimension. The second pattern is shown in FIG. 7T. The second pattern may alternatively be shown in FIG. 7U, FIG. 7V, FIG. 7W, FIG. 7X, FIG. 7Y, or FIG. 7Z. In this case, the second reference signals are distributed in the second pattern in a total of seven manners, or in other words, there are seven types of second patterns in total.

(3) In the second pattern, the second reference signals occupy last two symbols of the second slot in the subframe in a time domain dimension, and occupy, in a frequency domain dimension, at least one of a subcarrier X, a subcarrier Y, and a subcarrier Z that appear at an interval.

The second reference signals occupy the last two symbols of the second slot in the time domain dimension, and occupy the subcarrier X, the subcarrier Y, and the subcarrier Z; the subcarrier X and the carrier Y; the subcarrier X and the subcarrier Z; the subcarrier Y and the subcarrier Z; the subcarrier X; the subcarrier Y; or the subcarrier Z in the frequency domain dimension, where the subcarriers appear at an interval.

Optionally, X is an integer greater than or equal to 0 and less than or equal to 11, Y is an integer greater than or equal to 0 and less than or equal to 11, and Z is an integer greater than or equal to 0 and less than or equal to 11.

For example, the second reference signal is a DMRS and the second pattern is shown in FIG. 7*a* in a case of a normal cyclic prefix. In the figure, two physical resource blocks, namely a physical resource block pair, are corresponding to a slot s1 and a slot s2, respectively. Each physical resource block occupies seven OFDM symbols in a time domain dimension, and occupies 12 subcarriers in a frequency domain dimension. Specific distribution of DMRSs 73 in the second pattern is as follows: In the time domain dimension, the DMRSs 73 occupy last two symbols of the second slot. In the frequency domain dimension, from bottom to top, the DMRSs 73 occupy a subcarrier 1, a subcarrier 6, and a subcarrier 11. If the example in which the second reference signal is a DMRS is still used, the second pattern may alternatively be shown in FIG. 7*b*, FIG. 7*c*, FIG. 7*d*, FIG. 7*e*, FIG. 7*f*, or FIG. 7*g*.

In this case, the second reference signals are distributed in the second pattern in a total of seven manners, or in other words, there are seven types of second patterns in total.

Similarly, in a case of an extended cyclic prefix, for example, DMRSs occupy a subcarrier 1, a subcarrier 6, and a subcarrier 11. The second pattern is shown in FIG. 7*h*. If the example in which the second reference signal is a DMRS is still used, the second pattern may alternatively be shown in FIG. 7*i*, FIG. 7*j*, FIG. 7*k*, FIG. 7*l*, FIG. 7*m*, or FIG. 7*n*. In this case, the second reference signals are distributed in the second pattern in a total of seven manners, or in other words, there are seven types of second patterns in total.

In the optional embodiment based on FIG. 7A, FIG. 7B, FIG. 7C, FIG. 7D, FIG. 7E, FIG. 7F, FIG. 7G; FIG. 7H, FIG. 7I, FIG. 7J, FIG. 7K, FIG. 7L, FIG. 7M, FIG. 7N, FIG. 7O, FIG. 7P, FIG. 7Q, FIG. 7R, FIG. 7S, FIG. 7T, FIG. 7U, FIG. 7V, FIG. 7W, FIG. 7X, FIG. 7Y, FIG. 7Z, FIG. 7*a*, FIG. 7*b*, FIG. 7*c*, FIG. 7*d*, FIG. 7*e*, FIG. 7*f*, FIG. 7*g*, FIG. 7*h*, FIG. 7*i*, FIG. 7*j*, FIG. 7*k*, FIG. 7*l*, FIG. 7*m*, or FIG. 7*n*, when a length of an orthogonal cover code (OCC) is 2, second reference signals that are transmitted by using two adjacent time-frequency resources in the second pattern that include a same subcarrier in frequency domain are reference signals orthogonal to each other after being spread by using a spreading sequence whose length is 2. The spreading sequence whose length is 2 is [1 1] or [1 −1].

For example, in FIG. 7*o*, spreading sequences are a=[1 1] and b=[1 −1]. As shown on a left side of FIG. 7*o*, second reference signals occupy a total of two time-frequency resources that include a subcarrier 11 in a frequency domain dimension and last two OFDM symbols of a first slot in a time domain dimension. The second reference signals transmitted by using the two time-frequency resources are spread by using the spreading sequences a and b, as shown on a right side of FIG. 7*o*.

In the optional embodiment based on FIG. 7A, FIG. 7B, FIG. 7C, FIG. 7D, FIG. 7E, FIG. 7F, FIG. 7H, FIG. 7I, FIG. 7J, FIG. 7K, FIG. 7L, FIG. 7M, FIG. 7N, FIG. 7O, FIG. 7P, FIG. 7Q, FIG. 7R, FIG. 7S, FIG. 7T, FIG. 7U, FIG. 7V, FIG. 7W, FIG. 7X, FIG. 7Y, FIG. 7Z, FIG. 7*a*, FIG. 7*b*, FIG. 7*c*, FIG. 7*d*, FIG. 7*e*, FIG. 7*f*, FIG. 7*g*, FIG. 7*h*, FIG. 7*i*, FIG. 7*j*, FIG. 7*k*, FIG. 7*l*, FIG. 7*m*, or FIG. 7*n*, when the length of the orthogonal cover code (OCC) is 4, a spreading sequence whose length is 4 is [1 1 1 1], [1 −1 1 −1], [1 1 −1 −1], or [1 −1 −1 1].

(1) Second reference signals that are transmitted by using a total of four time-frequency resources in the second pattern that include a same subcarrier in a frequency domain dimension and last two symbols of each slot in a time domain dimension are reference signals orthogonal to each other after being spread by using the spreading sequence whose length is 4.

For example, in FIG. 7*p*, spreading sequences are a=[1 1 1 1], b=[1 −1 1 −1], c=[1 1 −1 −1], and d=[1 −1 −1 1]. As shown on a left side of FIG. 7*p*, second reference signals occupy a total of four time-frequency resources that include a subcarrier 1 in a frequency domain dimension and last two OFDM symbols of a first slot and last two OFDM symbols of a second slot in a time domain dimension. The second reference signals transmitted by using the four time-frequency resources are spread by using the spreading sequences a, b, c, and d, as shown on a right side of FIG. 7*p*.

(2) Second reference signals transmitted by using a total of four time-frequency resources in the second pattern that include a subcarrier X and a subcarrier Y in a frequency domain dimension and last two symbols of a slot in a time domain dimension, and/or second reference signals transmitted by using a total of four time-frequency resources that include a subcarrier Y and a subcarrier Z in a frequency domain dimension and last two symbols of a slot in a time domain dimension, and/or second reference signals transmitted by using a total of four time-frequency resources that include a subcarrier X and a subcarrier Z in a frequency domain dimension and last two symbols of a slot in a time domain dimension are reference signals orthogonal to each other after being spread by using the spreading sequence whose length is 4.

For example, in FIG. 7*q*, spreading sequences are a=[1 1 1 1], b=[1 −1 1 −1], c=[1 1−1 −1], and d=[1 −1 −1 1]. As shown on a left side of FIG. 7*q*, second reference signals occupy a total of four time-frequency resources that include last two OFDM symbols of a first slot in a time domain dimension and a subcarrier 1 and a subcarrier 11 in a frequency domain dimension. The second reference signals transmitted by using the four time-frequency resources are spread by using the spreading sequences a, b, c, and d, as shown on a right side of FIG. 7*q*.

When a density of time-frequency resources, used for transmitting second reference signals, namely DMRSs, in the third pattern is 24 time-frequency resources per physical resource block pair, because the time-frequency resource in the second pattern is a part of the time-frequency resource in the third pattern, the second reference signals are distributed in the second pattern in three manners:

(1) In the second pattern, second reference signals are divided into two CDM groups, and the two groups of second reference signals occupy last two symbols of each slot in a time domain dimension. A first group of second reference signals and a second group of second reference signals correspondingly occupy at least one of a first combination of a subcarrier X and a subcarrier X+1, a second combination of a subcarrier Y and a subcarrier Y+1, and a third combination of a subcarrier Z and a subcarrier Z+1. Among the first combination, the second combination, and the third combination, at least one combination is a combination occupied by the two groups of second reference signals when the two groups of second reference signals occupy only one slot, or at least one combination is a combination that is not occupied by the two groups of second reference signals in two slots.

The first combination includes the subcarrier X and the subcarrier X+1, the second combination includes the subcarrier Y and the subcarrier Y+1, and the third combination includes the subcarrier Z and the subcarrier Z+1. The first group of second reference signals and the second group of second reference signals correspondingly occupy the first combination, the second combination, and the third combination; the first combination and the second combination; the first combination and the third combination; the second combination and the third combination; the first combination; the second combination; or the third combination.

For example, that the first group of second reference signals and the second group of second reference signals correspondingly occupy the first combination and the third combination means that the first group of second reference signals occupies the subcarrier Y and the subcarrier Z and the second group of second reference signals occupies the subcarrier X+1 and the subcarrier Z+1.

Optionally, X is an integer greater than or equal to 0 and less than or equal to 10, Y is an integer greater than or equal to 0 and less than or equal to 10, and Z is an integer greater than or equal to 0 and less than or equal to 10.

Figure 8A:
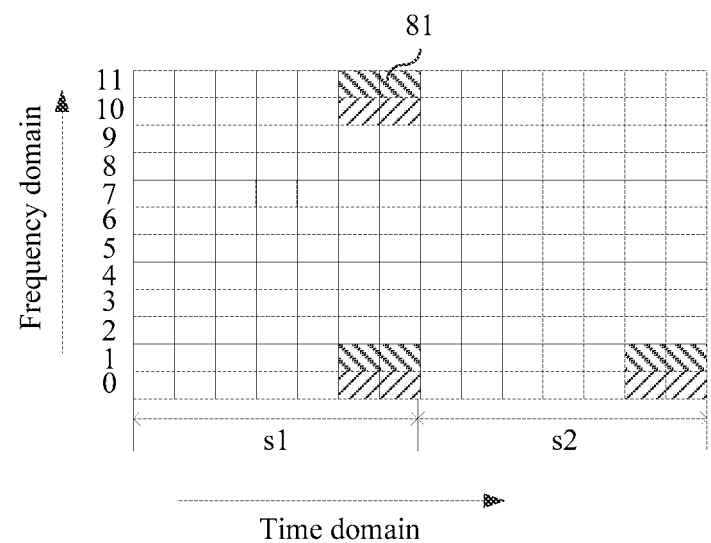
FIG. 8A is a schematic diagram of a second pattern according to an embodiment of this application.

For example, the second reference signal is a DMRS and the second pattern is shown in FIG. 8A in a case of a normal cyclic prefix. In the figure, two physical resource blocks, namely a physical resource block pair, are corresponding to a slot s1 and a slot s2, respectively. Each physical resource block occupies seven OFDM symbols in a time domain dimension, and occupies 12 subcarriers in a frequency domain dimension. Specific distribution of DMRSs 81 in the second pattern is as follows: In the time domain dimension, the DMRSs 81 occupy last two symbols of the first slot and the second slot. In the frequency domain dimension, from bottom to top, a first group of DMRSs and a second group of DMRSs occupy a first combination of a subcarrier 0 and a subcarrier 1 and a second combination of a subcarrier 10 and a subcarrier 11. For a first combination of a subcarrier 0 and a subcarrier 1, a second combination of a subcarrier 5 and a subcarrier 6, and a third combination of a subcarrier 10 and a subcarrier 11 that are occupied by DMRSs in the third pattern, in the second pattern shown in FIG. 8A, the third combination is occupied by the DMRSs only in the first slot, the second combination is not occupied by the DMRSs in any slot, and the first combination is occupied by the DMRSs in the first slot and the second slot.

Figure 8B:
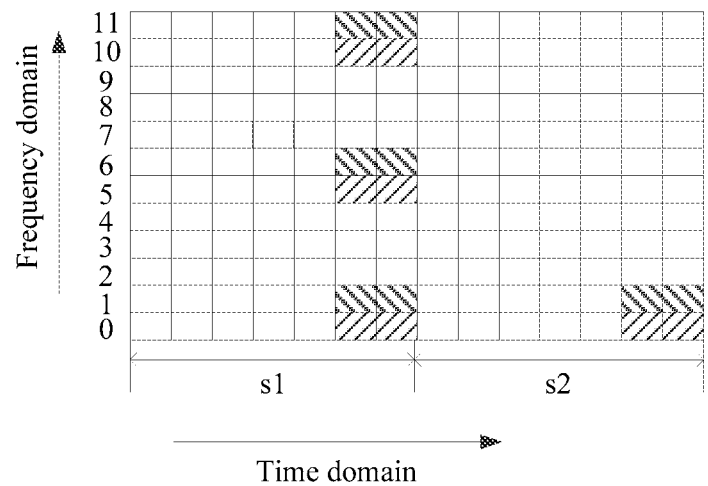
FIG. 8B is a schematic diagram of a second pattern according to an embodiment of this application.

The example in which the second reference signal is a DMRS is still used. The second pattern is shown in FIG. 8B. Second reference signals occupy a first slot and a second slot in a time domain dimension, and occupy a first combination, a second combination, and a third combination in a frequency domain dimension. The second combination and the third combination are occupied by the DMRSs only in the first slot, and the first combination is occupied by the DMRSs in the first slot and the second slot.

Figure 8C:
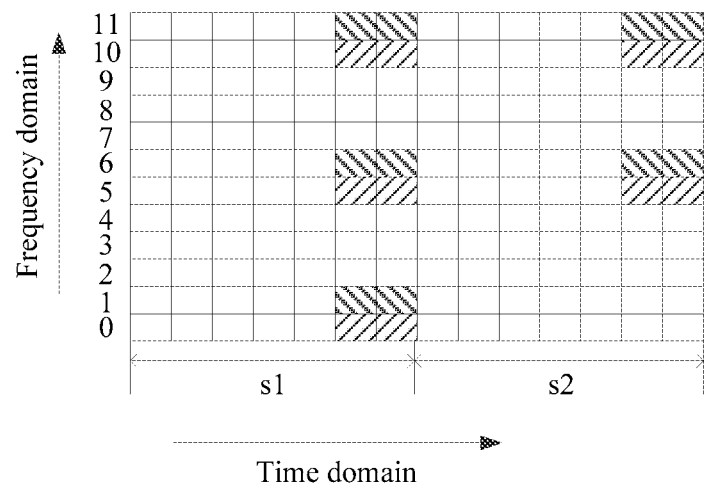
FIG. 8C is a schematic diagram of a second pattern according to an embodiment of this application.

Alternatively, the second pattern is shown in FIG. 8C. Second reference signals occupy a first slot and a second slot in a time domain dimension, and occupy a first combination, a second combination, and a third combination in a frequency domain dimension. The first combination is occupied by the second reference signals only in the first slot, and the second combination and the third combination are occupied in the first slot and the second slot.

Figure 8D:
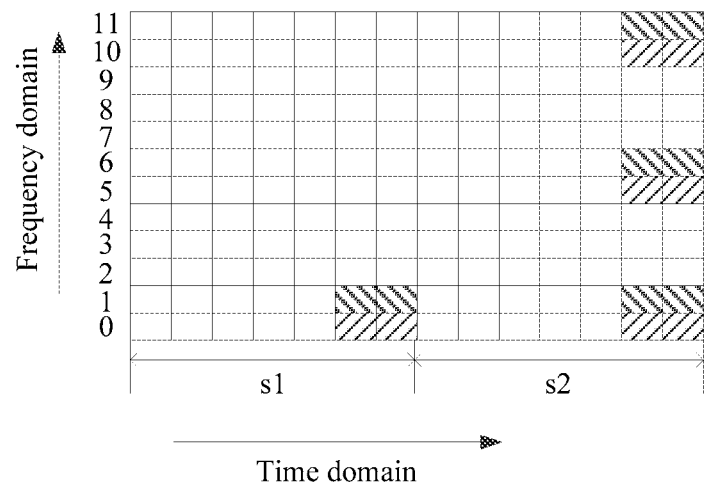
FIG. 8D is a schematic diagram of a second pattern according to an embodiment of this application.

Alternatively, the second pattern is shown in FIG. 8D. Second reference signals occupy a first slot and a second slot in a time domain dimension, and occupy a first combination and a third combination in a frequency domain dimension. The first combination is occupied by the second reference signals in the first slot and the second slot, and the third combination is occupied by the second reference signals only in the first slot.

Figure 8E:
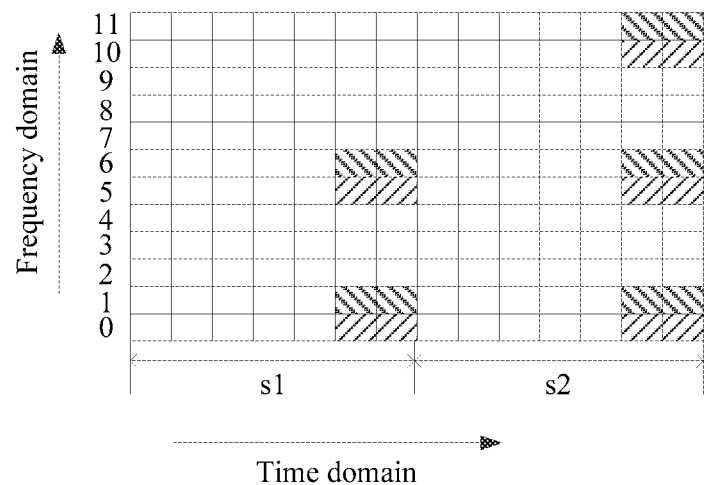
FIG. 8E is a schematic diagram of a second pattern according to an embodiment of this application.

Alternatively, the second pattern is shown in FIG. 8E. Second reference signals occupy a first slot and a second slot in a time domain dimension, and occupy a first combination, a second combination, and a third combination in a frequency domain dimension. The third combination is occupied by the second reference signals only in the second slot, and the second combination and the first combination are occupied by the second reference signals in the first slot and the second slot.

Figure 8F:
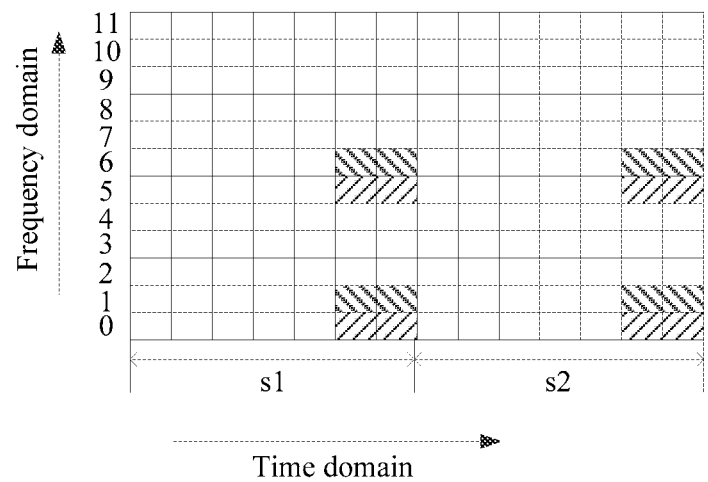
FIG. 8F is a schematic diagram of a second pattern according to an embodiment of this application.

Alternatively, the second pattern is shown in FIG. 8F. Second reference signals occupy a first slot and a second slot in a time domain dimension, and occupy a first combination and a second combination in a frequency domain dimension. A third combination is not occupied by the second reference signals in any slot, and the second combination and the first combination are occupied by the second reference signals in the first slot and the second slot.

In this case, the second reference signals are distributed in the second pattern in a total of 48 manners, or in other words, there are 48 types of second patterns in total. A person skilled in the art may derive remaining 42 second patterns based on the foregoing several example patterns, and details are not described herein.

Figure 8G:
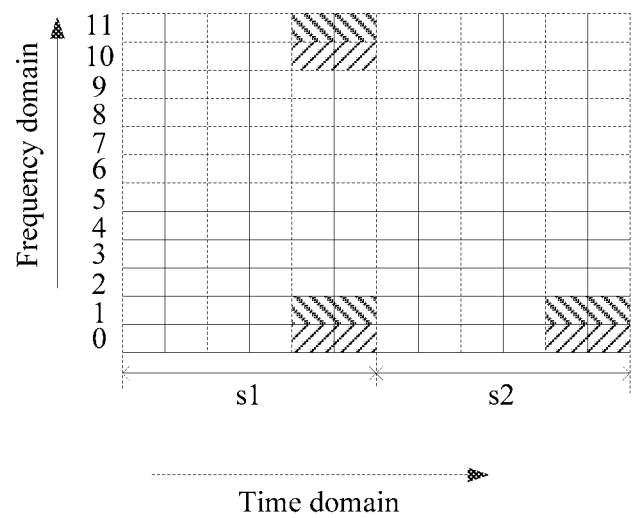
FIG. 8G is a schematic diagram of a second pattern according to an embodiment of this application.

Similarly, in a case of an extended cyclic prefix, for example, in the second pattern, DMRSs occupy a first combination and a third combination, the third combination is occupied by the second reference signals only in a first slot, a second combination is not occupied in any slot, and the first combination is occupied in both the first slot and a second slot. The second pattern is shown in FIG. 8G. In addition, the second pattern may alternatively be shown in FIG. 8H, FIG. 8I, FIG. 8J, FIG. 8K, or FIG. 8L. In this case, the second reference signals are distributed in the second pattern in a total of 48 manners, or in other words, there are 48 types of second patterns in total. A person skilled in the art may derive remaining 42 second patterns based on the foregoing several example patterns, and details are not described herein.

(2) In the second pattern, second reference signals are divided into two CDM groups, and the two groups of second reference signals each occupy last two symbols of only the first slot in a time domain dimension. In the first slot, a first group of second reference signals and a second group of second reference signals correspondingly occupy at least one of a first combination of a subcarrier X and a subcarrier X+1, a second combination of a subcarrier Y and a subcarrier Y+1, and a third combination of a subcarrier Z and a subcarrier Z+1.

The two groups of second reference signals each occupy the last two symbols of the first slot in the time domain dimension, and in the first slot, occupy the first combination, the second combination, and the third combination; the first combination and the second combination; the first combination and the third combination; the second combination and third combination; the first combination; the second combination; or the third combination in a frequency domain dimension.

Optionally, X is an integer greater than or equal to 0 and less than or equal to 10, Y is an integer greater than or equal to 0 and less than or equal to 10, and Z is an integer greater than or equal to 0 and less than or equal to 10.

Figure 8H:
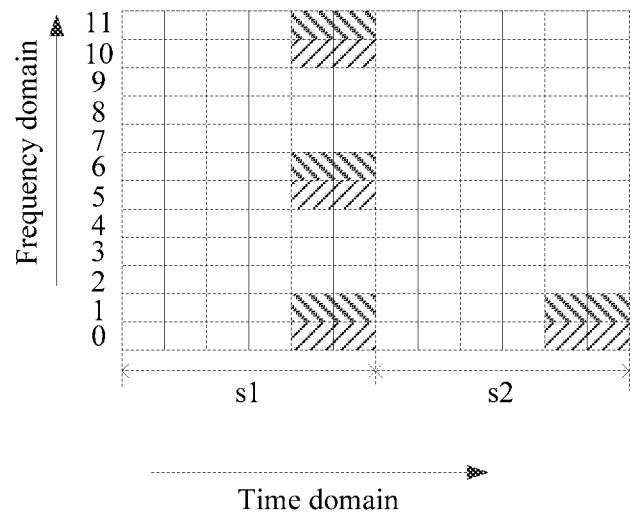
FIG. 8H is a schematic diagram of a second pattern according to an embodiment of this application.
Figure 8I:
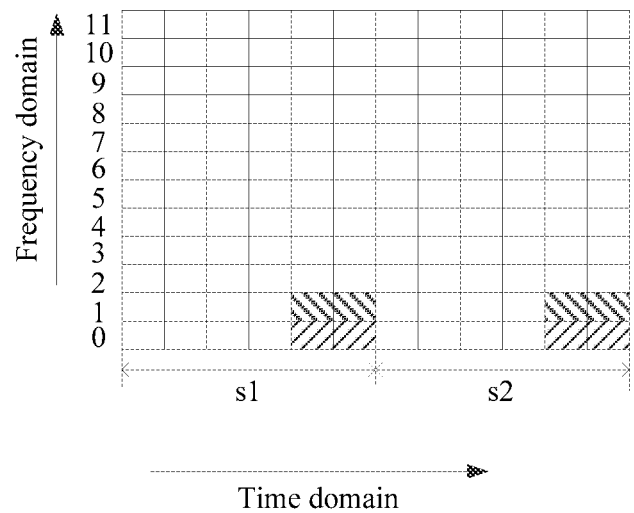
FIG. 8I is a schematic diagram of a second pattern according to an embodiment of this application.
Figure 8J:
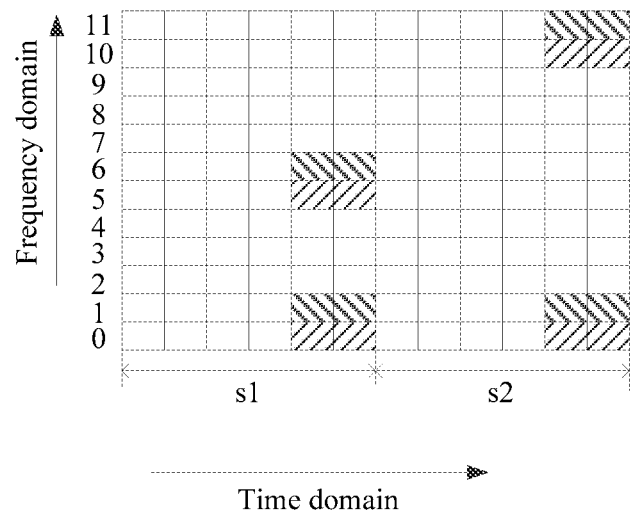
FIG. 8J is a schematic diagram of a second pattern according to an embodiment of this application.
Figure 8K:
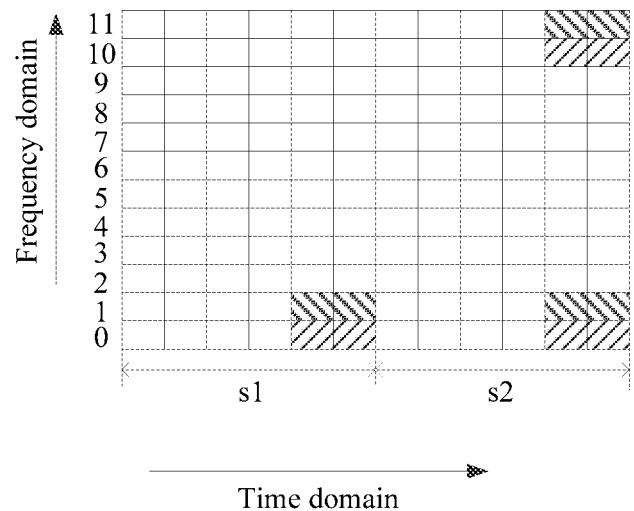
FIG. 8K is a schematic diagram of a second pattern according to an embodiment of this application.
Figure 8L:
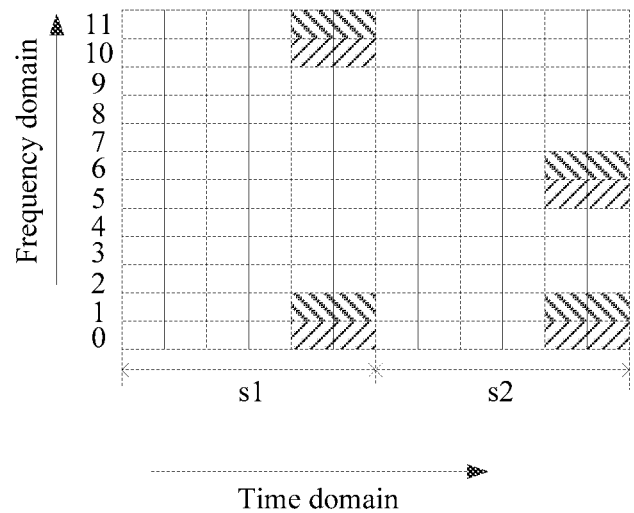
FIG. 8L is a schematic diagram of a second pattern according to an embodiment of this application.
Figure 8M:
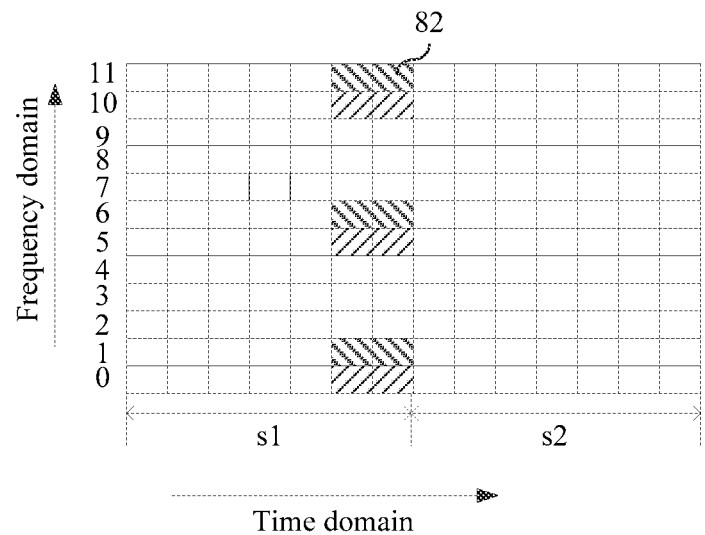
FIG. 8M is a schematic diagram of a second pattern according to an embodiment of this application.

For example, the second reference signal is a DMRS and the second pattern is shown in FIG. 8M in a case of a normal cyclic prefix. In the figure, two physical resource blocks, namely a physical resource block pair, are corresponding to a slot s1 and a slot s2, respectively. Each physical resource block occupies seven OFDM symbols in a time domain dimension, and occupies 12 subcarriers in a frequency domain dimension. Specific distribution of DMRSs 82 in the second pattern is as follows: In the time domain dimension, the DMRSs 82 occupy last two symbols of the first slot. In the frequency domain dimension, from bottom to top, the DMRSs 82 occupy a first combination of a subcarrier 0 and a subcarrier 1, a second combination of a subcarrier 5 and a subcarrier 6, and a third combination of a subcarrier 10 and a subcarrier 11.

Figure 8N:
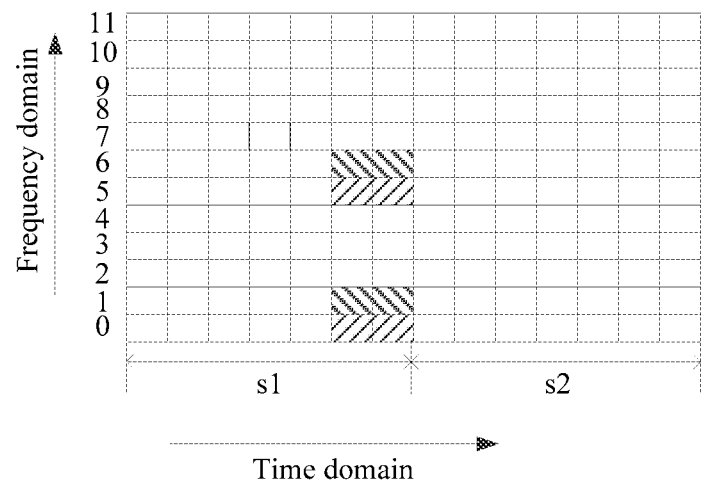
FIG. 8N is a schematic diagram of a second pattern according to an embodiment of this application.

The example in which the second reference signal is a DMRS is still used. As shown in FIG. 8N, second reference signals occupy last two symbols of a first slot in a time domain dimension, and occupy a first combination and a second combination in a frequency domain dimension.

Figure 8O:
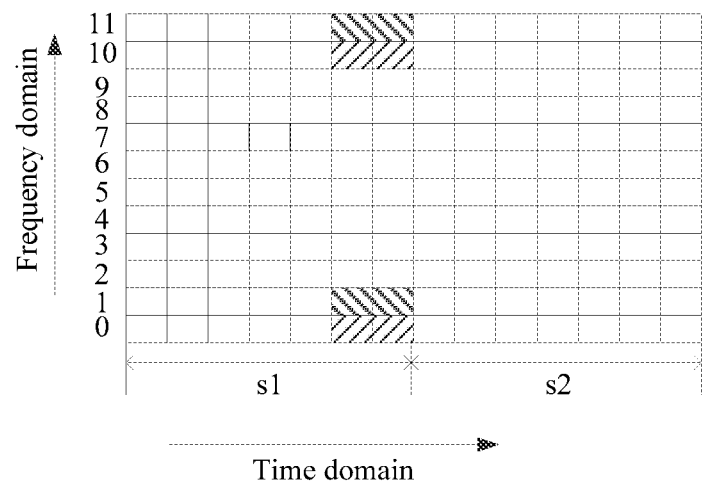
FIG. 8O is a schematic diagram of a second pattern according to an embodiment of this application.

Alternatively, the second pattern is shown in FIG. 8O. Second reference signals occupy last two symbols of a first slot in a time domain dimension, and occupy a first combination and a third combination in a frequency domain dimension.

Figure 8P:
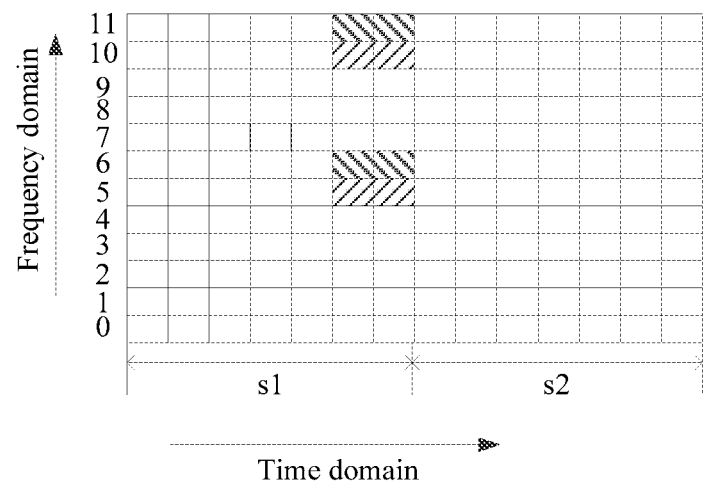
FIG. 8P is a schematic diagram of a second pattern according to an embodiment of this application.

Alternatively, the second pattern is shown in FIG. 8P. Second reference signals occupy last two symbols of a first slot in a time domain dimension, and occupy a second combination and a third combination in a frequency domain dimension.

Figure 8Q:
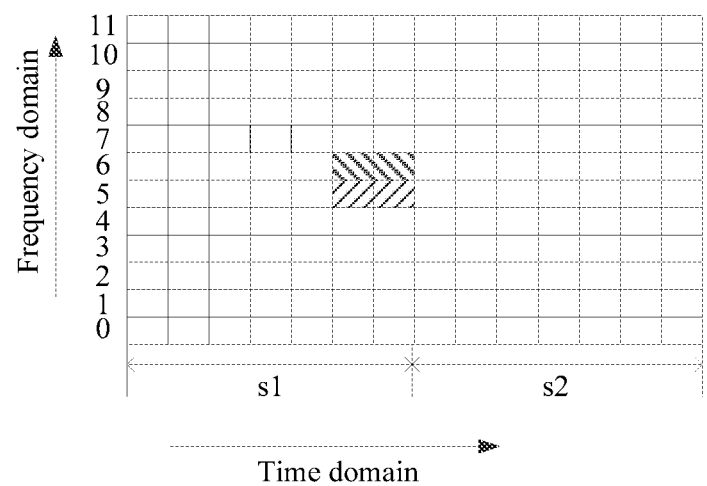
FIG. 8Q is a schematic diagram of a second pattern according to an embodiment of this application.

Alternatively, the second pattern is shown in FIG. 8Q. Second reference signals occupy last two symbols of a first slot in a time domain dimension, and occupy a second combination in a frequency domain dimension.

Figure 8R:
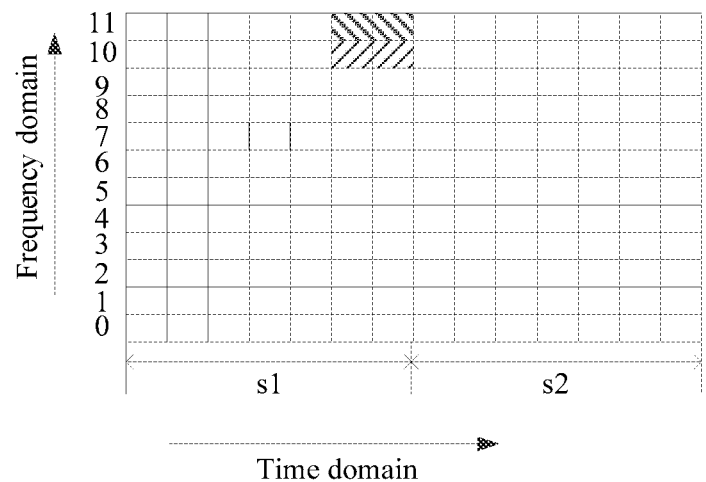
FIG. 8R is a schematic diagram of a second pattern according to an embodiment of this application.

Alternatively, the second pattern is shown in FIG. 8R. Second reference signals occupy last two symbols of a first slot in a time domain dimension, and occupy a third combination in a frequency domain dimension.

Figure 8S:
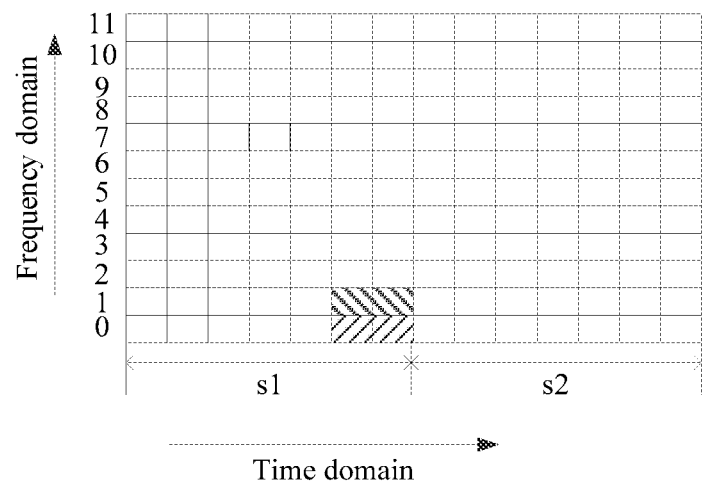
FIG. 8S is a schematic diagram of a second pattern according to an embodiment of this application.

Alternatively, the second pattern is shown in FIG. 8S. Second reference signals occupy last two symbols of a first slot in a time domain dimension, and occupy a first combination in a frequency domain dimension.

In this case, the second reference signals are distributed in the second pattern in a total of seven manners, or in other words, there are seven types of second patterns in total.

Figure 8T:
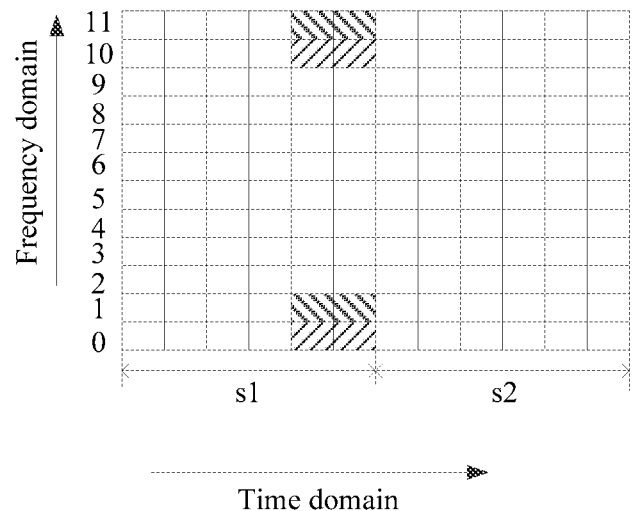
FIG. 8T is a schematic diagram of a second pattern according to an embodiment of this application.
Figure 8U:
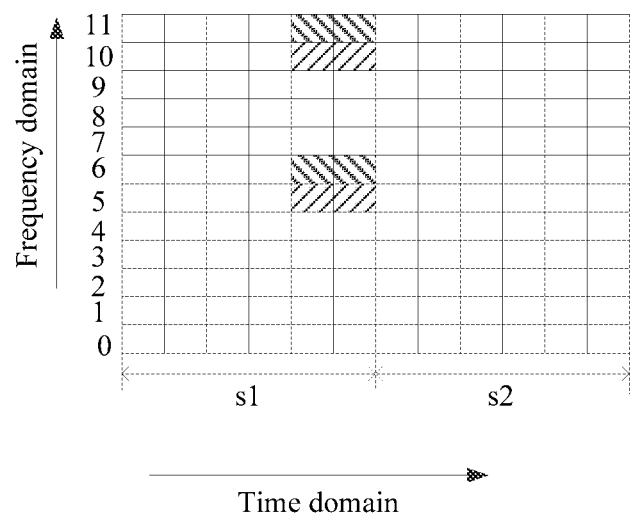
FIG. 8U is a schematic diagram of a second pattern according to an embodiment of this application.
Figure 8V:
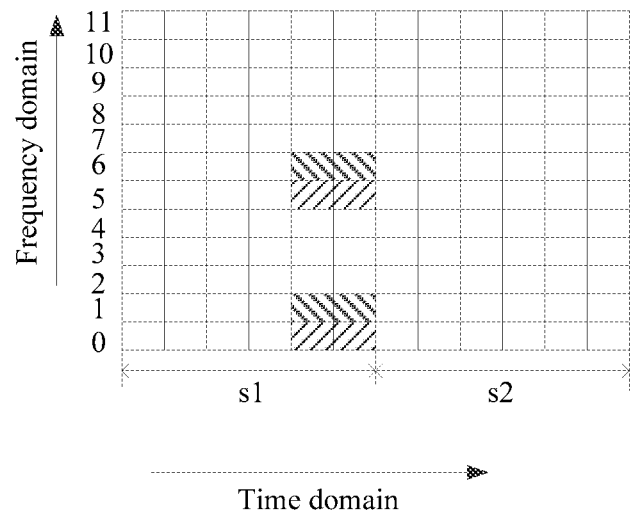
FIG. 8V is a schematic diagram of a second pattern according to an embodiment of this application.
Figure 8W:
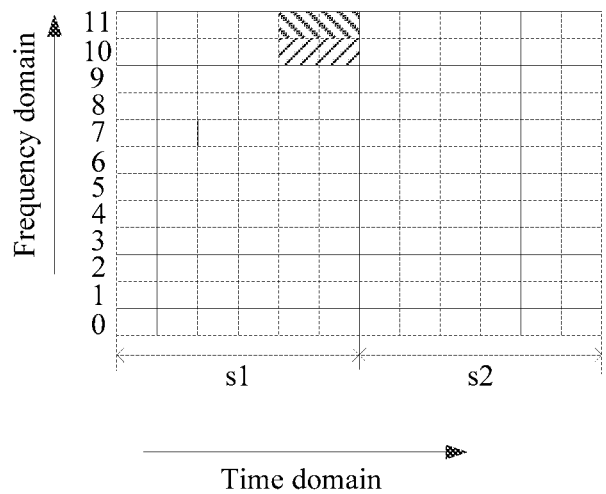
FIG. 8W is a schematic diagram of a second pattern according to an embodiment of this application.
Figure 8X:
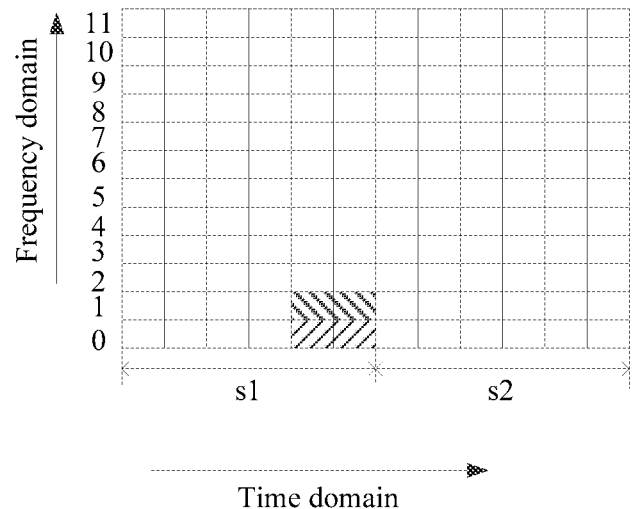
FIG. 8X is a schematic diagram of a second pattern according to an embodiment of this application.
Figure 8Y:
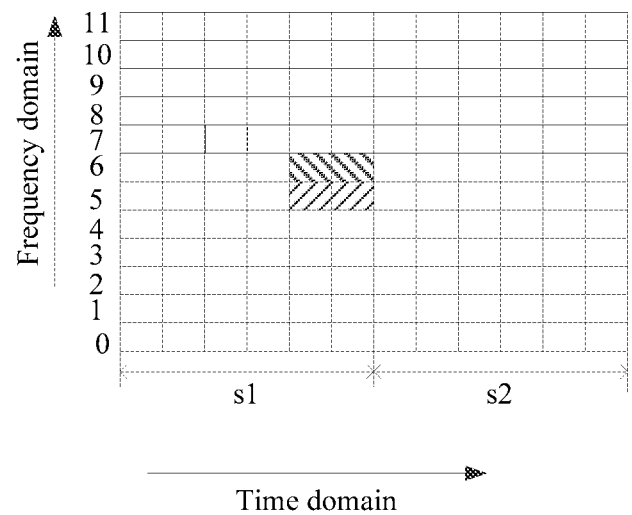
FIG. 8Y is a schematic diagram of a second pattern according to an embodiment of this application.
Figure 8Z:
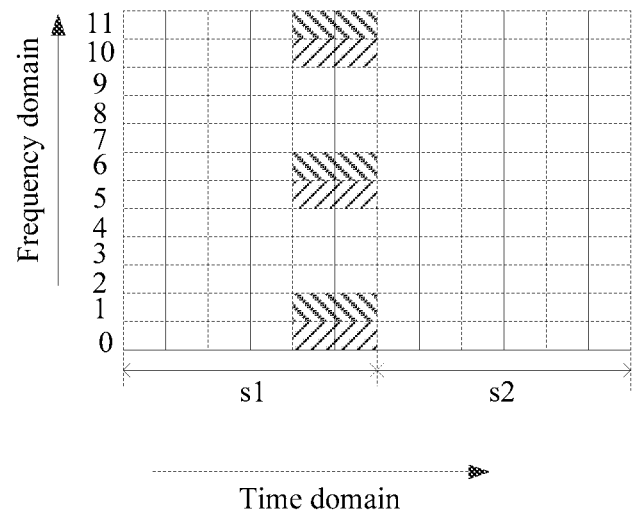
FIG. 8Z is a schematic diagram of a second pattern according to an embodiment of this application.
Figure 8A:
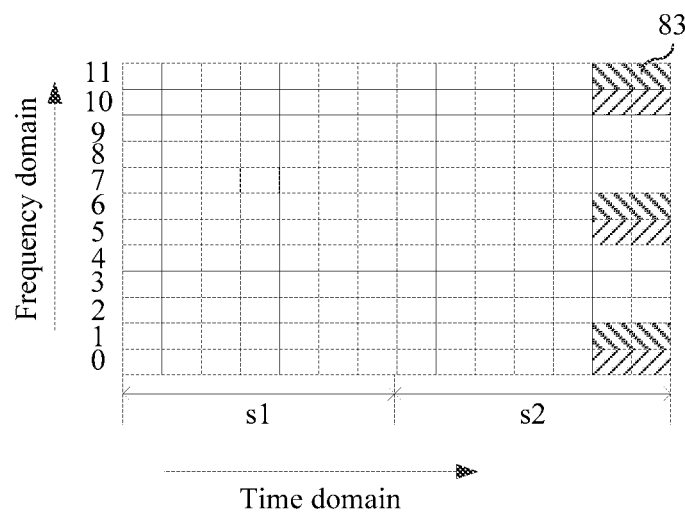
Figure 8B:
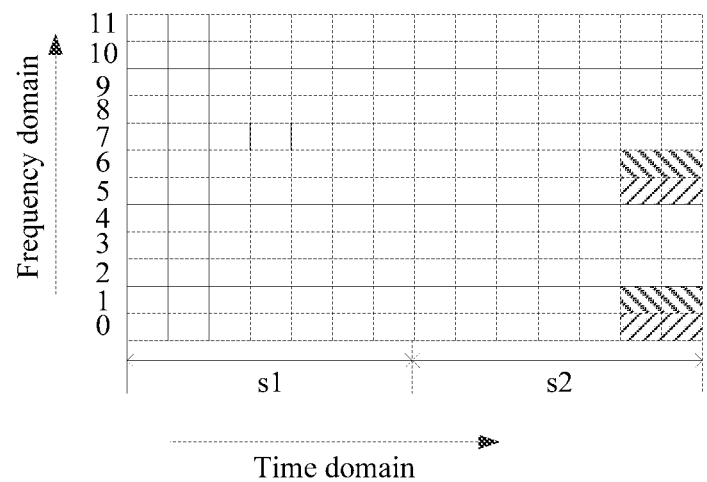
Figure 8C:
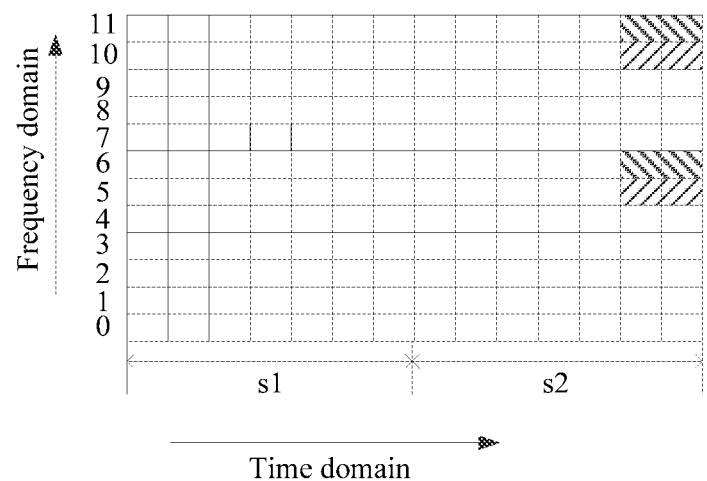
Figure 8D:
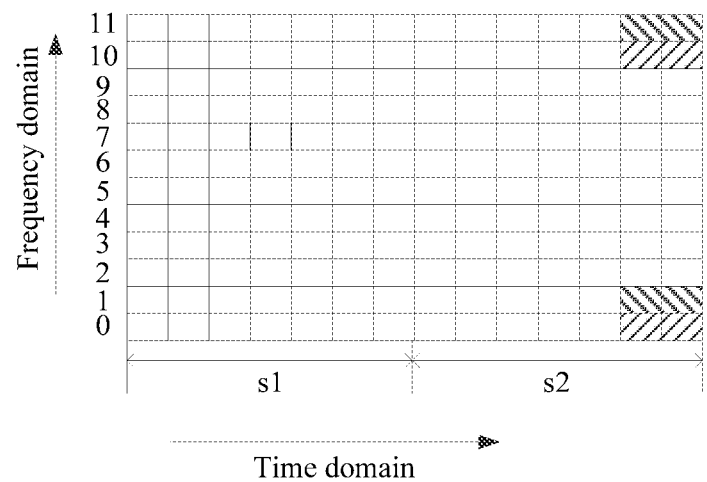
Figure 8E:
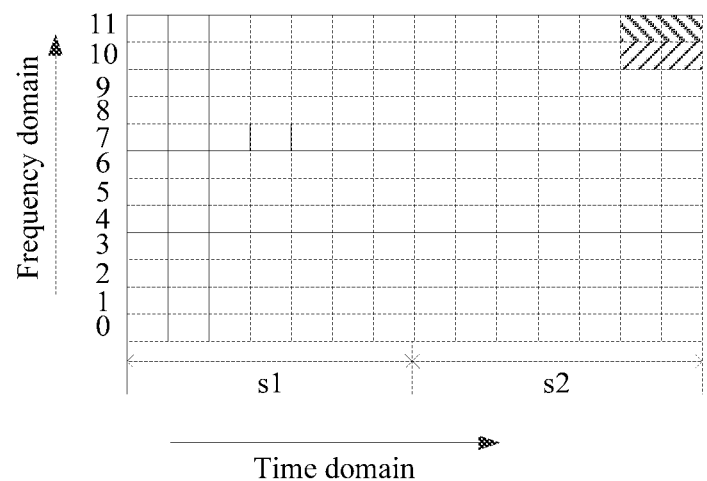
Figure 8F:
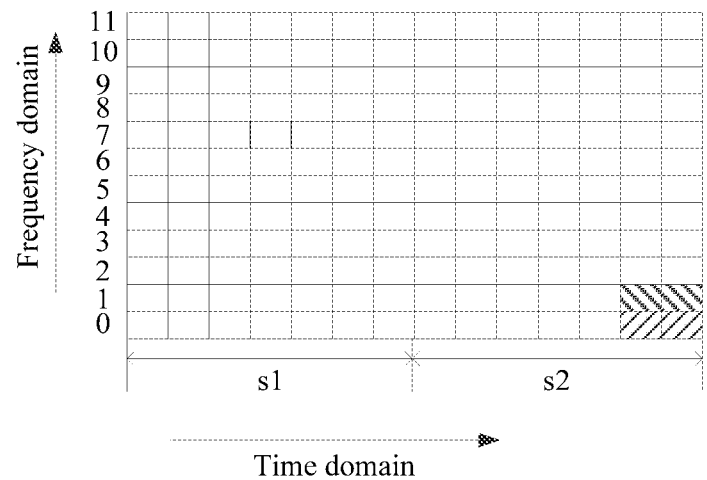
Figure 8G:
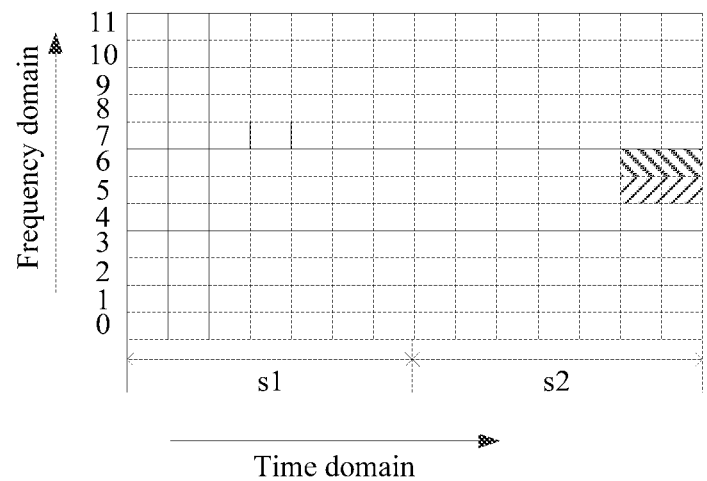
Figure 8H:
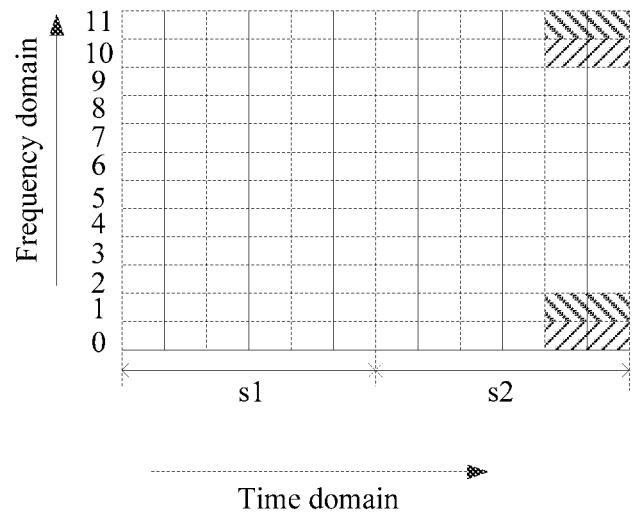
Figure 8I:
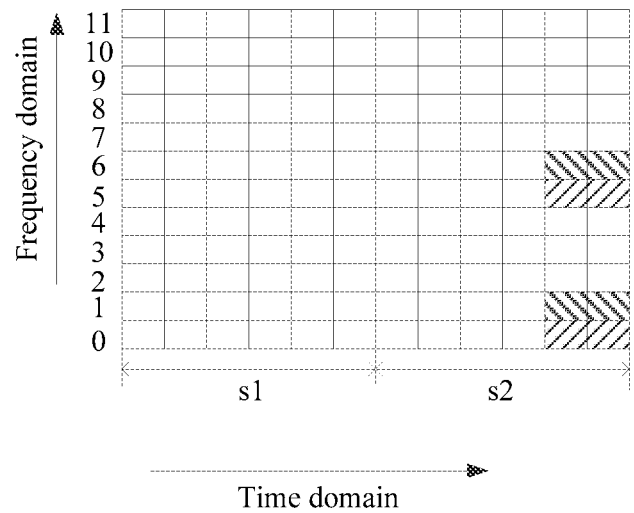
Figure 8J:
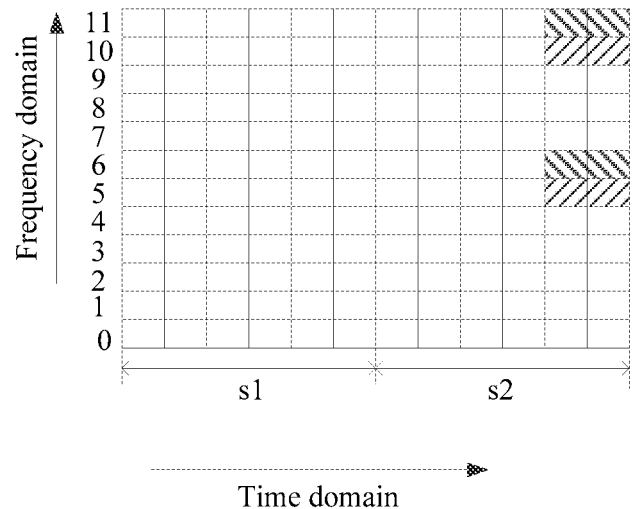
Figure 8K:
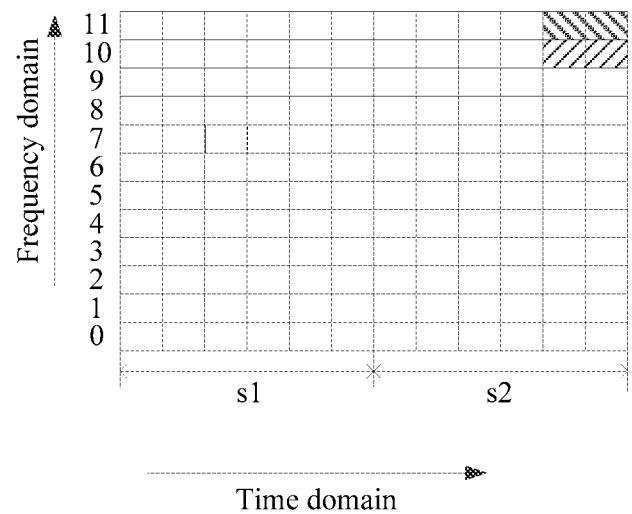
Figure 8L:
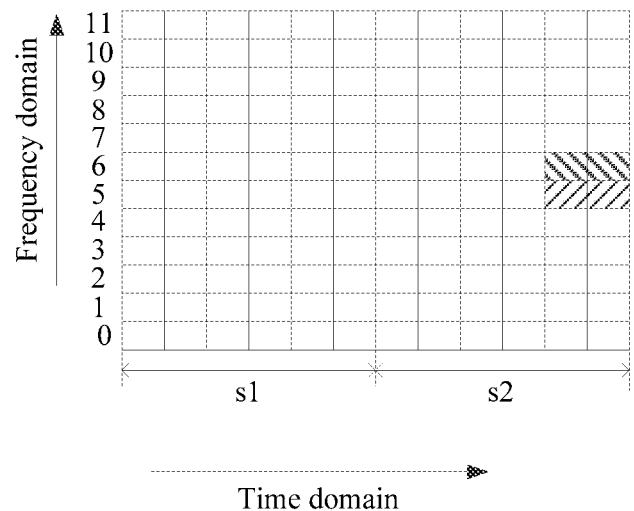
Figure 8M:
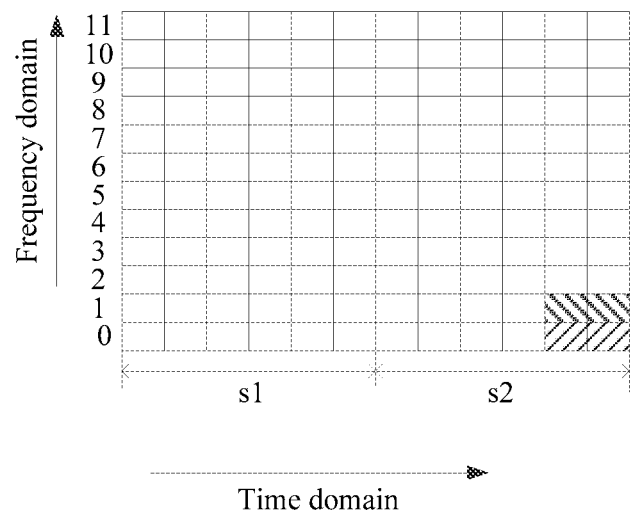
Figure 8N:
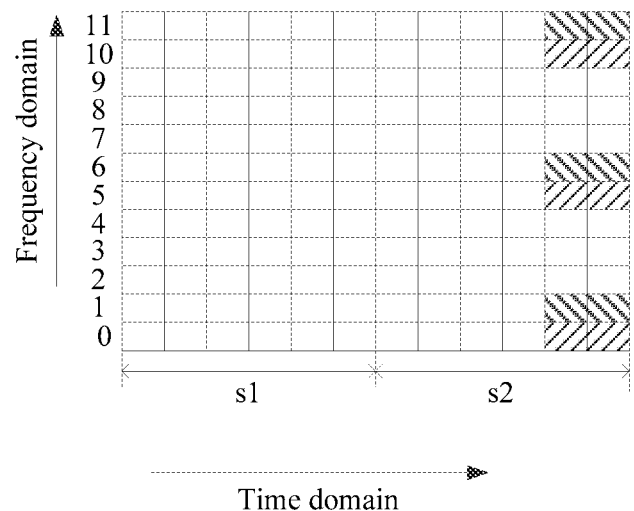
Figure 8O:
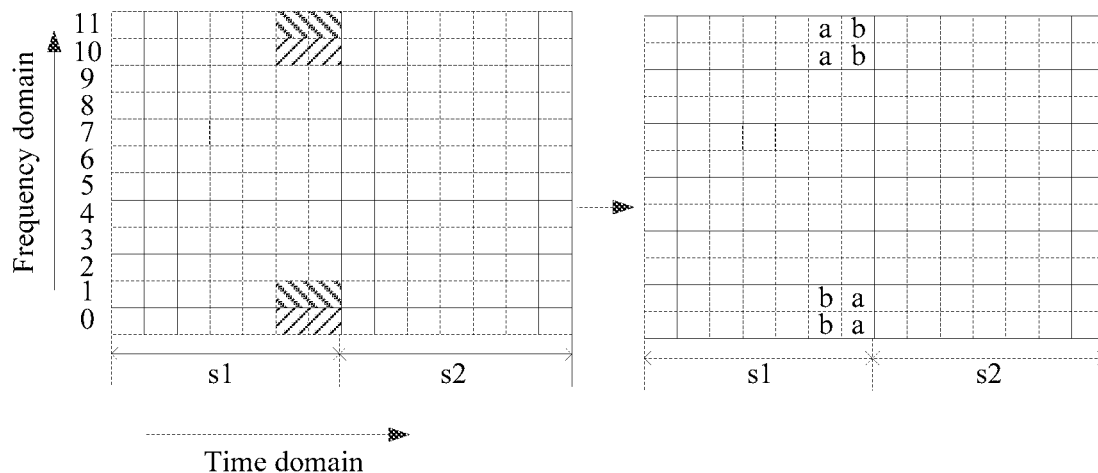
Figure 8P:
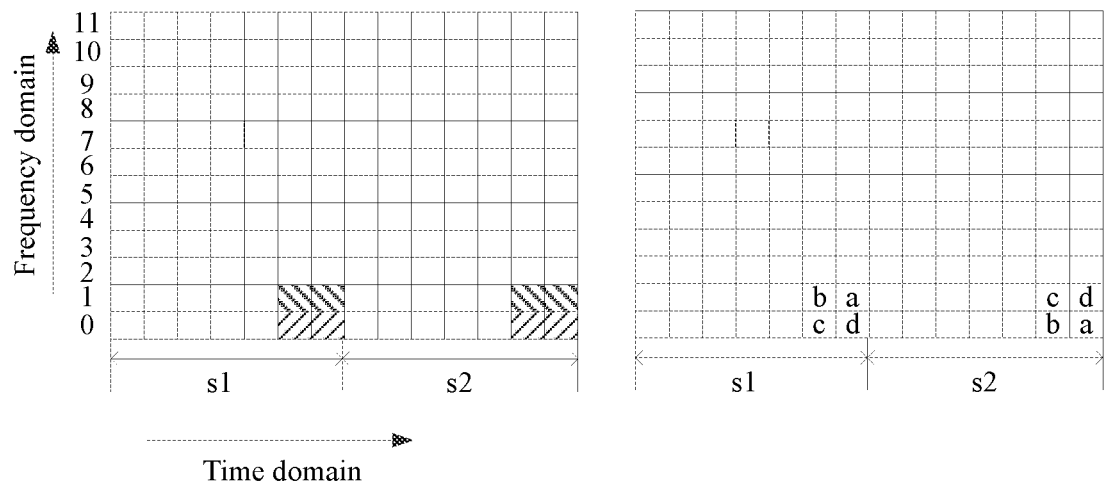

Similarly, in a case of an extended cyclic prefix, for example, DMRSs occupy a first combination and a third combination. The second pattern is shown in FIG. 8T. In addition, the second pattern may alternatively be shown in FIG. 8U, FIG. 8V, FIG. 8W, FIG. 8X, FIG. 8Y, or FIG. 8Z. In this case, the second reference signals are distributed in the second pattern in a total of seven manners, or in other words, there are seven types of second patterns in total.

(3) In the second pattern, second reference signals are divided into two CDM groups, and the two groups of second reference signals each occupy last two symbols of only the second slot in a time domain dimension. In the second slot, a first group of second reference signals and a second group of second reference signals correspondingly occupy at least one of a first combination of a subcarrier X and a subcarrier X+1, a second combination of a subcarrier Y and a subcarrier Y+1, and a third combination of a subcarrier Z and a subcarrier Z+1.

The two groups of second reference signals each occupy the last two symbols of the second slot in the time domain dimension, and in the second slot, occupy the first combination, the second combination, and the third combination; the first combination and the second combination; the first combination and the third combination; the second combination and third combination; the first combination; the second combination; or the third combination in the frequency domain dimension.

Optionally, X is an integer greater than or equal to 0 and less than or equal to 10, Y is an integer greater than or equal to 0 and less than or equal to 10, and Z is an integer greater than or equal to 0 and less than or equal to 10.

For example, the second reference signal is a DMRS and the second pattern is shown in FIG. 8a in a case of a normal cyclic prefix. In the figure, two physical resource blocks, namely a physical resource block pair, are corresponding to a slot s1 and a slot s2, respectively. Each physical resource block occupies seven OFDM symbols in a time domain dimension, and occupies 12 subcarriers in a frequency domain dimension. Specific distribution of DMRSs 83 in the second pattern is as follows: In the time domain dimension, the DMRSs 83 occupy last two symbols of the second slot. In the frequency domain dimension, from bottom to top, the DMRSs 83 occupy a first combination of a subcarrier 0 and a subcarrier 1, a second combination of a subcarrier 5 and a subcarrier 6, and a third combination of a subcarrier 10 and a subcarrier 11. If the example in which the second reference signal is a DMRS is still used, the second pattern may alternatively be shown in FIG. 8b, FIG. 8c, FIG. 8d, FIG. 8e, FIG. 8f, or FIG. 8g.

In this case, the second reference signals are distributed in the second pattern in a total of seven manners, or in other words, there are seven types of second patterns in total.

Similarly, in a case of an extended cyclic prefix, for example, DMRSs occupy a first combination and a third combination. The second pattern is shown in FIG. 8h. In addition, the second pattern may alternatively be shown in FIG. 8i, FIG. 8j, FIG. 8k, FIG. 8l, FIG. 8m, or FIG. 8n. In this case, the second reference signals are distributed in the second pattern in a total of seven manners, or in other words, there are seven types of second patterns in total.

In the optional embodiment based on FIG. 8A, FIG. 8B, FIG. 8C, FIG. 8D, FIG. 8E, FIG. 8F, FIG. 8G; FIG. 8H, FIG. 8I, FIG. 8J, FIG. 8K, FIG. 8L, FIG. 8M, FIG. 8N, FIG. 8O, FIG. 8P, FIG. 8Q, FIG. 8R, FIG. 8S, FIG. 8T, FIG. 8U, FIG. 8V, FIG. 8W, FIG. 8X, FIG. 8Y, FIG. 8Z, FIG. 8a, FIG. 8b, FIG. 8c, FIG. 8d, FIG. 8e, FIG. 8f, FIG. 8g, FIG. 8h, FIG. 8i, FIG. 8j, FIG. 8k, FIG. 8l, FIG. 8m, or FIG. 8n, when a length of an OCC is 2, a spreading sequence whose length is 2 is [1 1] or [1 −1]; and two second reference signals in a same group that are transmitted by using two time-frequency resources in the second pattern that include a same subcarrier in a frequency domain dimension and last two symbols of a same slot in a time domain dimension are reference signals orthogonal to each other after being spread by using the spreading sequence whose length is 2.

For example, in FIG. 8o, spreading sequences are a=[1 1] and b=[1 −1]. A first group of second reference signals occupies a total of four time-frequency resources that include last two OFDM symbols of a first slot and a subcarrier 11 and a subcarrier 1 in a frequency domain dimension, as shown on a left side of FIG. 8o. Two second reference signals transmitted by using time-frequency resources that include the subcarrier 11 in the first group in the frequency domain dimension and last two OFDM symbols of a first slot in a time domain dimension are spread by using a=[1 1] and b=[1 −1]; and two second reference signals transmitted by using time-frequency resources that include the subcarrier 1 in the first group in the frequency domain dimension and the last two OFDM symbols of the first slot in the time domain dimension are spread by using b=[1 −1] and a=[1 1], as shown on a right side of FIG. 8o. Similarly, four second reference signals in a second group that are transmitted by using a total of four time-frequency resources that include the last two OFDM symbols of the first slot in the frequency domain dimension and a subcarrier 0 and a subcarrier 10 in the time domain dimension are spread in a manner shown on the right side of FIG. 8o.

In the optional embodiment based on FIG. 8A, FIG. 8B, FIG. 8C, FIG. 8D, FIG. 8E, FIG. 8F, FIG. 8G, FIG. 8H, FIG. 8I, FIG. 8J, FIG. 8K, FIG. 8L, FIG. 8M, FIG. 8N, FIG. 8O, FIG. 8P, FIG. 8Q, FIG. 8R, FIG. 8S, FIG. 8T, FIG. 8U, FIG. 8V, FIG. 8W, FIG. 8X, FIG. 8Y, FIG. 8Z, FIG. 8a, FIG. 8b, FIG. 8c, FIG. 8d, FIG. 8e, FIG. 8f, FIG. 8g, FIG. 8h, FIG. 8i, FIG. 8j, FIG. 8k, FIG. 8l, FIG. 8m, or FIG. 8n, when the length of the OCC is 4, a spreading sequence whose length is 4 is $a$=[1 1 1 1], b=[1 −1 1 −1], c=[1 1−1 −1], or d=[1 −1 −1 1]; and four second reference signals in a same group that are transmitted by using a total of four time-frequency resources in the second pattern that include a same subcarrier in a frequency domain dimension and last two symbols of each slot in a time domain dimension are reference signals orthogonal to each other after being spread by using the spreading sequence whose length is 4.

For example, in FIG. 8$p$, spreading sequences are a=[1 1 1 1], b=[1 −1 1 −1], c=[1 1−1 −1], and d=[1 −1 −1 1]. A first group of second reference signals occupies last two OFDM symbols of a first slot and last two OFDM symbols of a second slot in a time domain dimension, and occupies a subcarrier 1 in a frequency domain dimension, as shown on a left side of FIG. 8$p$. The four second reference signals in the first group are spread by using the spreading sequences a=[1 1 1 1], b=[1 −1 1 −1], c=[1 1−1 −1], and d=[1 −1 −1 1], as shown on a right side of FIG. 8$p$.

Optionally, a spreading manner, used when the length of the OCC is 4, of the second reference signal transmitted by using the second pattern is different from a spreading manner, used when the length of the OCC is 4, of the second reference signal transmitted by using the third pattern. When the length of the OCC is 4, for the second reference signal transmitted by using the third pattern, a plurality of spreading sequences are used simultaneously on each time-frequency resource and the spreading sequences used are the same.

Optionally, a first time-frequency resource, a second time-frequency resource, a third time-frequency resource, a fourth time-frequency resource, a fifth time-frequency resource, and a sixth time-frequency resource exist in the second pattern.

The first time-frequency resource, the second time-frequency resource, the third time-frequency resource, and the fourth time-frequency resource include a same subcarrier in a frequency domain dimension, the fifth time-frequency resource and the sixth time-frequency resource include another subcarrier in the frequency domain dimension. The first time-frequency resource and the second time-frequency resource include last two symbols of a slot in a time domain dimension, the third time-frequency resource and the fourth time-frequency resource include last two symbols of another slot in the time domain dimension, the fifth time-frequency resource and the first time-frequency resource include a same symbol in the time domain dimension, and the sixth time-frequency resource and the second time-frequency resource include a same symbol in the time domain dimension.

Four second reference signals transmitted by using the first time-frequency resource, the second time-frequency resource, the third time-frequency resource, and the fourth time-frequency resource are reference signals orthogonal to each other after being spread by using a spreading sequence whose length is 4; and four second reference signals transmitted by using the first time-frequency resource, the second time-frequency resource, the fifth time-frequency resource, and the sixth time-frequency resource are reference signals orthogonal to each other after being spread by using the spreading sequence whose length is 4.

For example, in FIG. 8$p$, spreading sequences are a=[1 1 1 1], b=[1 −1 1 −1], c=[1 1−1 −1], and d=[1 −1 −1 1]. A time-frequency resource that includes a subcarrier 1 in the frequency domain dimension and a last symbol of the first slot in the time domain dimension is a first time-frequency resource; a time-frequency resource that includes the subcarrier 1 in the frequency domain dimension and a last but one symbol of the first slot in the time domain dimension is a second time-frequency resource; a time-frequency resource that includes the subcarrier 1 in the frequency domain dimension and a last but one symbol of the second slot in the time domain dimension is a third time-frequency resource; a time-frequency resource that includes the subcarrier 1 in the frequency domain dimension and a last symbol of the second slot in the time domain dimension is a fourth time-frequency resource; a time-frequency resource that includes a subcarrier 0 in the frequency domain dimension and the last symbol of the first slot in the time domain dimension is a fifth time-frequency resource; and a time-frequency resource that includes the subcarrier 0 in the frequency domain dimension and the last but one symbol of the first slot in the time domain dimension is a sixth time-frequency resource. Four second reference signals transmitted by using a total of four time-frequency resources including the first time-frequency resource, the second time-frequency resource, the third time-frequency resource, and the fourth time-frequency resource are spread by using the spreading sequences a, b, c, and d, and four second reference signals transmitted by using the first time-frequency resource, the second time-frequency resource, the fifth time-frequency resource, and the sixth time-frequency resource are spread by using the spreading sequences a, b, d, and c.

Optionally, in the channel estimation method provided in this embodiment of this application, the first time unit is before the second time unit; a time unit is a subframe including a first slot and a second slot; a time-frequency resource in the first pattern is a part of the time-frequency resource in the third pattern, and the first pattern and the second pattern do not overlap, or in other words, there is no intersection between the time-frequency resource in the first pattern and the time-frequency resource in the second pattern. It should be noted that, when the channel estimation method provided in this application is used in N continuous time units, the first pattern is only in the first slot, where N is greater than or equal to 3.

The first pattern is a time-frequency distribution pattern, used when the first reference signal is used in joint channel estimation, of the first reference signal in the first time unit. The second pattern is a time-frequency distribution pattern, used when the second reference signal is used in joint channel estimation, of the second reference signal in the second time unit.

The third pattern is a time-frequency distribution pattern, used when the second reference signal is not used in joint channel estimation, of the second reference signal in the second time unit. In other words, the third pattern is a time-frequency distribution pattern, used when the first precoding weight and the second precoding weight are different, of the second reference signal in the second time unit, or the third pattern is a time-frequency distribution pattern, used when the first reference signal does not exist in the first time unit and the second reference signal exists in the second time unit, of the second reference signal in the second time unit. Joint channel estimation is channel estimation performed by jointly using the first reference signal and the second reference signal.

When a density of time-frequency resources, used for transmitting second reference signals, namely DMRSs, in the third pattern is 12 time-frequency resources per physical resource block pair, because the time-frequency resource in the first pattern is a part of the time-frequency resource in the third pattern, the first reference signal is distributed in the first pattern in the following manner:

In the first pattern, first reference signals occupy last two symbols of the first slot in a time domain dimension, and occupy, in a frequency domain dimension, at least one of a subcarrier X, a subcarrier Y, and a subcarrier Z that appear at an interval.

In the first pattern, the first reference signals occupy the subcarrier X; the subcarrier Y; the subcarrier Z; the subcarrier X and the subcarrier Y; the subcarrier X and the subcarrier Z; the subcarrier Y and the subcarrier Z; or the subcarrier X, the subcarrier Y, and the subcarrier Z in the frequency domain dimension, where the subcarriers appear at an interval.

Optionally, X is an integer greater than or equal to 0 and less than or equal to 11, Y is an integer greater than or equal to 0 and less than or equal to 11, and Z is an integer greater than or equal to 0 and less than or equal to 11.

Figure 9A:
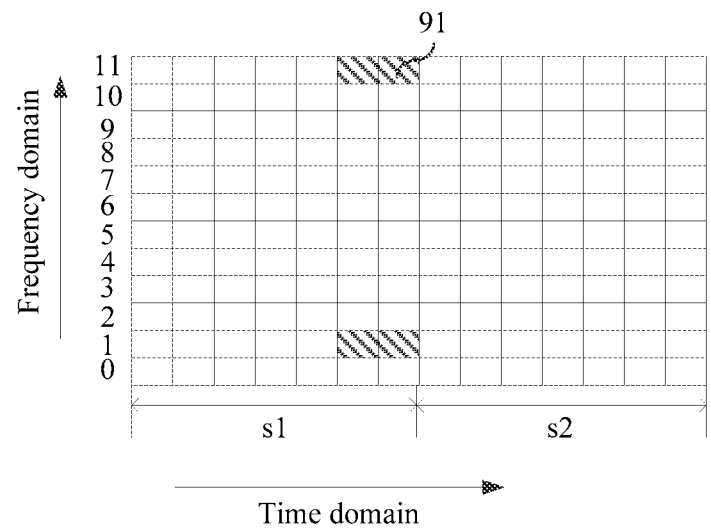
FIG. 9A is a schematic diagram of a first pattern according to an embodiment of this application.

For example, the first reference signal is a CSI-RS and the first pattern is shown in FIG. 9A in a case of a normal cyclic prefix. CSI-RSs 91 occupy last two symbols of a first slot in a time domain dimension, and occupy a subcarrier 1 and a subcarrier 11 in a frequency domain dimension.

Figure 9B:
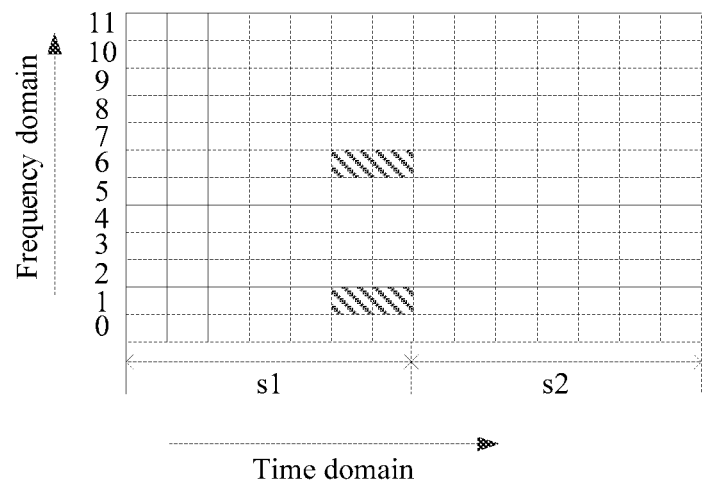
FIG. 9B is a schematic diagram of a first pattern according to an embodiment of this application.

Alternatively, the first pattern is shown in FIG. 9B. First reference signals occupy last two symbols of a first slot in a time domain dimension, and occupy a subcarrier 1 and a carrier 6 in a frequency domain dimension.

Figure 9C:
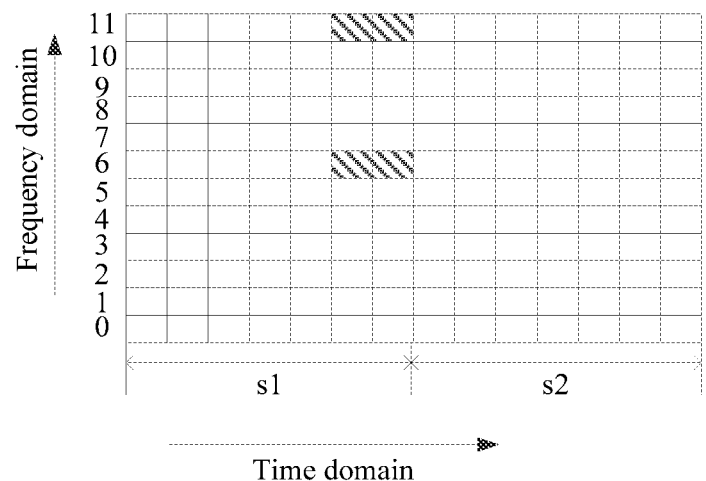
FIG. 9C is a schematic diagram of a first pattern according to an embodiment of this application.

Alternatively, the first pattern is shown in FIG. 9C. First reference signals occupy last two symbols of a first slot in a time domain dimension, and occupy a subcarrier 11 and a carrier 6 in a frequency domain dimension.

Figure 9D:
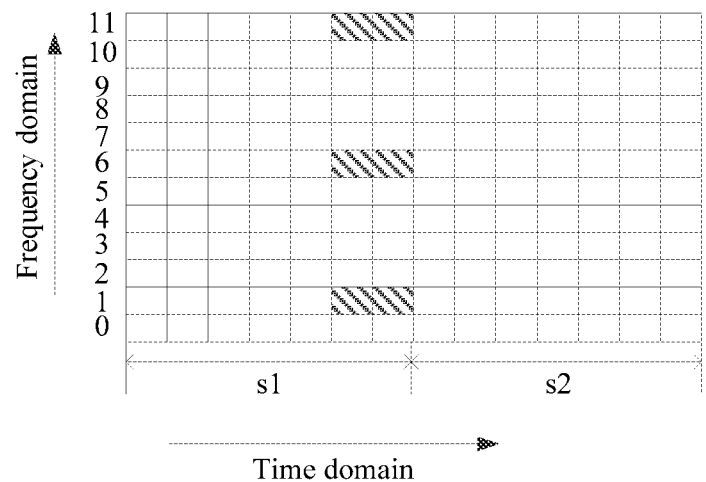
FIG. 9D is a schematic diagram of a first pattern according to an embodiment of this application.

Alternatively, the first pattern is shown in FIG. 9D. First reference signals occupy last two symbols of a first slot in a time domain dimension, and occupy a subcarrier 11, a subcarrier 6, and a subcarrier 1 in a frequency domain dimension.

Figure 9E:
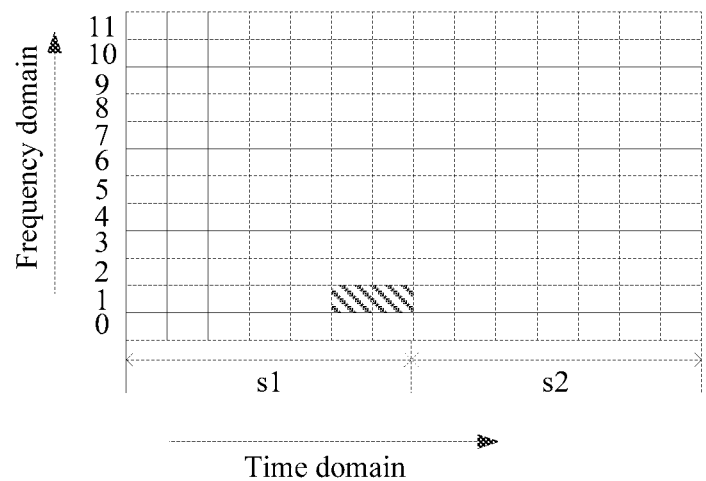
FIG. 9E is a schematic diagram of a first pattern according to an embodiment of this application.

Alternatively, the first pattern is shown in FIG. 9E. First reference signals occupy last two symbols of a first slot in a time domain dimension, and occupy a subcarrier 1 in a frequency domain dimension.

Figure 9F:
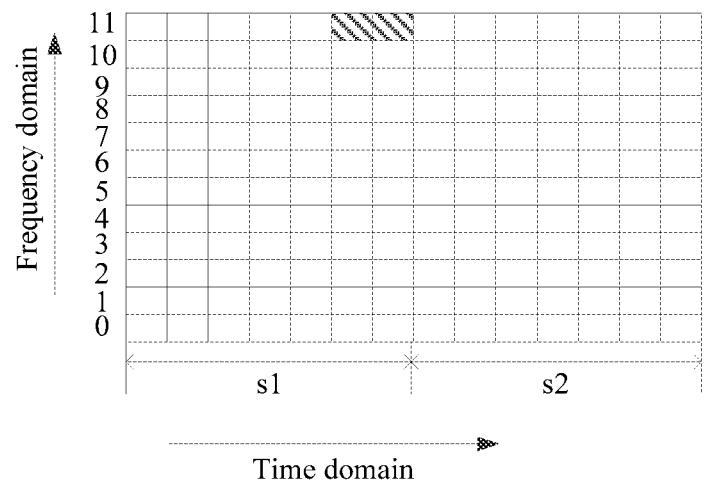
FIG. 9F is a schematic diagram of a first pattern according to an embodiment of this application.

Alternatively, the first pattern is shown in FIG. 9F. First reference signals occupy last two symbols of a first slot in a time domain dimension, and occupy a subcarrier 11 in a frequency domain dimension.

Figure 9G:
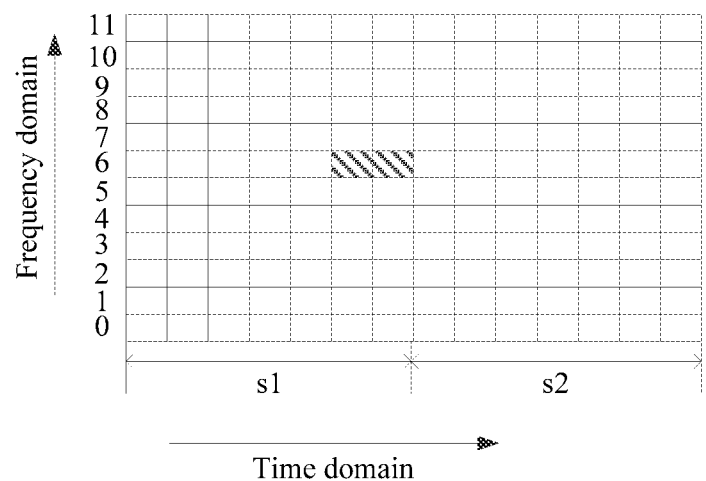
FIG. 9G is a schematic diagram of a first pattern according to an embodiment of this application.

Alternatively, the first pattern is shown in FIG. 9G First reference signals occupy last two symbols of a first slot in a time domain dimension, and occupy a subcarrier 6 in a frequency domain dimension.

In this case, as shown in FIG. 9A to FIG. 9G, there are seven types of first patterns in total.

Figure 9H:
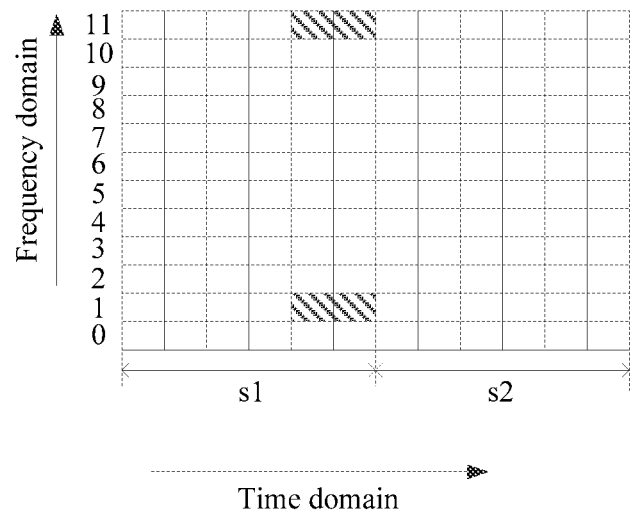
FIG. 9H is a schematic diagram of a first pattern according to an embodiment of this application.
Figure 9I:
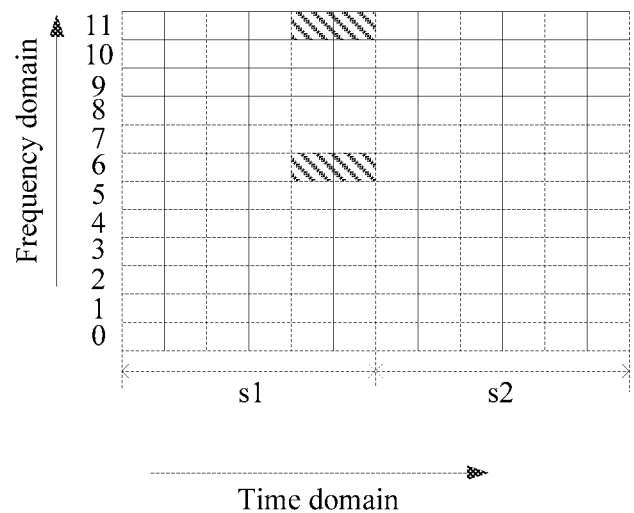
FIG. 9I is a schematic diagram of a first pattern according to an embodiment of this application.
Figure 9J:
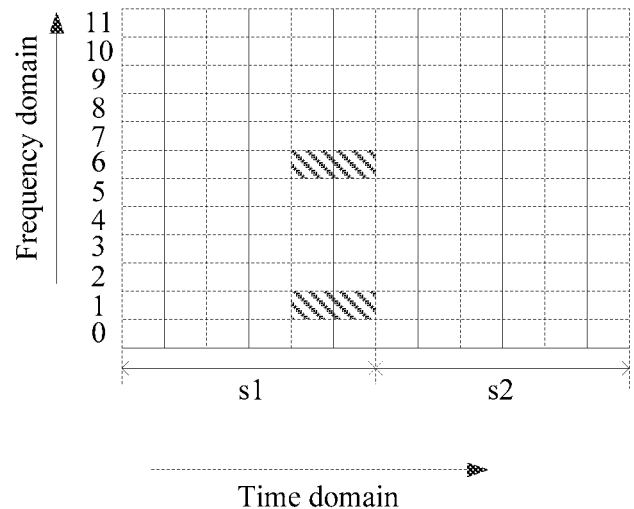
FIG. 9J is a schematic diagram of a first pattern according to an embodiment of this application.
Figure 9K:
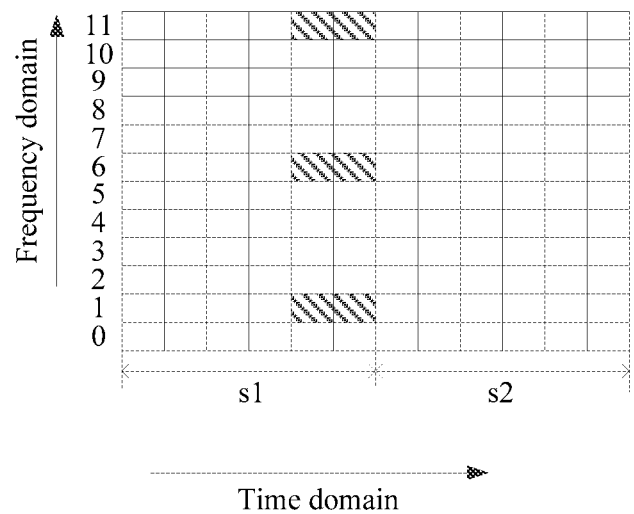
FIG. 9K is a schematic diagram of a first pattern according to an embodiment of this application.
Figure 9L:
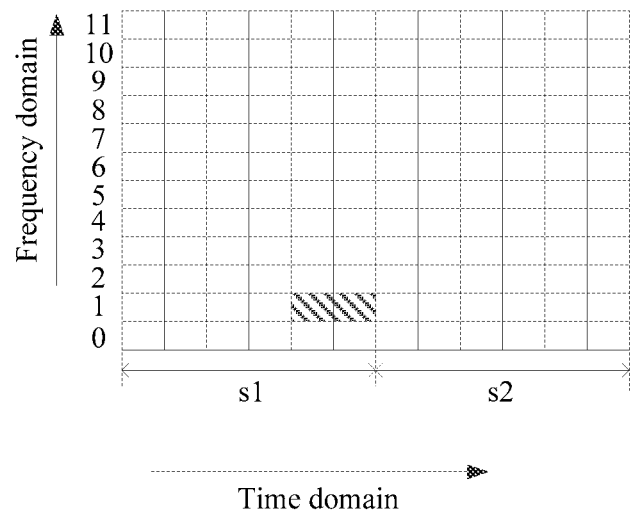
FIG. 9L is a schematic diagram of a first pattern according to an embodiment of this application.
Figure 9M:
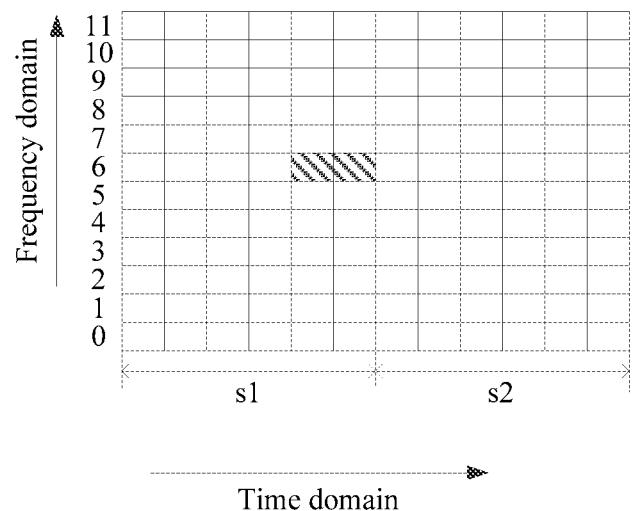
FIG. 9M is a schematic diagram of a first pattern according to an embodiment of this application.
Figure 9N:
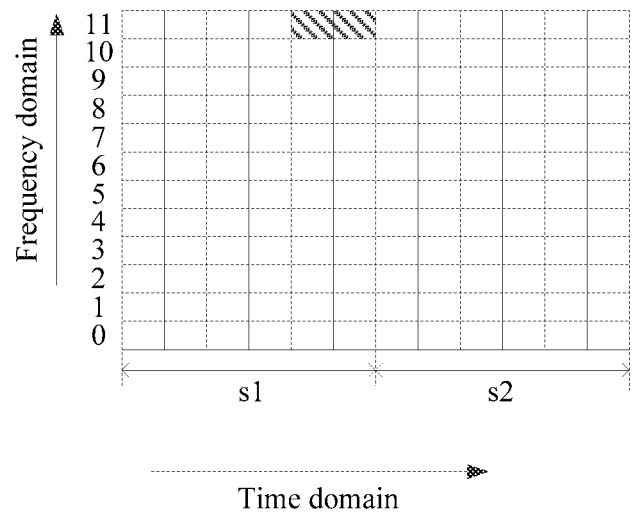
FIG. 9N is a schematic diagram of a first pattern according to an embodiment of this application.

Similarly, in a case of an extended cyclic prefix, for example, CSI-RSs occupy last two symbols of a first slot in a time domain dimension, and occupy a subcarrier 1 and a subcarrier 11 in a frequency domain dimension. The first pattern is shown in FIG. 9H. In addition, the first pattern may alternatively be shown in FIG. 9I, FIG. 9J, FIG. 9K, FIG. 9L, FIG. 9M, or FIG. 9N. In this case, there are seven types of first patterns in total.

When a density of time-frequency resources, used for transmitting second reference signals, namely DMRSs, in the third pattern is 24 time-frequency resources per physical resource block pair, because the time-frequency resource in the first pattern is a part of the time-frequency resource in the third pattern, the first reference signal is distributed in the first pattern is the following manner:

In the first pattern, first reference signals are divided into two CDM groups, and the two groups of first reference signals each occupy last two symbols of the first slot in a time domain dimension. A first group of first reference signals and a second group of first reference signals correspondingly occupy at least one of a first combination of a subcarrier X and a subcarrier X+1, a second combination of a subcarrier Y and a subcarrier Y+1, and a third combination of a subcarrier Z and a subcarrier Z+1.

In the first pattern, the first group of first reference signals and the second group of first reference signals correspondingly occupy the first combination of the subcarrier X and the subcarrier X+1, the second combination of the subcarrier Y and the subcarrier Y+1, and the third combination of the subcarrier Z and the subcarrier Z+1; the first combination and the second combination; the first combination and the third combination; the second combination and the third combination; the first combination; the second combination; or the third combination in the frequency domain dimension.

In other words, the first group of first reference signals occupies the subcarrier X, the subcarrier Y, and the subcarrier Z in the frequency domain dimension, and the second group of first reference signals occupies the subcarrier X+1, the subcarrier Y+1, and the subcarrier Z+1 in the frequency domain dimension.

Optionally, X is an integer greater than or equal to 0 and less than or equal to 10, Y is an integer greater than or equal to 0 and less than or equal to 10, and Z is an integer greater than or equal to 0 and less than or equal to 10.

Figure 9O:
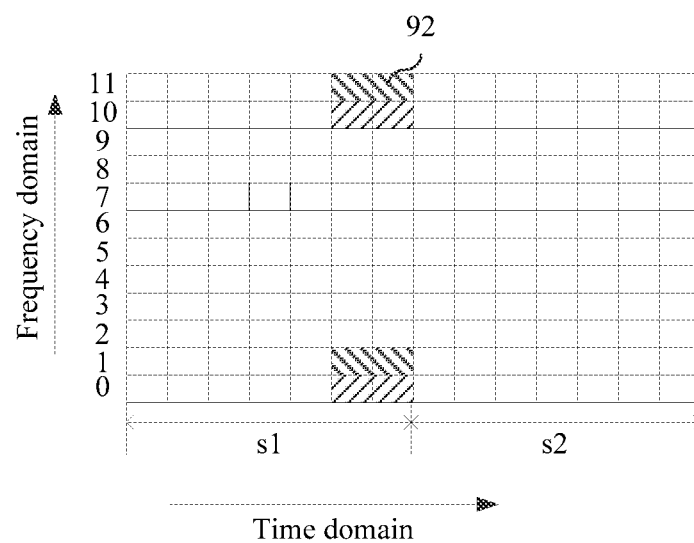
FIG. 9O is a schematic diagram of a first pattern according to an embodiment of this application.

For example, the first reference signal is a CSI-RS and the first pattern is shown in FIG. 9O in a case of a normal cyclic prefix. CSI-RSs 92 occupy last two symbols of a first slot in a time domain dimension, and occupy a first combination and a third combination in a frequency domain dimension.

Figure 9P:
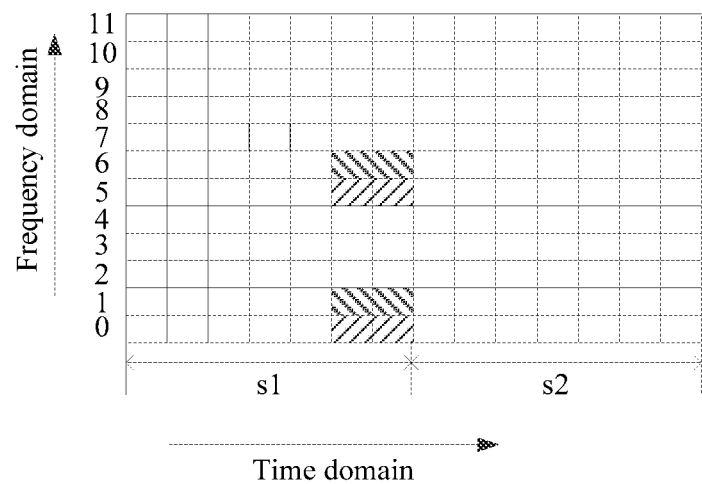
FIG. 9P is a schematic diagram of a first pattern according to an embodiment of this application.

Alternatively, the first pattern is shown in FIG. 9P. First reference signals occupy last two symbols of a first slot in a time domain dimension, and occupy a first combination and a second combination in a frequency domain dimension.

Figure 9Q:
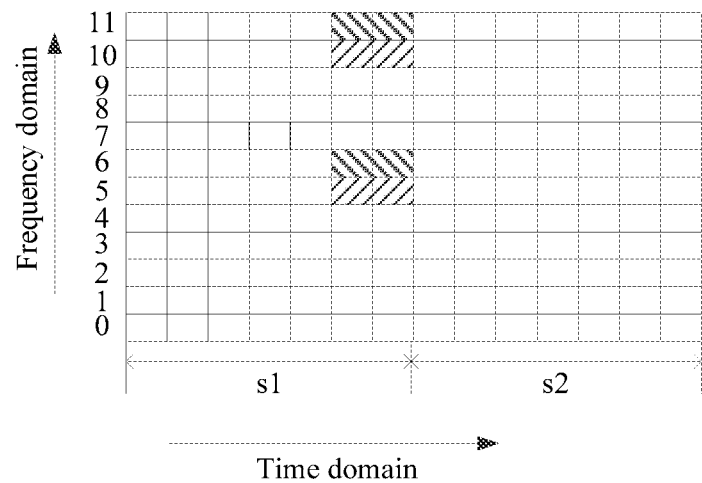
FIG. 9Q is a schematic diagram of a first pattern according to an embodiment of this application.

Alternatively, the first pattern is shown in FIG. 9Q. First reference signals occupy last two symbols of a first slot in a time domain dimension, and occupy a second combination and a third combination in a frequency domain dimension.

Figure 9R:
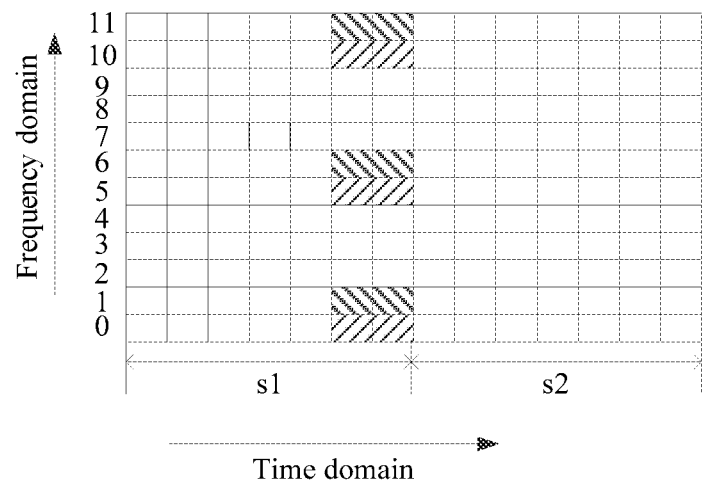
FIG. 9R is a schematic diagram of a first pattern according to an embodiment of this application.

Alternatively, the first pattern is shown in FIG. 9R. First reference signals occupy last two symbols of a first slot in a time domain dimension, and occupy a first combination, a second combination, and a third combination in a frequency domain dimension.

Figure 9S:
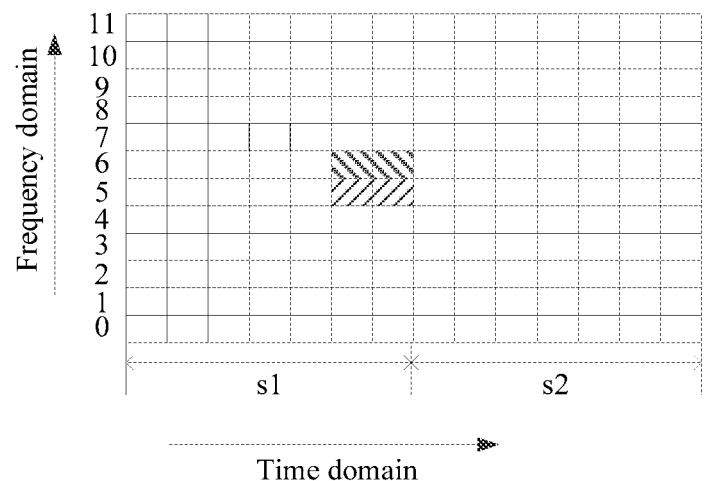
FIG. 9S is a schematic diagram of a first pattern according to an embodiment of this application.

Alternatively, the first pattern is shown in FIG. 9S. First reference signals occupy last two symbols of a first slot in a time domain dimension, and occupy a second combination in a frequency domain dimension.

Figure 9T:
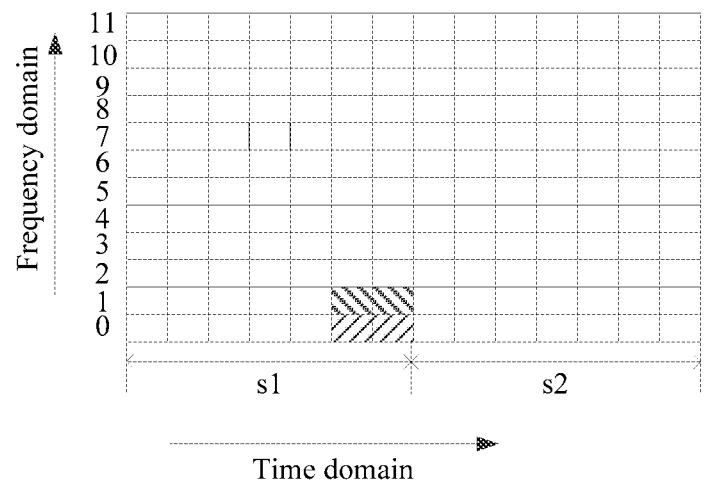
FIG. 9T is a schematic diagram of a first pattern according to an embodiment of this application.

Alternatively, the first pattern is shown in FIG. 9T. First reference signals occupy last two symbols of a first slot in a time domain dimension, and occupy a first combination in a frequency domain dimension.

Figure 9U:
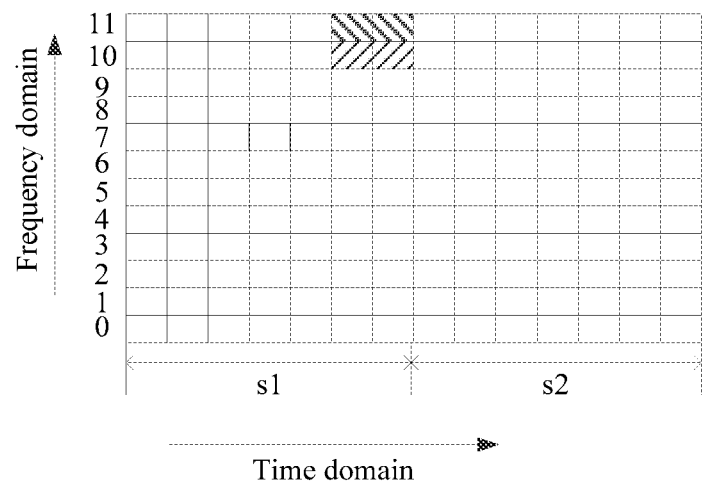
FIG. 9U is a schematic diagram of a first pattern according to an embodiment of this application.

Alternatively, the first pattern is shown in FIG. 9U. First reference signals occupy last two symbols of a first slot in a time domain dimension, and occupy a third combination in a frequency domain dimension.

In this case, there are seven types of first patterns in total, as shown in FIG. 9O to FIG. 9U.

Figure 9V:
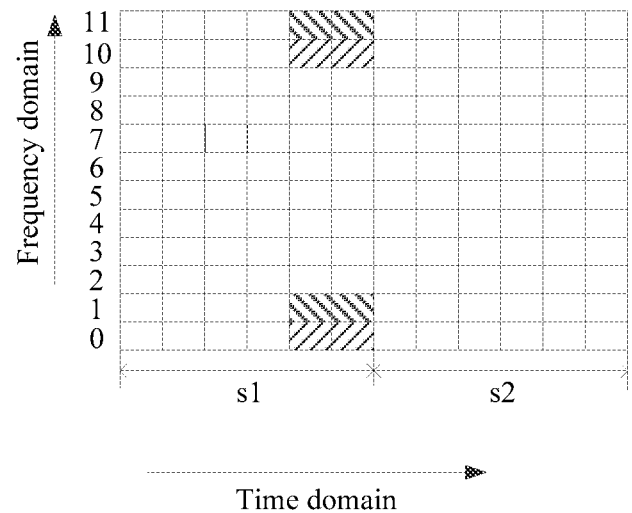
FIG. 9V is a schematic diagram of a first pattern according to an embodiment of this application.
Figure 9W:
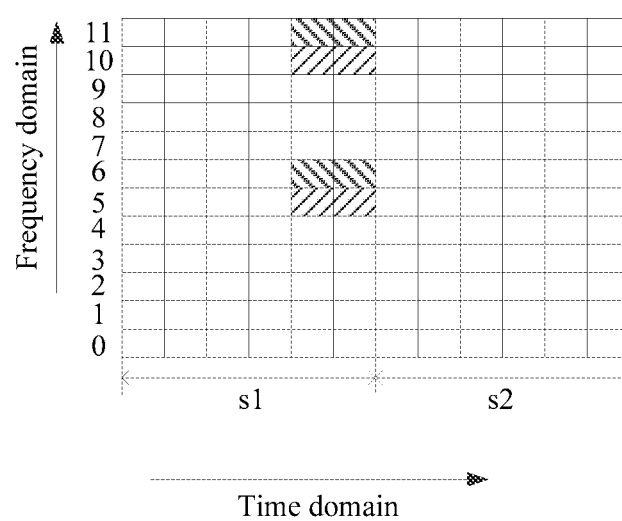
FIG. 9W is a schematic diagram of a first pattern according to an embodiment of this application.
Figure 9X:
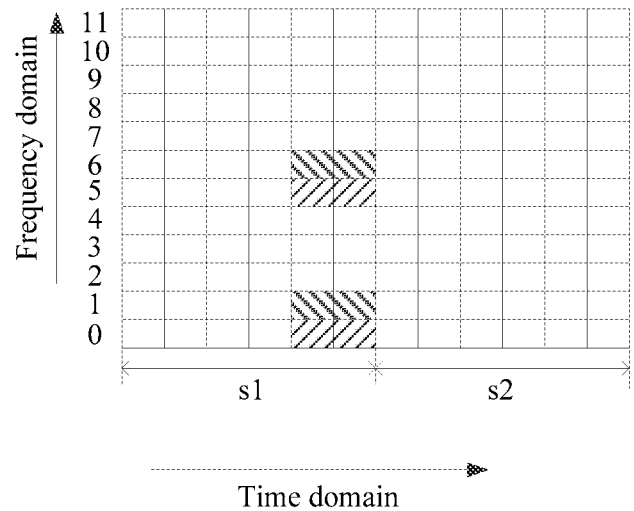
FIG. 9X is a schematic diagram of a first pattern according to an embodiment of this application.
Figure 9Y:
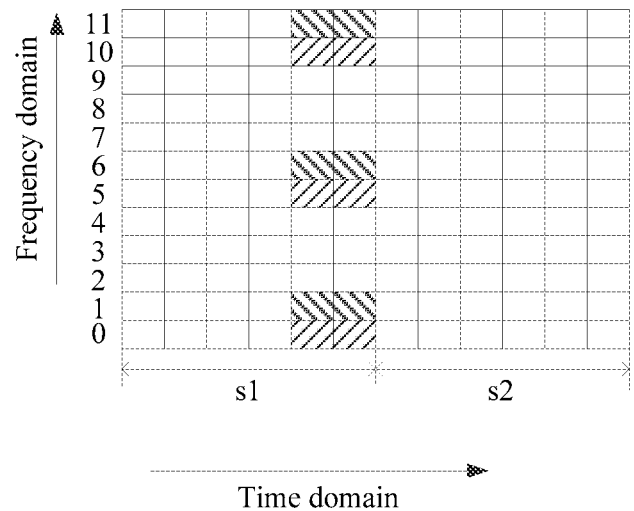
Figure 9Z:
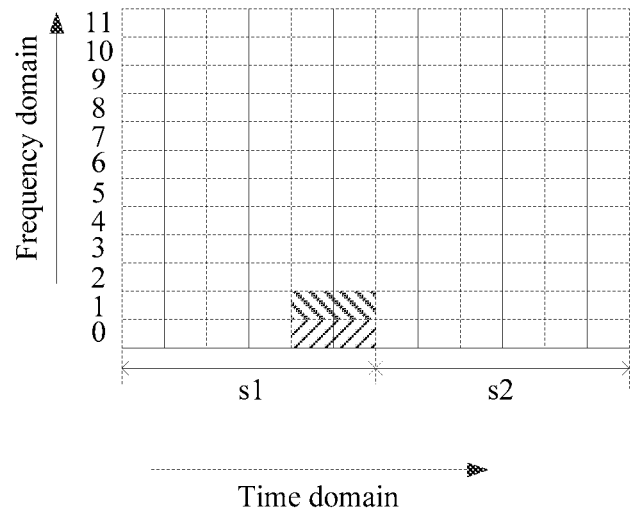
Figure 9A:
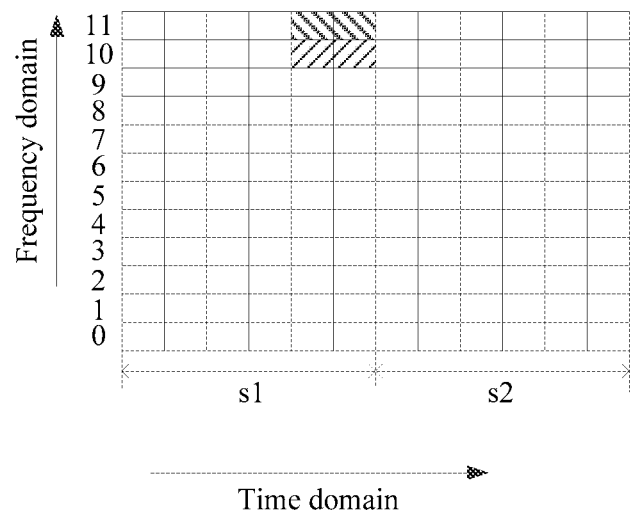
Figure 9B:
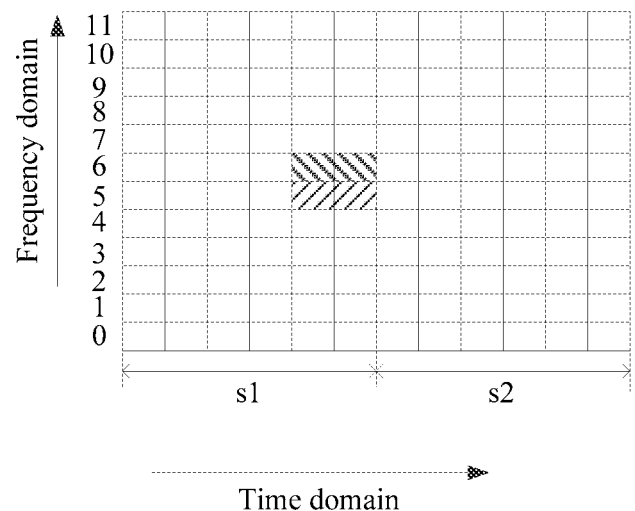
Figure 9C:
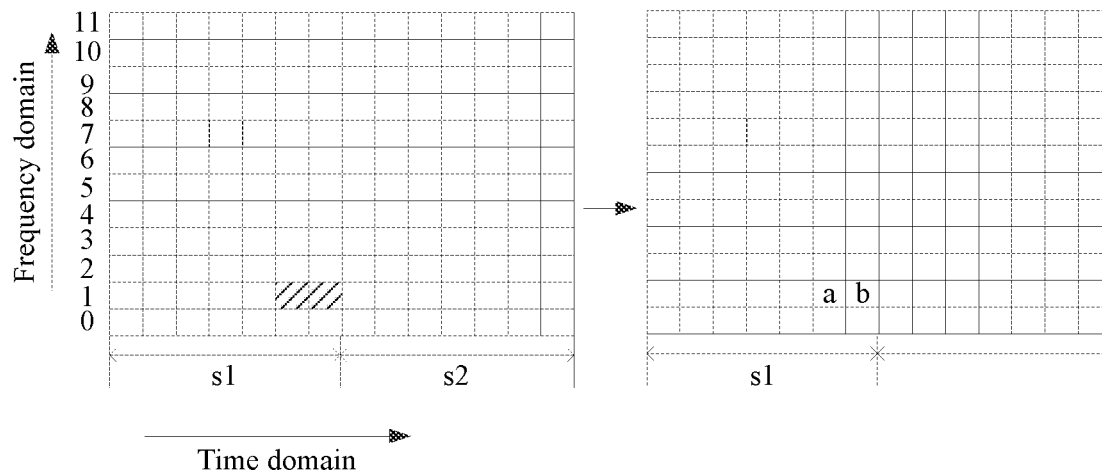
Figure 9D:
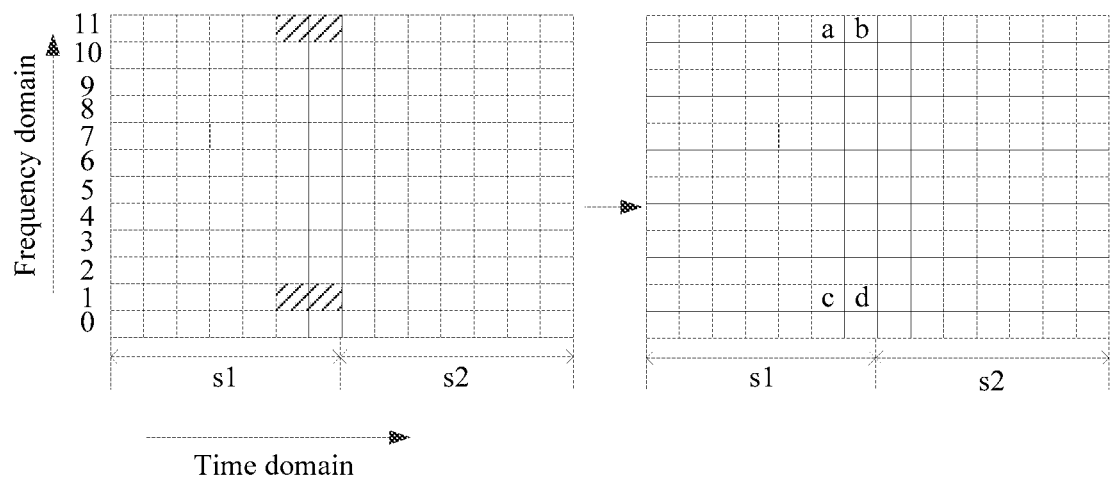
Figure 9E:
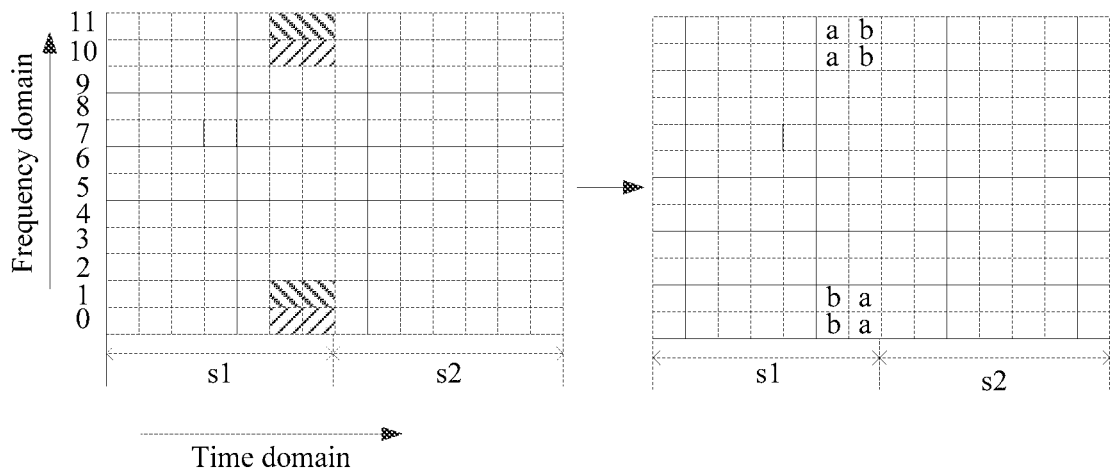
Figure 9F:
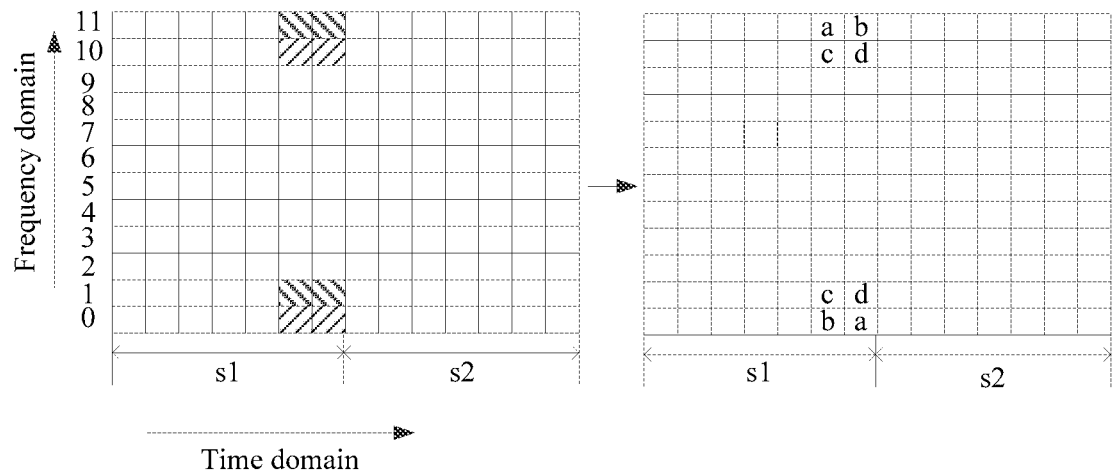

Similarly, in a case of an extended cyclic prefix, for example, CSI-RSs occupy last two symbols of a first slot in a time domain dimension, and occupy a first combination and a third combination in a frequency domain dimension. The first pattern is shown in FIG. 9V. Alternatively, the first pattern may be shown in FIG. 9W, FIG. 9X, FIG. 9Y, FIG. 9Z, FIG. 9a, or FIG. 9b. In this case, there are seven types of first patterns in total.

In the optional embodiment based on FIG. 9A, FIG. 9B, FIG. 9C, FIG. 9D, FIG. 9E, FIG. 9F, FIG. 9G; FIG. 9H, FIG.

9I, FIG. 9J, FIG. 9K, FIG. 9L, FIG. 9M, or FIG. 9N, when a length of an OCC is 2, a spreading sequence whose length is 2 is [1 1] or [1 −1]; and two first reference signals transmitted by using two time-frequency resources in the first pattern that include a same subcarrier in a frequency domain dimension are reference signals orthogonal to each other after being spread by using the spreading sequence whose length is 2.

For example, in FIG. 9c, spreading sequences are a=[1 1] and b=[1 −1]. First reference signals occupy a total of two time-frequency resources that include a subcarrier 1 in a frequency domain dimension and last two OFDM symbols of a first slot in a time domain dimension, as shown on a left side of FIG. 9c. The two first reference signals transmitted by using the two time-frequency resources are spread by using the spreading sequences a and b, as shown on a right side of FIG. 9c.

In the optional embodiment based on FIG. 9A, FIG. 9B, FIG. 9C, FIG. 9D, FIG. 9E, FIG. 9F, FIG. 9G, FIG. 9H, FIG. 9I, FIG. 9J, FIG. 9K, FIG. 9L, FIG. 9M, or FIG. 9N, when the length of the OCC is 4, a spreading sequence whose length is 4 is a=[1 1 1 1], b=[1 −1 1 −1], c=[1 1 −1 −1], or d=[1 −1 −1 1]; and four first reference signals transmitted by using a total of four symbol time-frequency resources in the first pattern that include a subcarrier X and a subcarrier Y in a frequency domain dimension, and/or four first reference signals transmitted by using a total of four time-frequency resources in the first pattern that include a subcarrier X and a subcarrier Z in the frequency domain dimension, and/or four first reference signals transmitted by using a total of four time-frequency resources in the first pattern that include a subcarrier Y and a subcarrier Z in the frequency domain dimension are reference signals orthogonal to each other after being spread by using the spreading sequence whose length is 4.

Optionally, X is an integer greater than or equal to 0 and less than or equal to 11, Y is an integer greater than or equal to 0 and less than or equal to 11, and Z is an integer greater than or equal to 0 and less than or equal to 11.

For example, in FIG. 9d, first reference signals occupy a total of four time-frequency resources that include last two symbols of a first slot in a time domain dimension and a subcarrier 1 and a subcarrier 11 in a frequency domain dimension, as shown on a left side of FIG. 9d. The four first reference signals transmitted by using the four time-frequency resources are spread by using the spreading sequences a=[1 1 1 1], b=[1 −1 1 −1], c=[1 1 −1 −1], and d=[1 −1 −1 1], as shown on a right side of FIG. 9d.

In the optional embodiment based on FIG. 9O, FIG. 9P, FIG. 9Q, FIG. 9R, FIG. 9S, FIG. 9T, FIG. 9U, FIG. 9V, FIG. 9W, FIG. 9X, FIG. 9Y, FIG. 9Z, FIG. 9a, or FIG. 9b, when a length of an OCC is 2, a spreading sequence whose length is 2 is a=[1 1] or b=[1 −1]; and two first reference signals transmitted by using two time-frequency resources in the first pattern that include a same subcarrier in a frequency domain dimension are reference signals orthogonal to each other after being spread by using the spreading sequence whose length is 2.

For example, in FIG. 9e, spreading sequences are a=[1 1] and b=[1 −1]. A first group of first reference signals occupies last two symbols of a first slot in a time domain dimension, and occupies a subcarrier 0 and a subcarrier 10 in a frequency domain dimension, as shown on a left side of FIG. 9e. The first group of reference signals occupies a total of two time-frequency resources that include the last two OFDM symbols of the first slot in the time domain dimension and the subcarrier 0 in the frequency domain dimension, and the two first reference signals transmitted by using the two time-frequency resources are spread by using the spreading sequences b and a. The first group of reference signals occupies a total of two time-frequency resources that include the last two OFDM symbols of the first slot in the time domain dimension and the subcarrier 10 in the frequency domain dimension, and the two first reference signals transmitted by using the two time-frequency resources are spread by using the spreading sequences a and b, as shown on a right side of FIG. 9e.

In the optional embodiment based on FIG. 9O, FIG. 9P, FIG. 9Q, FIG. 9R, FIG. 9S, FIG. 9T, FIG. 9U, FIG. 9V, FIG. 9W, FIG. 9X, FIG. 9Y, FIG. 9Z, FIG. 9a, or FIG. 9b, when the length of the OCC is 4, a spreading sequence whose length is 4 is a=[1 1 1 1], b=[1 −1 1 −1], c=[1 1−1 −1], or d=[1 −1 −1 1]; and four first reference signals transmitted by using a total of four time-frequency resources in the first pattern that include two adjacent subcarriers are reference signals orthogonal to each other after being spread by using the spreading sequence whose length is 4.

For example, in FIG. 9f, spreading sequences are a=[1 1 1 1], b=[1 −1 1 −1], c=[1 1−1 −1], and d=[1 −1 −1 1]. A first group of first reference signals occupies last two OFDM symbols of a first slot in a time domain dimension, and occupies a subcarrier 0 and a subcarrier 10 in a frequency domain dimension, as shown on a left side of FIG. 9f The first group of first reference signals is spread by using the spreading sequences a, b, c, and d, as shown on a right side of FIG. 9f.

Optionally, in the channel estimation method provided in this embodiment of this application, the first time unit is before the second time unit; a time unit is a subframe including a first slot and a second slot; a time-frequency resource in the first pattern is a part of a time-frequency resource in the fourth pattern, and the first pattern and the second pattern do not overlap, or in other words, there is no intersection between the time-frequency resource in the first pattern and the time-frequency resource in the second pattern. It should be noted that, when the channel estimation method provided in this application is used in N continuous time units, the first pattern is only in the first slot, where N is greater than or equal to 3.

The first pattern is a time-frequency distribution pattern, used when the first reference signal is used in joint channel estimation, of the first reference signal in the first time unit. The fourth pattern is a time-frequency distribution pattern, used when the first reference signal is not used in joint channel estimation, of the first reference signal in the first time unit, or the fourth pattern is a time-frequency distribution pattern, used when the first reference signal exists in the first time unit and the second reference signal does not exist in the second time unit, of the first reference signal in the first time unit.

Because the time-frequency resource in the first pattern is a part of the time-frequency resource in the fourth pattern, the first reference signal is distributed in the first pattern in the following manner:

In the first pattern, first reference signals occupy last two symbols of the first slot in a time domain dimension, and the first reference signals occupy at least one of a subcarrier A, a subcarrier B, a subcarrier C, and a subcarrier D in a frequency domain dimension.

In a pattern portion, corresponding to the first slot, of the fourth pattern, when first reference signals occupy the subcarrier A, the subcarrier B, the subcarrier C, and the subcarrier D; the subcarrier A, the subcarrier B, and the subcarrier C; the subcarrier A, the subcarrier B, and the subcarrier D; the subcarrier A, the subcarrier C, and the subcarrier D; the subcarrier A and the subcarrier B; the subcarrier A and the subcarrier C; the subcarrier A and the subcarrier D; the subcarrier B and the subcarrier C; the subcarrier B and the subcarrier D; the subcarrier C and the subcarrier D; the subcarrier A; the subcarrier B; the subcarrier C; or the subcarrier D in the frequency domain dimension, in the pattern portion, corresponding to the first slot, of the fourth pattern, the first reference signals occupy at least one of the subcarrier A, the subcarrier B, the subcarrier C, and the subcarrier D; at least one of the subcarrier A, the subcarrier B, and the subcarrier C; at least one of the subcarrier A, the subcarrier B, and the subcarrier D; at least one of the subcarrier A, the subcarrier C, and the subcarrier D; at least one of the subcarrier A and the subcarrier B; at least one of the subcarrier A and the subcarrier C; at least one of the subcarrier A and the subcarrier D; at least one of the subcarrier B and the subcarrier C; at least one of the subcarrier B and the subcarrier D; at least one of the subcarrier C and the subcarrier D; the subcarrier A; the subcarrier B; the subcarrier C; or the subcarrier D in the frequency domain dimension.

Optionally, A is an integer greater than 0 and less than 10, B is an integer greater than 0 and less than 10, C is an integer greater than 0 and less than 10, and D is an integer greater than 0 and less than 10.

In a case of a normal cyclic prefix, for example, in the first pattern, first reference signals, namely CSI-RSs, occupy the last two symbols of the first slot in the time domain dimension, and occupy the subcarrier A, the subcarrier B, and the subcarrier D in the frequency domain dimension. The first pattern is shown in FIG. 10A. CSI-RSs 10 occupy last two symbols of a first slot in a time domain dimension, and occupy a subcarrier 3, a subcarrier 4, and a subcarrier 10 in a frequency domain dimension. Alternatively, the first pattern may be shown in FIG. 10B, FIG. 10C, or FIG. 10D. In this case, there are 15 types of first patterns in total. A person skilled in the art may derive remaining 11 first patterns based on the foregoing several example patterns, and details are not described herein.

Similarly, in a case of an extended cyclic prefix, for example, in the first pattern, first reference signals, namely CSI-RSs, occupy the last two symbols of the first slot in the time domain dimension, and occupy the subcarrier A, the subcarrier B, and the subcarrier D in the frequency domain dimension. The first pattern is shown in FIG. 10E. CSI-RSs occupy last two symbols of a first slot in a time domain dimension, and occupy a subcarrier 3, a subcarrier 4, and a subcarrier 10 in a frequency domain dimension. Alternatively, the first pattern may be shown in FIG. 10F, FIG. 10G, or FIG. 10H. In this case, there are 15 types of first patterns in total. A person skilled in the art may derive remaining 11 first patterns based on the foregoing several example patterns, and details are not described herein.

It should be noted that, in the foregoing embodiment, when the density of the time-frequency resources, used for transmitting the second reference signals, in the third pattern is 12 time-frequency resources per physical resource block pair and the length of the OCC is 4, the first reference signals and the second reference signals occupy a total of four symbols. Two of the four different symbols belong to the first slot, and the other two of the four different symbols belong to the second slot. The four reference signals are divided into the following types:

(1) First reference signals transmitted by using two time-frequency resources that include two symbols in the first pattern and second reference signals transmitted by using other two time-frequency resources that include two symbols in the second pattern are reference signals orthogonal to each other after being spread by using the spreading sequence whose length is 4, where the four time-frequency resources include a same subcarrier in a frequency domain dimension and four different symbols in a time domain dimension.

The spreading sequence whose length is 4 is a=[1 1 1 1], b=[1 −1 1 −1], c=[1 1−1 −1], or d=[1 −1 −1 1].

Assuming that the first reference signal in the first time unit is distributed according to the first pattern and the second reference signal in the second time unit is distributed according to the second pattern, distribution manners of the first reference signal and the second reference signal are shown in FIG. 11A.

For example, in FIG. 11B, spreading sequences are a=[1 1 1 1], b=[1 −1 1 −1], c=[1 1−1 −1], and d=[1 −1 −1 1]. Four reference signals transmitted by using two time-frequency resources in a first time unit that include a subcarrier 6 in a frequency domain dimension and last two OFDM symbols of a first slot in a time domain dimension and two time-frequency resources in a second time unit that include a subcarrier 6 in the frequency domain dimension and last two OFDM symbols of a second slot in the time domain dimension are spread by using the spreading sequences a, b, c, and d.

(2) First reference signals transmitted by using two time-frequency resources that include two symbols in the first pattern and second reference signals transmitted by using other two time-frequency resources that include two symbols in the second pattern are reference signals orthogonal to each other after being spread by using the spreading sequence whose length is 4, where the four time-frequency resources include two adjacent subcarriers in a frequency domain dimension and four different symbols in a time domain dimension.

It is assumed that the distribution manners of the first reference signal and the second reference signal are shown in FIG. 11A, and FIG. 11B is still used as an example. Spreading sequences are a=[1 1 1 1], b=[1 −1 1 −1], c=[1 1−1 −1], and d=[1 −1 −1 1]. Four reference signals transmitted by using two time-frequency resources in a first time unit that include a subcarrier 6 in a frequency domain dimension and last two OFDM symbols of a first slot in a time domain dimension and two time-frequency resources in a second time unit that include a subcarrier 1 in the frequency domain dimension and last two OFDM symbols of a first slot in the time domain dimension are spread by using the spreading sequences a, b, d, and c.

It should be noted that ordinal numbers such as "first", "second", and "third" mentioned in the embodiments of this application should be understood as only for distinguishing, unless the ordinal numbers definitely represent an order according to the context.

FIG. 12 is a flowchart of a channel estimation method according to another example embodiment of this application. In this embodiment of this application, an example in which the channel estimation method is applied to the implementation environment shown in FIG. 1 is used for description. As shown in FIG. 12, the channel estimation method includes the following steps.

Step 1201. A second network device sends configuration information to a first network device.

The configuration information is used to indicate whether a first precoding weight of a first reference signal and a second precoding weight of a second reference signal are the same.

Optionally, the configuration information is configured by using dynamic signaling, or configured by using higher layer signaling.

If the configuration information is configured by using the dynamic signaling, the second network device sends the configuration information to the first network device when the second network device needs to send data to the first network device. For example, in a radio frame, the second network device needs to schedule send data to the first network device in a subframe 5, the second network device sends configuration information to the first network device in the subframe 5 by using downlink scheduling information. The configuration information is used to indicate that a second precoding weight of a second reference signal in the subframe 5 is the same as a first precoding weight of a first reference signal in a subframe 3. In addition, because the configuration information is dynamically configured, the configuration information is valid only in the current scheduling process.

If the configuration information is configured by using the higher layer signaling, the second network device sends the configuration information to the first network device according to the higher layer signaling. The higher layer signaling is usually signaling sent by a radio access RNC. For example, the second network device sends the configuration information to the first network device according to the higher layer signaling, where the configuration information is used to indicate that a first precoding weight in a subframe i and a second precoding weight in a subframe i+1 are the same, then the configuration information is valid before next configuration information is received.

Step 1202. The first network device receives the configuration information.

When the configuration information is replaced by using the dynamic signaling, each time before receiving a first reference signal sent by the second network device, the first network device receives configuration information obtained through replacement by using the dynamic signaling.

When the configuration information is replaced by using the higher layer signaling, the first network device receives configuration information before receiving a first reference signal sent by the second network device; and if the configuration information does not change, the first network device does not need to receive configuration information again when receiving a first reference signal sent by the second network device.

It should be noted that, instead of sending the configuration information to the first network device by the second network device, in an optional implementation, a predefined rule is pre-stored in both the first network device and the second network device. To be specific, the predefined rule is agreed upon in advance in a communication protocol. The predefined rule is pre-stored in the first network device and the second network device, and the second network device does not need to send the configuration information to the first network device. The predefined rule is information that is valid in a long term. In other words, step 1201 and step 1202 are not performed.

Step 1203. The first network device determines, based on the configuration information, whether a first precoding weight of a first reference signal and a second precoding weight of a second reference signal are the same.

It should be noted that, when the predefined rule is pre-stored in the first network device, the first network device determines, according to the predefined rule, whether the first precoding weight and the second precoding weight are the same.

If the first precoding weight and the second precoding weight are the same, step 1206 is performed.

Step 1204. When the first precoding weight and the second precoding weight are the same, the second network device sends the first reference signal in a first time unit according to a first pattern.

The first reference signal is a reference signal for channel measurement.

Optionally, the first reference signal is a CSI-RS or a CRS.

The second network device determines, based on the configuration information, whether the first precoding weight and the second precoding weight are the same. If the first precoding weight and the second precoding weight are the same, the second network device sends the first reference signal in the first time unit according to the first pattern.

It should be noted that, when the predefined rule is pre-stored in the second network device, the second network device does not send the configuration information to the first network device. To be specific, the second network device determines, according to the predefined rule, whether the first precoding weight and the second precoding weight are the same. If the first precoding weight and the second precoding weight are the same, the second network device sends the first reference signal in the first time unit according to the first pattern.

Step 1205. The second network device sends the second reference signal in a second time unit according to a second pattern.

The second reference signal is a reference signal for demodulation.

Optionally, the second reference signal is a DMRS.

When the first precoding weight and the second precoding weight are the same, the second network device sends the second reference signal in the second time unit according to the second pattern.

When the first precoding weight and the second precoding weight are the same, the first reference signal and the second reference signal are used for joint channel estimation on a channel in the second time unit. Under a condition that port quantities or ranks are the same, a quantity of time-frequency resources occupied by the second reference signal in the second pattern is less than a quantity of time-frequency resources occupied by the second reference signal in a third pattern.

The first pattern is a time-frequency distribution pattern, used when the first reference signal is used in joint channel estimation, of the first reference signal in the first time unit.

The second pattern is a time-frequency distribution pattern, used when the second reference signal is used in joint channel estimation, of the second reference signal in the second time unit.

The third pattern is a time-frequency distribution pattern, used when the first precoding weight and the second precoding weight are different, of the second reference signal in the second time unit, or the third pattern is a time-frequency distribution pattern, used when the first reference signal does not exist in the first time unit and the second reference signal exists in the second time unit, of the second reference signal in the second time unit.

A fourth pattern is a time-frequency distribution pattern, used when the first reference signal is not used in joint channel estimation, of the first reference signal in the first time unit, or the fourth pattern is a time-frequency distribution pattern, used when the first reference signal exists in the first time unit and the second reference signal does not exist in the second time unit, of the first reference signal in the first time unit.

The first pattern, the second pattern, the third pattern, and the fourth pattern have been elaborated in the foregoing, and are not described herein again.

Step 1206. If the first precoding weight and the second precoding weight are the same, the first network device receives the first reference signal in the first time unit according to the first pattern, and receives the second reference signal in the second time unit according to the second pattern.

After the first network device receives the first reference signal and the second reference signal, the first network device further needs to determine whether the first network device supports joint channel estimation on the channel in the second time unit. If the first network device supports joint channel estimation on the channel in the second time unit, step 1207 is performed. Otherwise, the first network device does not perform joint channel estimation on the channel in the second time unit.

Step 1207. The first network device performs joint channel estimation on a channel in the second time unit based on the first reference signal and the second reference signal, and demodulates data in the second time unit based on a joint channel estimation result.

Optionally, in a multiple-input multiple-output (MIMO) system or a 5G system, the first reference signal and the second reference signal for joint channel estimation have been precoded, and the first precoding weight of the first reference signal and the second precoding weight of the second reference signal are the same. In a non-MIMO system, the first reference signal and the second reference signal have not been precoded.

The data is demodulated based on the joint channel estimation result in the following manners:

A reference signal is a first reference signal or a second reference signal.

(1) If there is a reference signal in one OFDM symbol, in this OFDM symbol, a channel between two time-frequency resources for transmitting reference signals is obtained through interpolation of channels of the two time-frequency resources for transmitting the reference signals, and a channel of a time-frequency resource outside the time-frequency resources for transmitting the two reference signals is obtained through linear extrapolation of a channel, closest to the channel, of a time-frequency resource for transmitting the reference signal.

(2) If there is no reference signal in one OFDM symbol, a channel, on a subcarrier carrying data information, between two OFDM symbols for which channels have been estimated is obtained through interpolation of the channels of the two OFDM channel for which channels have been estimated. A channel of a subcarrier that carries data information and that is not between the two OFDM symbols for which channels have been estimated needs to be obtained through extrapolation of a channel of an OFDM symbol that is closest to the channel of the subcarrier and for which a channel has been estimated.

It is assumed that the reference signals received by the first network device in the first time unit and the second time unit are shown in FIG. 13. The first reference signal is received in the first time unit, and the second reference signal is received in the second time unit. In a last OFDM symbol in a second slot of the second time unit, a channel 40 between a time-frequency resource 31 for transmitting the first reference signal and a time-frequency resource 32 for transmitting the second reference signal is obtained through interpolation of channels of the time-frequency resource 31 and the time-frequency resource 32. Similarly, a channel of the last OFDM symbol and a channel of a last but one OFDM symbol in the second slot of the second time unit can be estimated. A channel 41 outside a time-frequency resource 36 for transmitting the second reference signal is obtained through linear extrapolation of a channel of the time-frequency resource 36. If a channel has been estimated for an OFDM symbol corresponding to a time-frequency resource 35 for transmitting the first reference signal, a channel, on a subcarrier 11 numbered 42 that carries data, between the time-frequency resource 35 for transmitting the first reference signal and a time-frequency resource 34 for transmitting the second reference signal may be obtained through interpolation of the channel of the OFDM symbol corresponding to the time-frequency resource 35 and a channel of an OFDM symbol corresponding to the time-frequency resource 34. A channel 43 on a subcarrier that does not carry data information between the two OFDM symbols for which channels have been estimated, for example, a subcarrier 5 corresponding to the time-frequency resource 32 for transmitting the second reference signal, is obtained through extrapolation of the channel of the OFDM symbol for which a channel has been estimated and that is corresponding to the time-frequency resource 34 for transmitting the second reference signal. In this way, all channels in the second time unit can be estimated, to demodulate data in the second time unit.

It should be noted that step 1201, step 1204, and step 1205 may be implemented separately as a reference signal sending method on a second network device side, and step 1202, step 1203, step 1206, and step 1207 may be implemented separately as a channel estimation method on a first network device side.

In conclusion, according to the channel estimation method provided in this embodiment of this application, when the first precoding weight and the second precoding weight are the same, the second network device sends the first reference signal in the first time unit according to the first pattern and sends the second reference signal in the second time unit according to the second pattern; when the first network device determines that the first precoding weight and the second precoding weight are the same, the first network device receives the first reference signal and the second reference signal in different time units according to different patterns, and then performs joint channel estimation on the channel in the second time unit based on the first reference signal and the second reference signal. Because resources occupied by the first reference signal and the second reference signal that are received according to the first pattern and the second pattern respectively are fewer than resources occupied by the third pattern and the fourth pattern used when joint channel estimation is not performed, a throughput of a communications system can be ensured while a channel estimation effect is optimized, radio resource overheads are reduced, and performance of the communications system is improved.

In the optional embodiment based on the embodiment shown in FIG. 12, when the first precoding weight and the second precoding weight are different, the first reference signal and the second reference signal are not used for joint channel estimation. The second network device does not send the first reference signal in the first time unit according to the first pattern, and does not send the first reference signal in the second time unit according to the second pattern. In other words, step 1204 is replaced by and implemented as step 1204a, step 1205 is replaced by and implemented as 1205a, step 1206 is replaced by and implemented as 1206*a*, and step 1207 is replaced by and implemented as 1207*a*. The channel estimation method is shown in FIG. 14.

Step 1204*a*. When the first precoding weight and the second precoding weight are different, the second network device sends the first reference signal in a first time unit according to a fourth pattern.

The fourth pattern is a time-frequency distribution pattern, used when the first precoding weight and the second precoding weight are different, of the first reference signal in the first time unit. In other words, the fourth pattern is a time-frequency distribution pattern, used when the first reference signal is not used in joint channel estimation, of the first reference signal in the first time unit.

Step 1205*a*. When the first precoding weight and the second precoding weight are different, the second network device sends the second reference signal in a second time unit according to a third pattern.

The third pattern is a time-frequency distribution pattern, used when the first precoding weight and the second precoding weight are different, of the second reference signal in the second time unit. In other words, the third pattern is a time-frequency distribution pattern, used when the second reference signal is not used in joint channel estimation, of the second reference signal in the second time unit.

Step 1206*a*. If the first precoding weight and the second precoding weight are different, the first network device receives the first reference signal in the first time unit according to the fourth pattern, and receives the second reference signal in the second time unit according to the third pattern.

Step 1207*a*. The first network device performs channel estimation based on the first reference signal, and demodulates data in the second time unit according to a channel estimation result.

It should be noted that a person skilled in the art may combine the foregoing embodiments into another implementation of the channel estimation method, and details are not described herein.

FIG. 15 is a block diagram of a channel estimation apparatus according to an embodiment of this application. The channel estimation apparatus may be implemented by using software, hardware, or a combination thereof to become the entire channel estimation apparatus or a part of the channel estimation apparatus. The channel estimation apparatus includes:

a receiving unit 1510, configured to implement a function of step 603; and a demodulation unit 1520, configured to implement a function of step 604.

For related details, refer to the method embodiment shown in FIG. 6.

It should be noted that the receiving unit 1510 may be implemented by using a communications component of a first network device, and the demodulation unit 1520 is implemented by a processor of the first network device by executing a demodulation module in a memory.

FIG. 15 is a block diagram of a channel estimation apparatus according to another embodiment of this application. The channel estimation apparatus may be implemented by using software, hardware, or a combination thereof to become the entire channel estimation apparatus or a part of the channel estimation apparatus. The channel estimation apparatus includes:

a receiving unit 1510, configured to implement functions of step 1203, step 1202, step 1206, and step 1206*a*; and a demodulation unit 1520, configured to implement functions of step 1207 and step 1207*a*.

For related details, refer to the method embodiment shown in FIG. 12 or FIG. 14.

It should be noted that the receiving unit 1510 may be implemented by a processor of a first network device by using a communications component, and the demodulation unit 1520 is implemented by the processor of the first network device by using a demodulation module in a memory.

An embodiment of this application further provides a channel estimation apparatus. The apparatus includes a processor and a memory, where the memory stores at least one instruction, at least one program, a code set, or an instruction set, and the at least one instruction, the at least one program, the code set, or the instruction set is loaded and executed by the processor to implement the channel estimation method described in step 603 and step 604 in FIG. 6, step 1202, step 1203, step 1206, and step 1207 in FIG. 12, and step 1206*a* and step 1207*a* in FIG. 14.

An embodiment of this application further provides a computer-readable storage medium. The storage medium stores at least one instruction, at least one program, a code set, or an instruction set, and the at least one instruction, the at least one program, the code set, or the instruction set is loaded and executed by a processor to implement the channel estimation method described in step 603 and step 604 in FIG. 6, step 1202, step 1203, step 1206, and step 1207 in FIG. 12, and step 1206*a* and step 1207*a* in FIG. 14.

FIG. 16 is a block diagram of a reference signal sending apparatus according to an embodiment of this application. The reference signal sending apparatus may be implemented by using software, hardware, or a combination thereof to become the entire reference signal sending apparatus or a part of the reference signal sending apparatus. The reference signal sending apparatus includes:

a sending unit 1610, configured to implement functions of step 601 and step 602.

For related details, refer to the method embodiment shown in FIG. 6.

It should be noted that the sending unit 1610 may be implemented by a processor of a second network device by using a communications component.

FIG. 16 is a block diagram of a reference signal sending apparatus according to another embodiment of this application. The reference signal sending apparatus may be implemented by using software, hardware, or a combination thereof to become the entire reference signal sending apparatus or a part of the reference signal sending apparatus. The reference signal sending apparatus includes:

a sending unit 1610, configured to implement functions of step 1201, step 1204, step 1204*a*, step 1205, and step 1205*a*.

For related details, refer to the method embodiment shown in FIG. 12 or FIG. 14.

It should be noted that the sending unit 1610 may be implemented by a processor of a second network device by using a communications component.

An embodiment of this application further provides a reference signal sending apparatus. The apparatus includes a processor and a memory, where the memory stores at least one instruction, at least one program, a code set, or an instruction set, and the at least one instruction, the at least one program, the code set, or the instruction set is loaded and executed by the processor to implement the reference signal sending method described in step 601 and step 602 in FIG. 6, step 1201, step 1204, and step 1205 in FIG. 12, and step 1204*a* and step 1205*a* in FIG. 14.

An embodiment of this application further provides a computer-readable storage medium. The storage medium stores at least one instruction, at least one program, a code set, or an instruction set, and the at least one instruction, the at least one program, the code set, or the instruction set is loaded and executed by a processor to implement the reference signal sending method described in step 601 and step 602 in FIG. 6, step 1201, step 1204, and step 1205 in FIG. 12, and step 1204*a* and step 1205*a* in FIG. 14.

It should be noted that, when the channel estimation apparatus provided in the foregoing embodiments performs channel estimation, only division of the foregoing function modules is used as an example for description. In actual application, the foregoing functions may be allocated to different function modules based on a requirement for implementation. In other words, an internal structure of the device is divided into different function modules to implement all or some of the functions described above. In addition, the channel estimation apparatus provided in the foregoing embodiments is based on a same concept as the channel estimation method embodiments. For a specific implementation process, refer to the method embodiments, and details are not described herein again.

The sequence numbers of the foregoing embodiments of this application are merely for illustrative purposes, and are not intended to indicate priorities of the embodiments.

A person of ordinary skill in the art may understand that all or some of the steps of the embodiments may be implemented by hardware or a program instructing related hardware. The program may be stored in a computer-readable storage medium. The storage medium may be a read-only memory, a magnetic disk, an optical disc, or the like.

What is claimed is:

1. A channel estimation method, wherein the method comprises:
   when a first precoding weight of a first reference signal and a second precoding weight of a second reference signal are the same,
      receiving, by a first network device, the first reference signal in a first time unit according to a first pattern; and
      receiving the second reference signal in a second time unit according to a second pattern, wherein the first reference signal is a reference signal for channel measurement, and the second reference signal is a reference signal for demodulation; and
      performing, by the first network device, channel estimation on a channel in the second time unit based on the first reference signal and the second reference signal, wherein a quantity of time-frequency resources occupied by the second reference signal in the second pattern is less than a quantity of time-frequency resources occupied by the second reference signal in a third pattern, and the third pattern is a time-frequency distribution pattern of the second reference signal in the second time unit, and the third pattern is used when the first precoding weight and the second precoding weight are different.

2. The method according to claim 1, wherein the time-frequency resource in the second pattern is a part of the time-frequency resource in the third pattern.

3. The method according to claim 1, wherein the first time unit is a subframe, the second time unit is another subframe, and the subframe comprises a first slot and a second slot.

4. The method according to claim 3, wherein in the second time unit,
the second pattern is in the first slot and the second slot; or
the second pattern is in one of the first slot and the second slot.

5. The method according to claim 1, wherein
the first time unit is a slot comprising a plurality of orthogonal frequency division multiplexing (OFDM) symbols, and the second time unit is another slot comprising a plurality of OFDM symbols; or
the first time unit is a time unit comprising two OFDM symbols, and the second time unit is a time unit comprising two OFDM symbols; or
the first time unit is a time unit comprising three or four OFDM symbols, and the second time unit is another time unit comprising three or four OFDM symbols.

6. The method according to claim 1, wherein the first time unit is before the second time unit.

7. The method according to claim 1, wherein a time-frequency resource in the first pattern is a part of the time-frequency resource in the third pattern, and the first pattern and the second pattern do not overlap.

8. The method according to claim 1, wherein a time-frequency resource in the first pattern is a part of a time-frequency resource in a fourth pattern, wherein
the fourth pattern is a time-frequency distribution pattern of the first reference signal in the first time unit, and the fourth pattern is used when the first precoding weight and the second precoding weight are different.

9. The method according to claim 1, wherein the method further comprises:
receiving, by the first network device, configuration information, wherein the configuration information indicates whether the first precoding weight and the second precoding weight are the same.

10. A channel estimation apparatus, wherein the apparatus comprises:
   a communications component;
   at least one processor; and
   a non-transitory computer-readable storage medium coupled to the at least one processor and storing programming instructions for execution by the at least one processor, wherein the programming instructions instruct the at least one processor to: when a first precoding weight of a first reference signal and a second precoding weight of a second reference signal are the same,
      receive the first reference signal in a first time unit according to a first pattern by using the communications component; and
      receive the second reference signal in a second time unit according to a second pattern by using the communications component, wherein the first reference signal is a reference signal for channel measurement, and the second reference signal is a reference signal for demodulation; and
   perform channel estimation on a channel in the second time unit based on the first reference signal and the second reference signal, wherein a quantity of time-frequency resources occupied by the second reference signal in the second pattern is less than a quantity of time-frequency resources occupied by the second reference signal in a third pattern, and the third pattern is a time-frequency distribution pattern of the second reference signal in the second time unit, and the third pattern is used when the first precoding weight and the second precoding weight are different.

11. The apparatus according to claim 10, wherein the time-frequency resource in the second pattern is a part of the time-frequency resource in the third pattern.

12. The apparatus according to claim 10, wherein the first time unit is a subframe, the second time unit is another subframe, and the subframe comprises a first slot and a second slot.

13. The apparatus according to claim 12, wherein in the second time unit,
the second pattern is in the first slot and the second slot; or
the second pattern is in one of the first slot and the second slot.

14. The apparatus according to claim 10, wherein
the first time unit is a slot comprising a plurality of orthogonal frequency division multiplexing (OFDM) symbols, and the second time unit is another slot comprising a plurality of OFDM symbols; or
the first time unit is a time unit comprising two OFDM symbols, and the second time unit is a time unit comprising two OFDM symbols; or
the first time unit is a time unit comprising three or four OFDM symbols, and the second time unit is another time unit comprising three or four OFDM symbols.

15. The apparatus according to claim 10, wherein the first time unit is before the second time unit.

16. The apparatus according to claim 10, wherein a time-frequency resource in the first pattern is a part of the time-frequency resource in the third pattern, and the first pattern and the second pattern do not overlap.

17. The apparatus according to claim 10, wherein a time-frequency resource in the first pattern is a part of a time-frequency resource in a fourth pattern, wherein
the fourth pattern is a time-frequency distribution pattern of the first reference signal in the first time unit, and the fourth pattern is used when the first precoding weight and the second precoding weight are different.

18. The apparatus according to claim 10, wherein the programming instructions instruct the at least one processor to receive configuration information using the communications component, wherein the configuration information indicates whether the first precoding weight and the second precoding weight are the same.

* * * * *